(12) United States Patent
Mihara et al.

(10) Patent No.: US 6,538,824 B1
(45) Date of Patent: *Mar. 25, 2003

(54) ELECTRONIC IMAGE PICKUP EQUIPMENT

(75) Inventors: Shinichi Mihara, Tama (JP); Yuji Miyauchi, Machida (JP); Masahito Watanabe, Hachioji (JP); Hirokazu Konishi, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/183,459

(22) Filed: Jun. 28, 2002

Related U.S. Application Data

(62) Division of application No. 09/725,258, filed on Nov. 29, 2000, now Pat. No. 6,417,973.

(30) Foreign Application Priority Data

| May 23, 2000 | (JP) | ........................... 2000-151461 |
| Jul. 31, 2000 | (JP) | ........................... 2000-230495 |

(51) Int. Cl.[7] ............................................... G02B 15/14
(52) U.S. Cl. ........................................ 359/684; 359/689
(58) Field of Search ................................. 359/689, 748, 359/676, 684; 396/72, 79, 83

(56) References Cited

U.S. PATENT DOCUMENTS

| 5,909,318 A | 6/1999 | Tanaka |
| 6,308,011 B1 | 10/2001 | Wachi et al. ................. 396/72 |
| 6,417,973 B2 * | 7/2002 | Mihara et al. .............. 359/689 |

FOREIGN PATENT DOCUMENTS

| JP | 11-52246 | 2/1999 |
| JP | 11-194274 | 7/1999 |
| JP | 11-258507 | 9/1999 |
| JP | 11-287953 | 10/1999 |
| JP | 11-344670 | 12/1999 |
| JP | 2000-9997 | 1/2000 |

* cited by examiner

*Primary Examiner*—Hung Xuan Dang
(74) *Attorney, Agent, or Firm*—Pillsbury Winthrop LLP

(57) ABSTRACT

The object of the invention is to reduce the thickness of electronic image pickup equipment as much as possible, using a zooming mode having stable, high image-formation capabilities from an object at infinity to a near-by object. The electronic image pickup equipment comprises a zoom lens system comprising a negative, first lens group G1, a positive, second lens group G2 and a positive, third lens group G3. For zooming from the wide-angle end to the telephoto end of the zoom lens system upon focused on an object at infinity, the separation between G2 and G3 becomes wise. By moving G3 toward the object side of the system, the system can be focused on a nearer-by object. In the zoom lens system, the second lens group G2 comprises one positive lens 2a, one negative lens 2b and a lens subgroup 2c comprising at least one lens, and the third lens group G3 comprises one positive lens. The zoom lens system satisfies conditions with respect to the optical axis distance from the image-side surface of the positive lens 2a to the image-side surface of the negative lens 2b and the focal length ratio in air between the positive lens 2a and the lens subgroup 2c.

20 Claims, 21 Drawing Sheets

C: Cyan  M: Magenta
Ye: Yellow  G: Green

ELECTRONIC IMAGE PICKUP EQUIPMENT

CROSS REFERENCE TO RELATED APPLICATION

This application is a divisional of U.S. application Ser. No. 09/725,258, filed Nov. 29, 2000, now U.S. Pat. No. 6,417,973, the specifications and drawings of which are incorporated herein by reference.

BACKGROUND OF THE INVENTION

The present invention relates generally to electronic image pickup equipment, and more particularly to a video camera or digital camera wherein its thickness in the depth-wise direction is reduced by making some contrivance for optical systems such as a zoom lens system. In addition, the zoom lens system is designed to be rear focused.

In recent years, digital cameras (electronic cameras) attract public attention as next-generation cameras now superseding 24 mm×36 mm film (usually called Leica format) cameras. For current digital cameras there are a wide range of categories from a high-performance type for commercial use to a portable popular type.

A chief object of the present invention is to achieve a video or digital camera of the portable popular type category in particular, which is reduced in depth dimensions while high image quality is ensured.

The greatest bottleneck in reducing the depth dimensions of a camera is the thickness of the surface, nearest to the object side, of an optical system, especially a zoom lens system to an image pickup plane. Recently, a so-called collapsible mount type of lens barrel has gone mainstream, wherein an optical system is driven out of a camera body for phototaking and the optical system is housed in the camera body for carrying. However, the thickness of the lens mount with the optical system housed therein varies largely depending of the lens type used, the filters used or the like. To obtain high specifications especially regarding zoom ratios, F-number, etc., it is preferable to make use of a so-called positive precedent type of zoom lens system wherein the lens group located nearest to its object side has positive refracting power. Even when the zoom lens system is housed in a lens mount, however, it is impossible to reduce the thickness of a camera largely, because the respective lens elements have some thicknesses with a large dead space (see JP-A 11-258507). In this regard, a negative precedent type of zoom lens system, especially a zoom lens system comprising two or three lens groups is favorable. However, it is still impossible to reduce the thickness of a camera largely, even when the lens nearest to the object side is a positive lens. This is because each lens group comprises a number of lens elements or the lens elements are thick (see JP-A 11-52246). Some known examples of the zoom lens system suitable for use with electronic image pickup devices, having satisfcatory image-formation capabilities inclusive of zoom ratios, field angles and F-numbers and capable of having the smallest thickness of a lens mount with the zoom lens system housed therein are disclosed in JP-A's 11-194274, 11-287953 and 2000-9997.

To make the first lens group thin, it is preferable to locate an entrance pupil at a shallow position. To this end, on the one hand, it is required to increase the magnification of the second lens group. On the other hand, some considerable burdens are placed on the second lens group. This does not only make it difficult to keep the second lens group thin but also to make correction for aberrations, resulting in an unacceptably increase in the influence of fabrication errors.

Thickness and size reductions may be achieved by reducing image pickup device size. To achieve the same number of pixels, however, it is required to reduce pixel size and make up for sensitivity shortages by the optical system. The same also holds for the influence of diffraction.

To reduce the depth dimensions of a camera body, it is preferable in view of a driving mechanism layout to make use of a rear focusing mode wherein the movement of lenses for focusing is carried out by a rear lens group rather than a front lens group. In this case, however, it is required to make a selection from optical systems less susceptible to aberration fluctuations in the rear focusing mode.

SUMMARY OF THE INVENTION

In view of such problems with the prior art as explained above, it is a primary object of the present invention to reduce the thickness of electronic image pickup equipment as much as possible by making selective use of a zoom mode or construction having a compact yet simple mechanism layout and stable yet high image-formation capabilities from an object at infinity to a near-by object, for instance, a rear focusing mode having a reduced number of lens elements, and making lens elements so thin that the total thickness of each lens group can be reduced while the selection of filters is taken into account.

According to the first aspect of the present invention, this object is achieved by the provision of electronic image pickup equipment including a zoom lens system and an electronic image pickup device in the rear of said zoom lens system comprising, in order from an object side of the zoom lens system, a first lens group having negative refracting power, a second lens group having positive refracting power and a third lens group having positive refracting power, in which for zooming from a wide-angle end to a telephoto end of the zoom lens system upon focused on an object point at infinity, a separation between the second lens group and the third lens group becomes wide and which can be focused at a nearer-by subject by moving the third lens group toward the object side, characterized in that:

said second lens group comprises, in order from an object side thereof, one positive lens 2a, one negative lens 2b and a lens subgroup 2c comprising at least one lens and said third lens group comprises one positive lens, while the following conditions are satisfied:

$$0.04 < t_{2N}/t_2 < 0.18 \qquad (1)$$

$$-0.5 < f_{2a}/f_{2c} < 1.1 \qquad (2)$$

where $t_{2N}$ is an axial distance from an image-side surface of the positive lens 2a located on the object side of the second lens group to an image-side surface of the negative lens 2b in the second lens group, $t_2$ is an optical axis distance from an object-side surface of the positive lens 2a located on the object side of the second lens group to a surface located nearest to an image side of the lens subgroup 2c, and $f_{2a}$, and $f_{2c}$ is a focal length in air of the positive lens 2a located on the object side of the second lens group, and the lens subgroup 2c, respectively.

According to the second aspect of the present invention, there is provided electronic image pickup equipment including a zoom lens system and an electronic image pickup device in the rear of said zoom lens comprising, in order from an object side of the zoom lens system, a first lens group having negative refracting power, a second lens group having positive refracting power and a third lens group having positive refracting power, in which for zooming from a wide angle end to a telephoto end of the zoom lens system upon focused on an object point at infinity, a separation between the second lens group and the third lens group becomes wide and which can be focused at a nearer-by subject by moving the third lens group toward the object side, characterized in that:

said second lens group comprises, in order from an object side thereof, one positive lens 2a, one negative lens 2b and a lens group 2c consisting of one lens and said third lens group comprises one positive lens, while the following conditions are satisfied:

$$0.04 < t_{2N}/t_2 < 0.18 \quad (1)$$

$$-0.5 < f_{2a}/f_{2c} < 1.1 \quad (2)$$

where $t_{2N}$ is an optical axis distance from an image-side surface of the positive lens 2a located on the object side of the second lens group to an image-side surface of the negative lens 2b in the second lens group, $t_2$ is an optical axis distance from an object-side surface of the positive lens 2a located on the object side of the second lens group to a surface located nearest to an image side of the lens group 2c, and $f_{2a}$, and $f_{2c}$ is a focal length in air of the positive lens 2a located on the object side of the second lens group, and the lens subgroup 2c, respectively.

An account is now given of why the aforesaid arrangements are used in the present invention and how they work.

The electronic image pickup equipment of the present invention includes a zoom lens system comprising, in order from the object side thereof, a first lens group having negative refracting power, a second lens group having positive refracting power and a third lens group having positive refracting power. For zooming from the wide-angle end to the telephoto end of the system upon focused on an object point at infinity, the separation between the second lens group and the third lens group becomes wide. By moving the third lens group toward the object side of the system, the system can be focused on a nearer-by subject. The second lens group comprises, in order from the object side thereof, one positive lens 2a, one negative lens 2c and a lens subgroup 2c comprising at least one lens including an aspherical surface, and the third lens group comprises one positive lens.

Alternatively, the second lens group may comprise, in order from the object side thereof, one positive lens 2a, one negative lens 2b and a lens subgroup 2c consisting of one lens including an aspherical surface, and the third lens group may comprise one positive lens.

This requirement for the zoom lens system according to the present invention is inevitable for reducing fluctuations of off-axis aberrations including astigmatism with focusing by the third lens group while the total thickness of the lens portion during lens housing is kept thin.

For an electronic image pickup device, it is required to reduce the angle of incident rays as much as possible. A positive lens in a two-group zoom lens system of + − construction most commonly used as a silver salt camera-oriented zoom lens system, which positive lens is located nearest to the image side thereof, is used as a third lens group designed to be independently movable in such a way as to keep an exit pupil at a farther position. When this third lens group is used for focusing purposes, aberration fluctuations offer a problem. When asphericity is incorporated in the third lens group in an amount larger than necessary, it is required that astigmatism remaining at the first and second lens groups be corrected by the third lens group so as to obtain an aspheric effect. In this case, it is not preferable to move the third lens group for focusing, because the correction of astigmatism becomes out of balance. In order to carry out focusing with the third lens group, it is therefore required to substantially remove the astigmatism at the first and second lens groups over all the zooming zone. For this reason, it is desired that the third lens group be made up of a spherical element or an element having a small amount of asphericity, an aperture stop be located on the object side of the second lens group, and an aspherical surface be used at a lens in the second lens group, which lens is positioned nearest to the image side of the second lens group and has a particular effect on off-axis aberrations. In addition, since this type zoom lens system makes it difficult to increase the diameter of the front lens, it is preferable to make an aperture stop integral with the second lens group (as can be seen from the examples, given later, wherein the aperture stop is located just before the second lens group for integration therewith). This arrangement is not only simple in mechanism but also makes any dead space less likely to occur during lens housing, with a reduced F-number difference between the wide-angle end and the telephoto end.

In the present invention, the following conditions (1) and (2) should be satisfied.

$$0.04 < t_{2N}/t_2 < 0.18 \quad (1)$$

$$-0.5 < f_{2a}/f_{2c} < 1.1 \quad (2)$$

where $t_{2N}$ is the optical axis distance from the image-side surface of the positive lens 2a located on the object side of the second lens group to the image-side surface of the negative lens 2b in the second lens group, $t_2$ is the optical axis distance from the object-side surface of the positive lens 2a located on the object side of the second lens group to the surface located nearest to the image side of the lens subgroup 2c, and $f_{2a}$, and $f_{2c}$ is the focal length in air of the positive lens 2a located on the object side of the second lens group, and the lens subgroup 2c, respectively.

Condition (1) gives a definition of $t_{2N}$ that is the optical axis distance from the image-side surface of the positive lens 2a located on the object side of the second lens group to the image-side surface of the negative lens 2b in the second lens group. Unless this site has a certain thickness, astigmatism cannot perfectly be corrected. However, this thickness becomes an obstacle to making each element of the optical system thin. Thus, the astigmatism is corrected by introducing an aspherical surface in the image-sides surface of the lens located on the image side. Nonetheless, when the lower limit of 0.04 is not reached, the astigmatism remains undercorrected. When the upper limit of 0.18 is exceeded, the thickness becomes unacceptably large.

Condition (2) gives a definition of the focal length ratio in air between the positive lens 2a on the object side of the second lens group and the lens subgroup 2c. When the upper limit of 1.1 is exceeded, the principal points of the second lens group are shifted to the image side; some dead space is likely to occur in the rear of the second lens group when the system is in use, resulting in an increase in the overall length of the system. To make the system thin upon lens housing in this case, it is thus necessary to use a more complicated or larger lens barrel mechanism. Otherwise, it is impossible to make the thickness of the lens barrel mechanism thin to a certain degree. When the lower limit of −0.5 is not reached, correction of astigmatism becomes difficult.

More preferably, conditions (1) and (2) should be:

$$0.05 < t_{2N}/t_2 < 0.16 \quad (1)'$$

$$-0.4 < f_{2a}/f_{2c} < 0.8 \quad (2)'$$

Most preferably, conditions (1) and (2) should be:

$$0.06 < t_{2N}/t_2 < 0.15 \quad (1)''$$

$$-0.3 < f_{2a}/f_{2c} < 0.62 \quad (2)''$$

As already mentioned, it s desired that the lens subgroup 2c in the second lens group comprise an aspherical surface and the third lens group consist only of a spherical surface or an aspherical surface that satisfies the following condition:

$$abs(z)/L < 1.5 \times 10^{-2} \quad (3)$$

Here abs(z) is the absolute value of the amount of a deviation of the aspherical surface in the third lens group from a spherical surface having an axial radius of curvature in the optical axis direction as measured at a height of 0.35 L from the optical axis, and L is the diagonal length of an effective image pickup plane.

Exceeding the upper limit of $1.5 \times 10^{-2}$ to condition (3) is not preferable, because astigmatism is largely out of balance upon rear focusing with the third lens group.

More preferably, condition (3) should be:

$$abs(z)/L < 1.5 \times 10^{-3} \quad (3)'$$

Most preferably, condition (3) should be:

$$abs(z)/L < 1.5 \times 10^{-4} \quad (3)''$$

In addition, it is preferable to satisfy the following conditions (4) and (5). This is because even when rear focusing is introduced in the optical system while it is kept thin, various aberrations such as astigmatism and chromatic aberrations remain stable all over the zooming zone from an object at infinity to a near-by object.

$$(R_{2cf} + R_{2cr})/(R_{2cf} - R_{2cr}) < -0.4 \quad (4)$$

$$-1.1 < (R_{31} + R_{32})/(R_{31} - R_{32}) < 1.5 \quad (5)$$

Here $R_{2cl}$ and $R_{2cr}$ are the axial radii of curvature of the surfaces in the image-side lens subgroup 2c in the second lens group, which surfaces are located nearest to the object and image sides, respectively, and $R_{31}$ and $R_{32}$ are the axial radii of curvatures of the first and second lens surfaces in the third lens group, respectively, as counted from the object side.

Conditions (4) and (5) give definitions of the shape factors of the aspherical lens subgroup 2c of the second lens group, which is located nearest to the image side thereof and the positive lens in the third lens group. When the upper limit of 1.5 to condition (5) is exceeded, fluctuations of astigmatism due to rear focusing become too large, and the astigmatism is likely to becoming worse with respect a near-by object point although the astigmatism may be well corrected on an object point at infinity. When the upper limit of −0.4 to condition (4) is exceeded and the lower limit of −1.1 to condition (5) is not reached, the fluctuations of astigmatism due to rear focusing are reduced; however, it is difficult to make correction for aberrations on an object point at infinity.

More preferably, conditions (4) and (5) should be:

$$-10.0 < (R_{2cf} + R_{2cr})/(R_{2cf} - R_{2cr}) < -0.6 \quad (4)'$$

$$-0.5 < (R_{31} + R_{32})/(R_{31} - R_{32}) < 1.2 \quad (5)'$$

When the lower limit of −10.0 to condition (4)' is not reached, the fluctuations of astigmatism due to rear focusing become large.

Most preferably, conditions (4) and (5) should be:

$$-5.0 < (R_{2cf} + R_{2cr})/(R_{2cf} - R_{2cr}) < -0.8 \quad (4)''$$

$$0.1 < (R_{31} + R_{32})/(R_{31} - R_{32}) < 1.0 \quad (5)''$$

In the second lens group, the positive and negative lenses located on its object side should preferably be cemented together, because some considerable aberrations occur due to their relative decentration. In addition, the second lens group comprises one negative lens adjacent to both positive lenses, wherein the negative lens is cemented to either one of the positive lenses. In this case, the third lens group may comprise one positive lens composed of only spherical surfaces.

It is here noted that when the lens subgroup 2c of the second lens group comprises a single lens, the cemented lens consisting of lenses 2a and 2b should preferably satisfy the following condition (6):

$$-1.5 < \{(R_{2a1} + R_{2a2}) \cdot (R_{2b1} - R_{2b2})\}/\{(R_{2a1} - R_{2a2}) \cdot (R_{2b1} + R_{2b2})\} < -0.6 \quad (6)$$

Here $R_{2a1}$ and $R_{2a2}$ are the axial radii of curvature on the object and image sides, respectively, of the lens 2a in the second lens group, and $R_{2b1}$, and $R_{2b2}$ are the axial radii of curvature on the object and image sides, respectively, of the lens 2b in the second lens group.

Condition (6) gives a definition of the shape factor ratio between the lens elements (positive lens and negative lens) of the cemented lens in the second lens group. Falling below the lower limit of −1.5 to condition (6) is unfavorable for correction of longitudinal chromatic aberration and exceeding the upper limit of −0.6 is unfavorable for size reductions because the lens elements become thick.

More preferably, condition (6) should be:

$$-1.3 < \{(R_{2a1} + R_{2a2}) \cdot R_{2b1} - R_{2b2})\}/\{(R_{2a1} - R_{2a2}) \cdot (R_{2b1} + R_{2b2})\} < -0.7 \quad (6)'$$

Most preferably, condition (6) should be:

$$-1.2 < \{(R_{2a1} + R_{2a2}) \cdot (R_{2b1} - R_{2b2})\}/\{(R_{2a1} - R_{2a2}) \cdot (R_{2b1} + R_{2b2})\} < -0.8 \quad (6)''$$

A zoom lens system having a zoom ratio of 2.3 or greater, if it satisfies the following conditions, can then make some contribution to thickness reductions.

$$1.3 < -\beta_{2t} < 2.1 \quad (a)$$

$$1.6 < f_2/f_W < 3.0 \quad (b)$$

Here $\beta_{2t}$ is the magnification of the second lens group at the telephoto end (an object point at infinity), $f_2$ is the focal length of the second lens group, and $f_W$ is the focal length of the zoom lens system at the wide-angle end (an object point at infinity).

Condition (a) gives a definition of the magnification $\beta_{2t}$ of the second lens group at the telephoto end (when the zoom lens system is focused on an object point at infinity). The larger this absolute value, the easier it is to reduce the diameter of the first lens group because it is possible to make shallow the position of the entrance pupil at the wide-angle end, and so the smaller the first lens group is. When the lower limit of 1.3 is not reached, it is difficult to satisfy thickness. When the upper limit of 2.1 is exceeded, it is difficult to make correction for various aberrations (spherical aberrations, coma and astigmatism). Condition (b) gives a definition of the focal length $f_2$ of the second lens group. To reduce the thickness of the second lens group itself, the focal length of the second lens group should preferably be reduced as much as possible. In view of power profile, however, this is unreasonable for correction of the aberrations because the front principal point of the second lens group is positioned on the object side while the rear principal point of the first lens group is positioned on the image side. When the lower limit of 1.6 is not reached, it is difficult to make correction for spherical aberrations, coma, astigmatism, etc. When the upper limit of 3.0 is exceeded, it is difficult to achieve thickness reductions.

More preferably, conditions (a) and (b) should be:

$$1.4 < -\beta_{2t} < 2.0 \tag{a}'$$

$$1.8 < f_2/f_W < 2.7 \tag{b}'$$

Most preferably, conditions (a) and (b) should be:

$$1.5 < -\beta_{2t} < 1.9 \tag{$a$}''$$

$$2.0 < f_2/f_W < 2.5 \tag{b}''$$

Thus, thickness reductions are contradictory to correction of aberrations, and so it is preferable to introduce an aspherical surface in the positive lens in the second lens group, which positive lens is positioned nearest to its object side. This aspherical surface has a great effect on correction of spherical aberrations and coma, so that astigmatism and longitudinal chromatic aberration can favorably be corrected. Preferably in this case, condition (6) or (6)' or (6)" should be satisfied as well irrespective of the construction of the second lens group.

As already explained, when rear focusing is carried out with the third lens group, correction of off-axis aberrations should preferably be substantially completed with the first and second lens groups all over the zooming zone. If the construction of the first lens group is selected with the construction of the second lens group in mind, it is then possible to substantially complete the correction of off-axis aberrations with the first and second lens groups all over the zooming zone. The then construction of the first lens group is now explained.

The first embodiment of the first lens group comprises, in order from the object side thereof, a negative lens subgroup comprising up to two negative lenses and a positive lens subgroup consisting of one positive lens. In the first embodiment, at least one negative lens in the negative lens subgroup comprises an aspherical surface and the following conditions (7) and (8) are satisfied.

The second embodiment comprises, in order from the object side thereof, one positive lens, two negative lenses and one positive lens and optionally satisfies the following condition (9).

The third embodiment of the first lens group comprises, in order from the object side thereof, one positive lens, one negative lens and one positive lens. In the third embodiment, either one of the positive lenses comprises an aspherical surface and has a weak refracting power and the following condition (10) is satisfied.

The fourth embodiment comprises, in order from the object side thereof, two negative lenses, one positive lens and one negative lens.

In the present invention, any one of the aforesaid four embodiments should preferably be used for the first lens group. The aforesaid conditions (7) through (10) are now explained.

$$-0.1 < f_W/R_{11} < 0.45 \tag{7}$$

$$0.13 < d_{NP}/f_W < 1.0 \tag{8}$$

$$0.75 < R_{14}/L < 3 \tag{9}$$

$$0 < f_W/f_{1P} < 0.3 \tag{10}$$

Here $R_{11}$ is the axial radius of curvature of the first lens surface in the first lens group, as counted from the object side, $f_W$ is the focal length of the zoom lens system at the wide-angle end (when focused on an object point at infinity), $d_{NP}$ is the axial air separation between the negative and positive lens subgroups of the first lens group, $R_{14}$ is the axial radius of curvature of the fourth lens surface in the first lens group, as counted from the object side, L is the diagonal length of the effective image pickup area of the image pickup device, $f_{1P}$ is the focal length of the positive lens in the first lens group, which lens comprises an aspherical surface and has a weak refracting power, and $f_W$ is the focal length of the zoom lens system at the wide-angle end (when focused on an object point at infinity).

Condition (7) gives a definition of the radius of curvature of the first surface in the first embodiment of the first lens group. It is preferable that distortion is corrected by introducing the aspherical surface in the first lens group and astigmatism is corrected by the remaining spherical component. Exceeding the upper limit of 0.45 is unfavorable for correction of the astigmatism, and when the lower limit of −0.1 is not reached, the distortion cannot perfectly be corrected even by the aspherical surface.

Condition (8) gives a definition of the axial air separation $d_{NP}$ between the negative lens subgroup and the positive lens subgroup in the first embodiment of the first lens group. Exceeding the upper limit of 1.0 may be favorable for correction of astigmatism; however, this is contradictory to size reductions because of an increase in the thickness of the first lens group. When the lower limit of 0.13 is not reached, it is difficult to make correction for astigmatism.

Condition (9) gives a definition of the axial radius of curvature $R_{14}$ of the fourth lens surface in the second embodiment of the first lens group. This embodiment may be favorable for satisfactory correction of astigmatism and distortion; however, the first lens group tends to become thick. If $R_{14}$ is as large as possible, it is then possible to reduce the thickness of the first lens group. Falling below the lower limit of 0.75 is not preferable because some excessive space is needed. When the upper limit of 3 is exceeded, the first lens group rather increases in diameter and thickness because it is lacking in power.

Condition (10) gives a definition of the focal length $f_{1P}$ of the positive lens in the third embodiment of the first lens group, which lens comprises an aspherical surface and has a weak refracting power. When the upper limit of 0.3 is exceeded, the power of only one negative lens in the first lens group becomes too strong to correct distortion and the concave surface becomes hard-to-process because its radius of curvature becomes too small. Falling below the lower limit of 0 is not preferable in view of correction of astigmatism, because the aspherical surface contributes to only correction of distortion.

More preferably, conditions (7), (8), (9) and (10) should be:

$$-0.05 < f_W/R_{11} < 0.25 \tag{7}'$$

$$0.3 < d_{NP}/f_W < 0.9 \tag{8}'$$

$$0.98 < R_{14}/L < 2.5 \tag{9}'$$

$$0 < f_W/f_{1P} < 0.2 \tag{10}'$$

Most preferably, conditions (7), (8), (9) and (10) should be:

$$-0.03 < f_W/R_{11} < 0.15 \tag{7}''$$

$$0.32 < d_{NP}/f_W < 0.8 \tag{8}''$$

$$1<R_{14}/L<2 \tag{9}''$$

$$0<f_W/f_{1P}<0.1 \tag{10}''$$

In the aforesaid second embodiment, the first lens group may comprise, in order from its object side, one positive lens, one negative meniscus lens and a cemented lens component consisting of a negative lens and a positive lens. When the first lens group is made up of four lenses, for instance, a positive lens, a negative lens, a negative lens and a positive lens in this order or two negative lenses, a positive lens and a negative lens in this order, the relative decentration of the two lenses located on the image side often incurs a deterioration in image-formation capabilities. For improvements in centering capabilities, it is thus preferable to cement these lenses together.

In addition, the total thickness of the first lens group, and the second lens group should preferably satisfy the following conditions.

$$0.4<t_1/L<2.2 \tag{11}$$

$$0.5<t_2/L<1.5 \tag{12}$$

Here $t_1$ is the axial thickness of the first lens group from the lens surface located nearest to its object side to the lens surface located nearest to its image side, $t_2$ is the axial thickness of the second lens group from the lens surface located nearest to its object side to the lens surface located nearest to its image side, and L is the diagonal length of the effective image pickup area of the image pickup device.

Conditions (11) and (12) give a definition of the total thickness of the first lens group, and the second lens group, respectively. Exceeding the respective upper limits of 2.2 and 1.5 is likely to form an impediment to size reductions. When the respective lower limits of 0.4 and 0.5 are not reached, it is difficult to set up appropriate paraxial relations or make correction for various aberrations because it is required to moderate the radius of curvature of each lens surface.

In view of marginal thickness and mechanism space, it is here noted that the ranges of these conditions should preferably be adjusted depending on the value of L.

To be more specific, it is desired to satisfy the following conditions (11)' and (12)'.

Condition (11)':
When L≦6.2 mm, $0.8<t_1/L<2.2$
When 6.2 mm<L≦9.2 mm, $0.7<t_1/L<2.0$
When 9.2 mm<L, $0.6<t_1/L<1.8$
Condition (12)':
When L≦6.2 mm, $0.5<t_2/L<1.5$
When 6.2 mm<L≦9.2 mm, $0.4<t_2/L<1.3$
When 9.2 mm<L, $0.3<t_2/L<1.1$ According to the present invention, it is thus possible to provide means for improving the image-formation capabilities of the zoom lens system while the thickness of the lens mount is reduced.

An account is now given of the conditions for making filters, etc. thin. In electronic image pickup equipment, usually, an infrared absorption filter having such a certain thickness as to prevent incidence of infrared light on an image pickup plane is inserted between an image pickup device and the object side of the equipment. Here consider the case where this filter is replaced by a coating that is substantially devoid of thickness. As a matter of course, the equipment becomes thin by this amount, and there is a spillover effect. When a near-infrared sharp cut coating having a transmittance of at least 80% at 600 nm wavelength and at most 10% at 700 nm wavelength is introduced between the image pickup device in the rear of a zoom lens system and the object side of the equipment, red transmittance is relatively higher than that of an adsorption type, so that the tendency of bluish purple to change to magenta—which is one defect of a CCD having a complementary color mosaic filter—can be mitigated by gain control, thereby achieving color reproduction comparable to that by a CCD having a primary color filter.

On the other hand, a CCD with a complementary color filter mounted thereon, because of its high transmitted light energy, is higher in substantial sensitivity, and more favorable in resolution, than a CCD with a primary color filter mounted thereon. Thus, there is much merit in using the complementary color filter on a CCD of miniature size. Another filter or an optical low-pass filter, too, should preferably satisfy the following condition with respect to its total thickness $t_{LPF}$.

$$0.15\times10^3<t_{LPF}/a<0.45\times10^3 \tag{13}$$

Here a is the horizontal pixel pitch of an electronic image pickup device.

To make an optical low-pass filter thin, too, is effective for reducing the thickness of the lens mount. However, this is generally not preferable because the effect of the low-pass filter on moire reductions becomes slender. As the pixel pitch becomes small, on the other hand, the contrast of frequency components exceeding Nyquist threshold decreases under the influence of diffraction by an image-formation lens system, so that the decrease in the moire-reducing effect can be accepted to some degrees. For instance, when use is made of three types of filter elements put one upon another in the optical axis direction, each of which elements has crystallographic axes in the azimuth directions of horizontal (=0°) and ±45° upon projection on an image plane, it is known that some effects on moire reductions are achievable. Referring here to the specifications where the filter becomes thinnest, it is known that the elements are shifted by aμm in the horizontal direction and by SQRT(½)×a μm in the ±45° direction. The then filter thickness amounts to about [1+2×SQRT(½)]×a/5.88 (mm) where SQRT means a square root. This is just the specification where contrast is reduced down to zero at a frequency corresponding to Nyquist threshold.

When the film thickness is smaller than this by a few % to several tens %, there is a contrast of the frequency corresponding to Nyquist threshold. However, this contrast can be controlled by the aforesaid influence of diffraction. Regarding other filter specifications, for instance, when one or two filter elements are used, too, it is preferable to conform to condition (13). When the upper limit of 0.45×10³ is exceeded, the optical low-pass filter becomes too thick to achieve thickness reductions. When the lower limit of 0.15× 10³ is not reached, moire removal becomes insufficient. Still, it is required that a be 5 μm or less.

When a is 4 μm or less, it is preferable that $$0.13\times10^3<t_{LPF}/a<0.42\times10^3 \tag{13'}$$

This is because the optical low-pass filter is more susceptible to diffraction. The optical low-pass filter may then be embodied as follows.

When the low-pass filter is made up of three low-pass filter elements put one upon another and 4 μm≦a<5 μm, it is preferable that $$0.3\times10^3<t_{LPF}/a<0.4\times10^3 \tag{13-1}$$

When the low-pass filter is made up of two low-pass filter elements put one upon another and 4 μm≦a<5 μm, it is preferable that $$0.2 \times 10^3 < t_{LPF}/a < 0.28 \times 10^3 \quad (13\text{-}2)$$

When the low-pass filter is made up of one low-pass filter element and 4 μm ≦ a < 5 μm, it is preferable that $$0.1 \times 10^3 < t_{LPF}/a < 0.16 \times 10^3 \quad (13\text{-}3)$$

When the low-pass filter is made up of three low-pass filter elements put one upon another and a < 4 μm, it is preferable that $$0.25 \times 10^3 < t_{LPF}/a < 0.37 \times 10^3 \quad (13\text{-}4)$$

When the low-pass filter is made up of two low-pass filter elements put one upon another and a < 3 μm, it is preferable that $$0.6 \times 10^3 < t_{LPF}/a < 0.25 \times 10^3 \quad (13\text{-}5)$$

When the low-pass filter is made up of one low-pass filter element and a < 4 μm, it is preferable that $$0.08 \times 10^3 < t_{LPF}/a < 0.14 \times 10^3 \quad (13\text{-}6)$$

When an image pickup device having a small pixel pitch is used, image quality deteriorates under the influence of diffraction due to stop-down. To avoid this, the present invention provides electronic image pickup equipment, wherein aperture size comprises a plurality of fixed apertures, one out of which can be inserted in an optical path between a lens surface in the first lens group, which surface is nearest to an image side thereof, and a lens surface in the third lens group, which surface is nearest to an object side thereof, and can be replaced with another aperture, so that field illuminance can be controlled. Preferably in this electronic image pickup equipment, some of said plurality of apertures should contain therein media having a varying transmittance of less than 80% with respect to 550 nm wavelength, so that light quantity control can be achieved, and some should contain therein media having a transmittance of 80% or greater with respect to 550 nm.

Alternatively, when control is carried out to obtain a light quantity corresponding to such an F-number as to provide a/F-number < 0.4 μm, the apertures should preferably contain therein media having a varying transmittance of less than 80% with respect to 550 nm wavelength.

To put it another way, when control is carried out to obtain a light quantity corresponding to such an effective F-number as to provide $F_{NO}' > a/0.4$ μm where $F_{NO}'$ is an effective F-number defined by $F_{NO}/T$ wherein $F_{NO}$ is an F-number found from the focal length of the zoom lens system and the diameter of an entrance pupil and T is an aperture transmittance at 550 nm and a is a horizontal pixel pitch of an electronic image pickup device, it is preferable to insert an aperture containing therein a medium having a transmittance T of less than 80% with respect to 550 nm in a zoom lens optical path.

For instance, when there is a deviation from the aforesaid range on the basis of the open aperture value, the medium may be not used or a dummy medium having a transmittance of 91% or greater with respect to 550 nm wavelength is used. In the aforesaid range, light quantity control may be carried out by using a member such an ND filter rather than decreasing the diameter of the aperture stop to such a degree that the influence of diffraction manifests itself.

Alternatively, optical low-pass filters with varying frequency characteristics instead of ND filters may be inserted in a plurality of apertures whose diameters are evenly reduced in inversely proportional to the F-number. Since the deterioration due to diffraction becomes large with stop-down, it is required that the smaller the aperture diameter, the higher the frequency characteristics of the optical filters be. The higher frequency characteristics mean that the contrast of the spatial frequency of the object image is kept higher than those of other spatial frequencies. In other words, this means that the cutoff frequency is high.

It is here noted that the zoom lens system of the present invention can have a zoom ratio of 2.3 or greater. According to the invention, it is further possible to achieve electronic image pickup equipment comprising a zoom lens system having a zoom ratio of 2.6 or greater.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

An account is now given of Examples 1 through 17 of the zoom lens system used with the electronic image pickup equipment according to the present invention. Shown in FIGS. 1 through 17 are the sections at the wide-angle ends of Examples 1 through 17 upon focused on an object point at infinity. In each drawing, the first lens group is indicated by G1, the second lens group by G2, the third lens group by G3, a near-infrared cut filter by FI, an optical low-pass filter comprising filter elements put one upon another by FL, a cover glass for an image pickup device or a CCD by CG, and the image plane of the CCD by I. The near-infrared cut filter FI, optical low-pass filter FL and cover glass CG located in order from the object side of the image pickup equipment are fixed between the third lens group G3 and the image plane I, with the near-infrared cut filter FI and optical low-pass filter FL cemented together. In Example 12 the near-infrared cut filter FI is not used. In each drawing, a focusing group is shown by "focus" and the direction of focusing on a near-by object is shown by an arrow.

Figure 1:
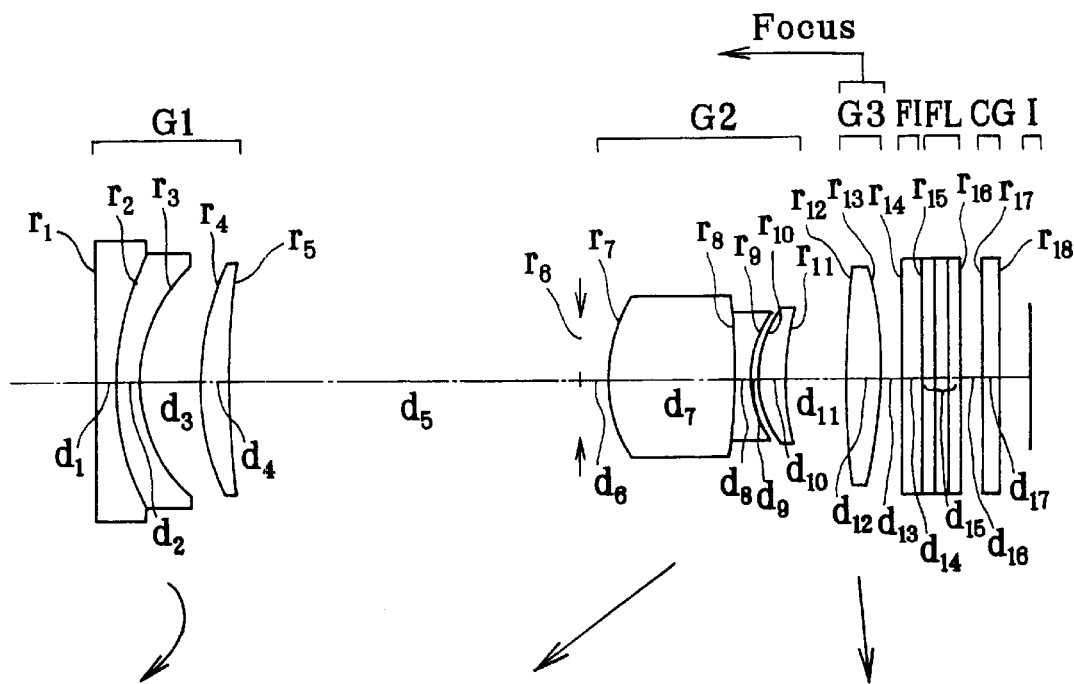
FIG. 1 is a sectional schematic at the wide-angle end of Example 1 of the zoom lens system used on the electronic image pickup equipment according to the present invention upon focused on an object point at infinity.

Example 1 is directed to a zoom lens system which, as shown in FIG. 1, comprises a first lens group G1 having negative refracting power, a second lens group G2 having positive refracting power and a third lens group G3 having positive refracting power. For zooming from the wide-angle end to the telephoto end of the zoom lens system upon focused on an object point at infinity, the first lens group G1 is first moved toward the image side of the zoom lens system and then moved back toward the object side of the zoom lens system to take substantially the same position at the wide-angle and telephoto ends. The second lens group G2 is moved toward the object side and the third lens group G3 is slightly moved toward the image side, so that the separation between the second lens group G2 and the third lens group G3 becomes wide. For focusing on a near-by subject, the third lens group G3 is driven out toward the object side.

In Example 1, the first lens group G1 is composed of a cemented lens consisting of a double-concave lens and a negative meniscus lens convex on its object side and a positive meniscus lens convex on its object side. The second lens group G2 is composed of a stop, a cemented lens located in the rear of the stop and consisting of a double-convex lens and a double-concave lens, and a positive meniscus lens convex on its object side, said double-convex lens defining a positive lens 2a, said double-concave lens defining a negative lens 2b and said positive meniscus lens defining a lens subgroup 2c. The third lens group G3 is composed of one double-convex lens. Three aspherical surfaces are used, one for the surface of the cemented lens in the first lens group G1, which surface is located nearest to its image side, one for the surface in the second lens group G2, which surface is located nearest to its object side, and one for the surface in the second lens group G2, which surface is located nearest to its image side.

Figure 2:
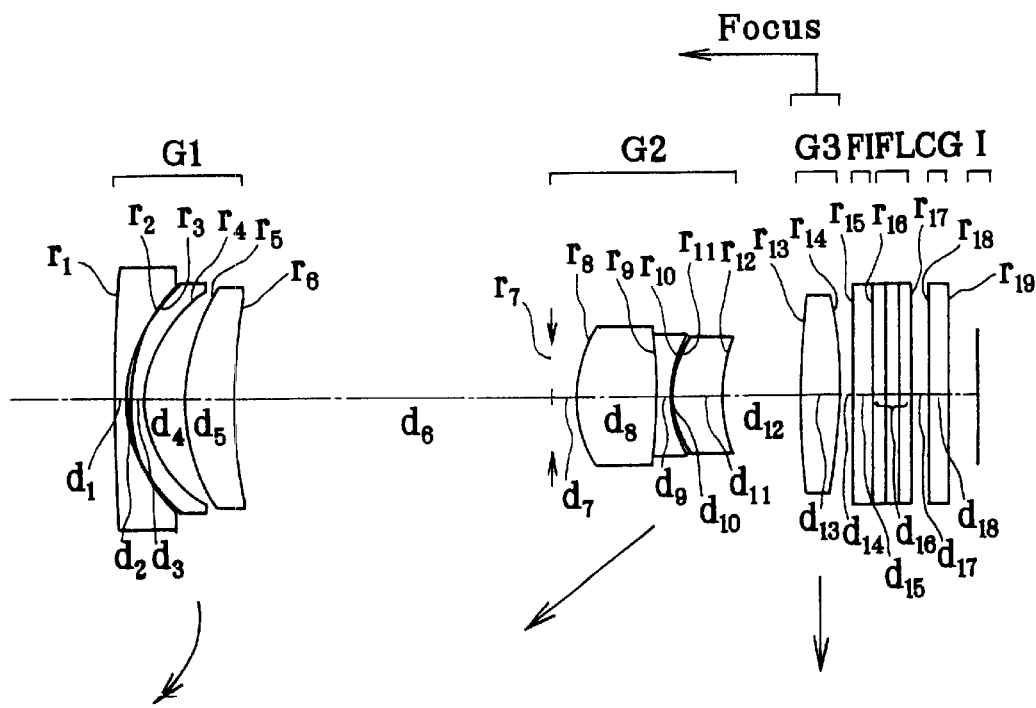
FIG. 2 is a sectional schematic, similar to FIG. 1, of the Example 2 of the zoom lens system.

Example 2 is directed to a zoom lens system which, as shown in FIG. 2, comprises a first lens group G1 having negative refracting power, a second lens group G2 having positive refracting power and a third lens group G3 having positive refracting power. For zooming from the wide-angle end to the telephoto end of the zoom lens system upon focused on an object point at infinity, the first lens group G1 is first moved toward the image side of the zoom lens system and then moved back toward the object side of the zoom lens system to take substantially the same position at the wide-angle and telephoto ends. The second lens group G2 is moved toward the object side and the third lens group G3 is fixed, so that the separation between the second lens group G2 and the third lens group G3 becomes wide. For focusing on a near-by subject, the third lens group G3 is driven out toward the object side.

In Example 2, the first lens group G1 is composed of two negative meniscus lenses, each convex on its object side, and a positive meniscus lens convex on its object side. The second lens group G2 is composed of a stop, a cemented lens located in the rear of the stop and consisting of a double-convex lens and a double-concave lens, and a positive meniscus lens convex on its object side, said double-convex lens defining a positive lens 2a, said double-concave lens defining a negative lens 2b and said positive meniscus lens defining a lens subgroup 2c. The third lens group G3 is composed of one double-convex lens. Two aspherical surfaces are used, one for the object-side surface of the second negative meniscus lens in the first lens group G1 and another for the surface in the second lens group G2, which surface is located nearest to its image side.

Figure 3:
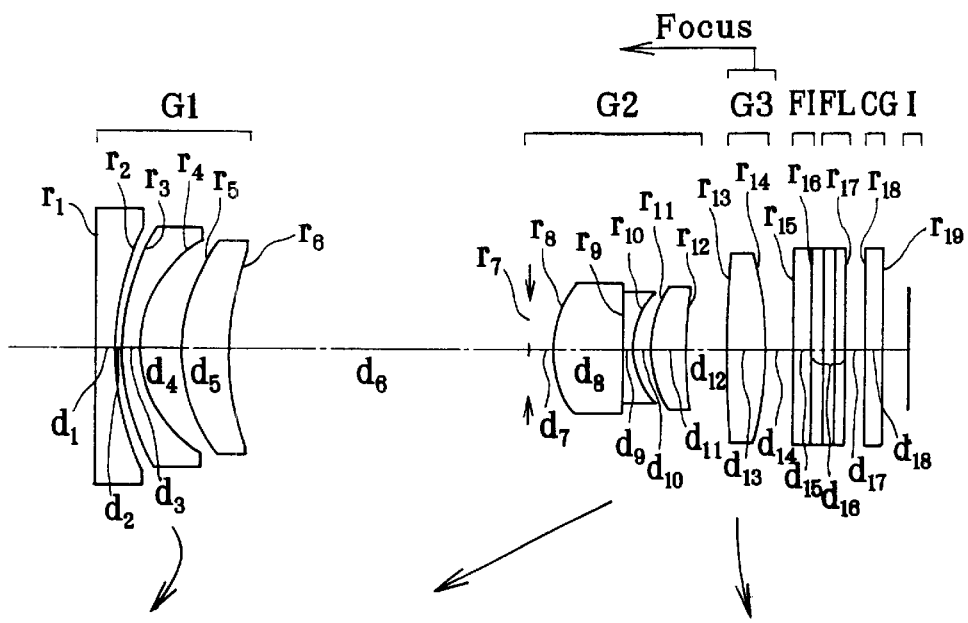
FIG. 3 is a sectional schematic, similar to FIG. 1, of the Example 3 of the zoom lens system.

Example 3 is directed to a zoom lens system which, as shown in FIG. 3, comprises a first lens group G1 having negative refracting power, a second lens group G2 having positive refracting power and a third lens group G3 having positive refracting power. For zooming from the wide-angle end to the telephoto end of the zoom lens system upon focused on an object point at infinity, the first lens group G1 is first moved toward the image side of the zoom lens system and then moved back toward the object side of the zoom lens system to take substantially the same position at the wide-angle and telephoto ends. The second lens group G2 is moved toward the object side and the third lens group G3 is slightly moved toward the image side, so that the separation between the second lens group G2 and the third lens group G3 becomes wide. For focusing on a near-by subject, the third lens group G3 is driven out toward the object side.

In Example 3, the first lens group G1 is composed of a double-concave lens, a negative meniscus lens convex on its object side and a positive meniscus lens convex on its object side. The second lens group G2 is composed of a stop, a cemented lens located in the rear of the stop and consisting of a double-convex lens and a double-concave lens, and a positive meniscus lens convex on its object side, said double-convex lens defining a positive lens 2a, said double-concave lens defining a negative lens 2b and said positive meniscus lens defining a lens subgroup 2c. The third lens group G3 is composed of one double-convex lens. Three aspherical surfaces are used, one for the image-side surface of the double-concave lens in the first lens group G1, one for the surface in the second lens group G2, which surface is located nearest to its object side, and one for the surface in the second lens group G2, which surface is located nearest to its image side.

Figure 4:
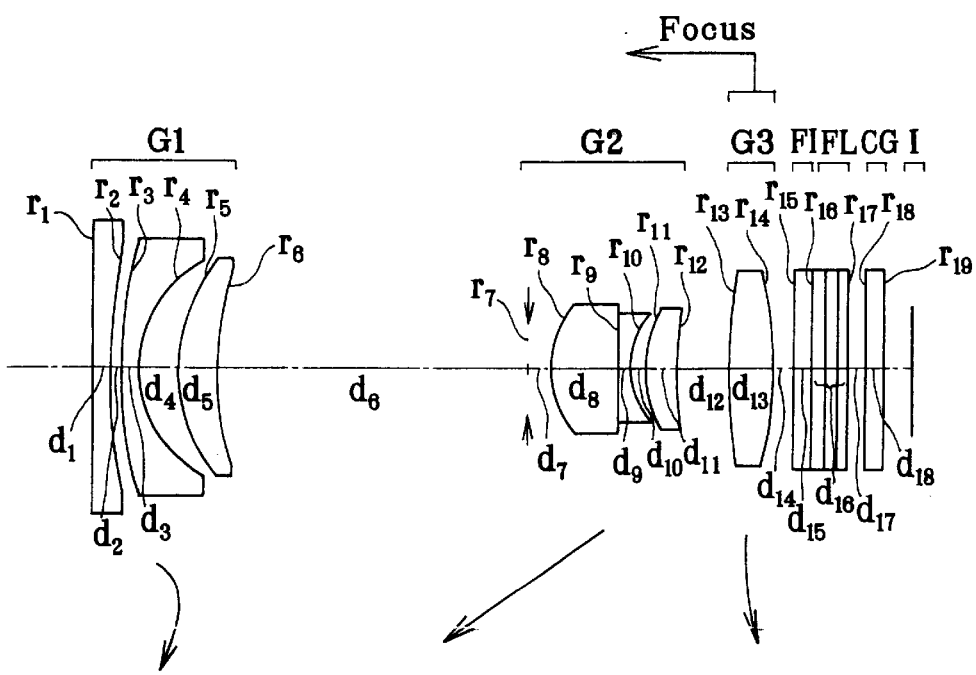
FIG. 4 is a sectional schematic, similar to FIG. 1, of the Example 4 of the zoom lens system.

Example 4 is directed to a zoom lens system which, as shown in FIG. 4, comprises a first lens group G1 having negative refracting power, a second lens group G2 having positive refracting power and a third lens group G3 having positive refracting power. For zooming from the wide-angle end to the telephoto end of the zoom lens system upon focused on an object point at infinity, the first lens group G1 is first moved toward the image side of the zoom lens system and then moved back toward the object side of the zoom lens system to take substantially the same position at the wide-angle and telephoto ends. The second lens group G2 is moved toward the object side and the third lens group G3 is slightly moved toward the image side, so that the separation between the second lens group G2 and the third lens group G3 becomes wide. For focusing on a near-by subject, the third lens group G3 is driven out toward the object side.

In Example 4, the first lens group G1 is composed of a double-concave lens, a negative meniscus lens convex on its object side and a positive meniscus lens convex on its object side. The second lens group G2 is composed of a stop, a cemented lens located in the rear of the stop and consisting of a double-convex lens and a double-concave lens, and a positive meniscus lens convex on its object side, said double-convex lens defining a positive lens 2a, said double-concave lens defining a negative lens 2b and said positive meniscus lens defining a lens subgroup 2c. The third lens group G3 is composed of one double-convex lens. Three aspherical surfaces are used, one for the image-side surface of the double-concave lens in the first lens group G1, one for the surface in the second lens group G2, which surface is located nearest to its object side, and one for the surface in the second lens group G2, which surface is located nearest to its image side.

Figure 5:
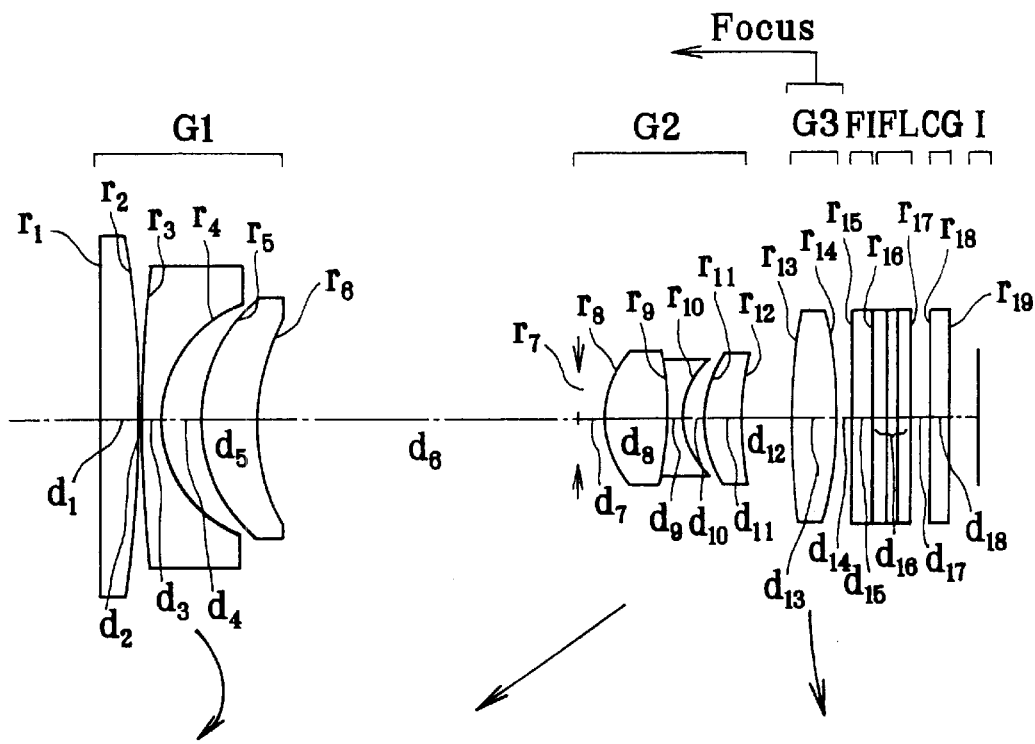
FIG. 5 is a sectional schematic, similar to FIG. 1, of the Example 5 of the zoom lens system.

Example 5 is directed to a zoom lens system which, as shown in FIG. 5, comprises a first lens group G1 having negative refracting power, a second lens group G2 having positive refracting power and a third lens group G3 having positive refracting power. For zooming from the wide-angle end to the telephoto end of the zoom lens system upon focused on an object point at infinity, the first lens group G1 is first moved toward the image side of the zoom lens system and then moved back toward the object side of the zoom lens system to take substantially the same position at the wide-angle and telephoto ends. The second lens group G2 is moved toward the object side and the third lens group G3 is slightly moved toward the image side, so that the separation between the second lens group G2 and the third lens group G3 becomes wide. For focusing on a near-by subject, the third lens group G3 is driven out toward the object side.

In Example 5, the first lens group G1 is composed of a double-convex lens, a negative meniscus lens convex on its object side and a positive meniscus lens convex on its object side. The second lens group G2 is composed of a stop, a cemented lens located in the rear of the stop and consisting of a double-convex lens and a double-concave lens, and a positive meniscus lens convex on its object side, said double-convex lens defining a positive lens 2a, said double-concave lens defining a negative lens 2b and said positive meniscus lens defining a lens subgroup 2c. The third lens group G3 is composed of one double-convex lens. Three aspherical surfaces are used, one for the image-side surface of the double-convex lens in the first lens group G1, one for the surface in the second lens group G2, which surface is located nearest to its object side, and one for the surface in the second lens group G2, which surface is located nearest to its image side.

Figure 6:
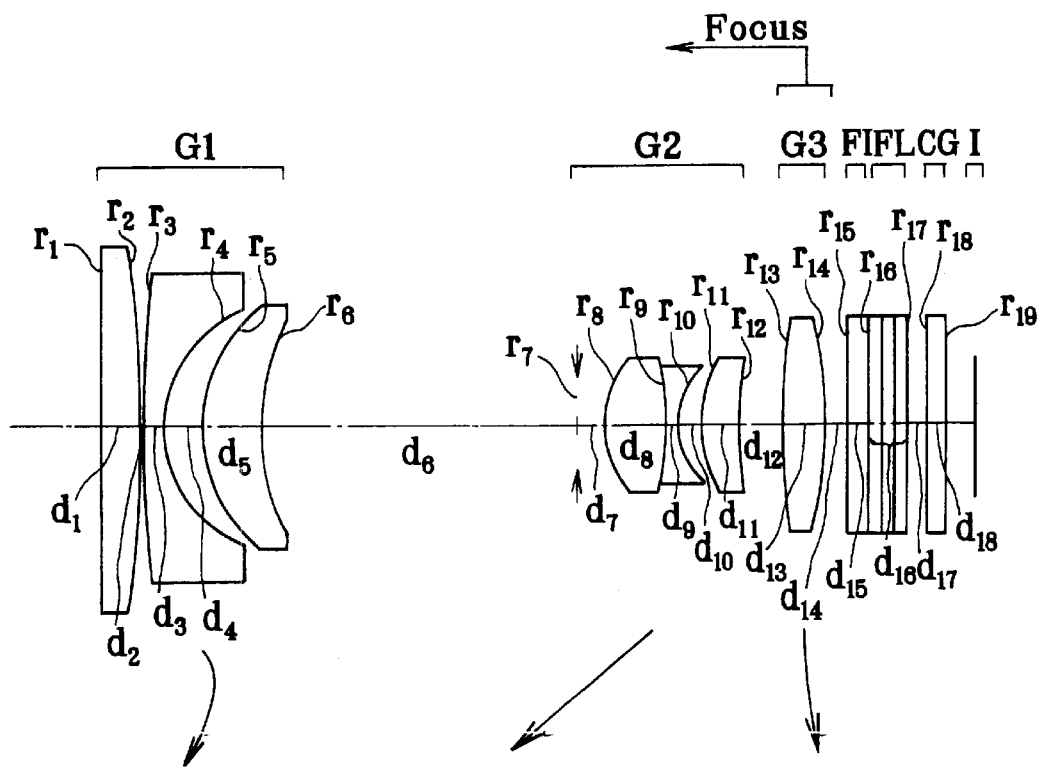
FIG. 6 is a sectional schematic, similar to FIG. 1, of the Example 6 of the zoom lens system.

Example 6 is directed to a zoom lens system which, as shown in FIG. 6, comprises a first lens group G1 having negative refracting power, a second lens group G2 having positive refracting power and a third lens group G3 having positive refracting power. For zooming from the wide-angle end to the telephoto end of the zoom lens system upon focused on an object point at infinity, the first lens group G1 is first moved toward the image side of the zoom lens system and then moved back toward the object side of the zoom lens system to take substantially the same position at the wide-angle and telephoto ends. The second lens group G2 is moved toward the object side and the third lens group G3 is slightly moved toward the image side, so that the separation between the second lens group G2 and the third lens group G3 becomes wide. For focusing on a near-by subject, the third lens group G3 is driven out toward the object side.

In Example 6, the first lens group G1 is composed of a planoconvex lens, a negative meniscus lens convex on its object side and a positive meniscus lens convex on its object side. The second lens group G2 is composed of a stop, a cemented lens located in the rear of the stop and consisting of a double-convex lens and a double-concave lens, and a positive meniscus lens convex on its object side, said double-convex lens defining a positive lens 2a, said double-concave lens defining a negative lens 2b and said positive meniscus lens defining a lens subgroup 2c. The third lens group G3 is composed of one double-convex lens. Three aspherical surfaces are used, one for the image-side surface of the planoconvex lens in the first lens group G1, one for the surface in the second lens group G2, which surface is located nearest to its object side, and one for the surface in the second lens group G2, which surface is located nearest to its image side.

Figure 7:
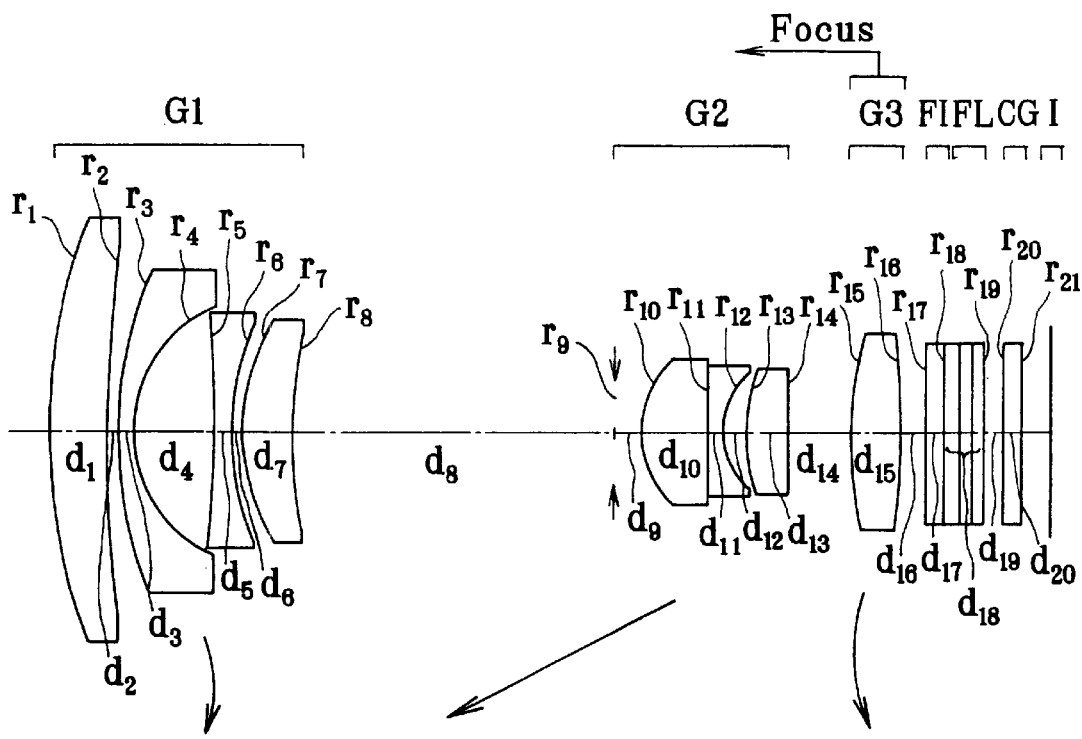
FIG. 7 is a sectional schematic, similar to FIG. 1, of the Example 7 of the zoom lens system.

Example 7 is directed to a zoom lens system which, as shown in FIG. 7, comprises a first lens group G1 having negative refracting power, a second lens group G2 having positive refracting power and a third lens group G3 having positive refracting power. For zooming from the wide-angle end to the telephoto end of the zoom lens system upon focused on an object point at infinity, the first lens group G1 is first moved toward the image side of the zoom lens system and then moved back toward the object side of the zoom lens system, so that the first lens group G1 is positioned somewhat nearer to the image side at the telephoto end than at the wide-angle end of the zoom lens system. The second lens group G2 is moved toward the object side and the third lens group G3 is first moved toward the object side and then moved back toward the image side, so that the separation between the second lens group G2 and the third lens group G3 becomes wide. For focusing on a near-by subject, the third lens group G3 is driven out toward the object side.

In Example 7, the first lens group G1 is composed of a positive meniscus lens convex on its object side, a negative meniscus lens convex on its object side, a double-concave lens and a positive meniscus lens convex on its object side. The second lens group G2 is composed of a stop, a cemented lens located in the rear of the stop and consisting of a planoconvex lens and a planoconcave lens, and a double-convex lens, said planoconvex lens defining a positive lens 2a, said planoconcave lens defining a negative lens 2b and said double-convex lens defining a lens subgroup 2c. The third lens group G3 is composed of one double-convex lens. Two aspherical surfaces are used, one for the surface in the second lens group G2, which surface is located nearest to its object side, and another for the object-side surface of the final double-convex lens in the second lens group G2.

Figure 8:
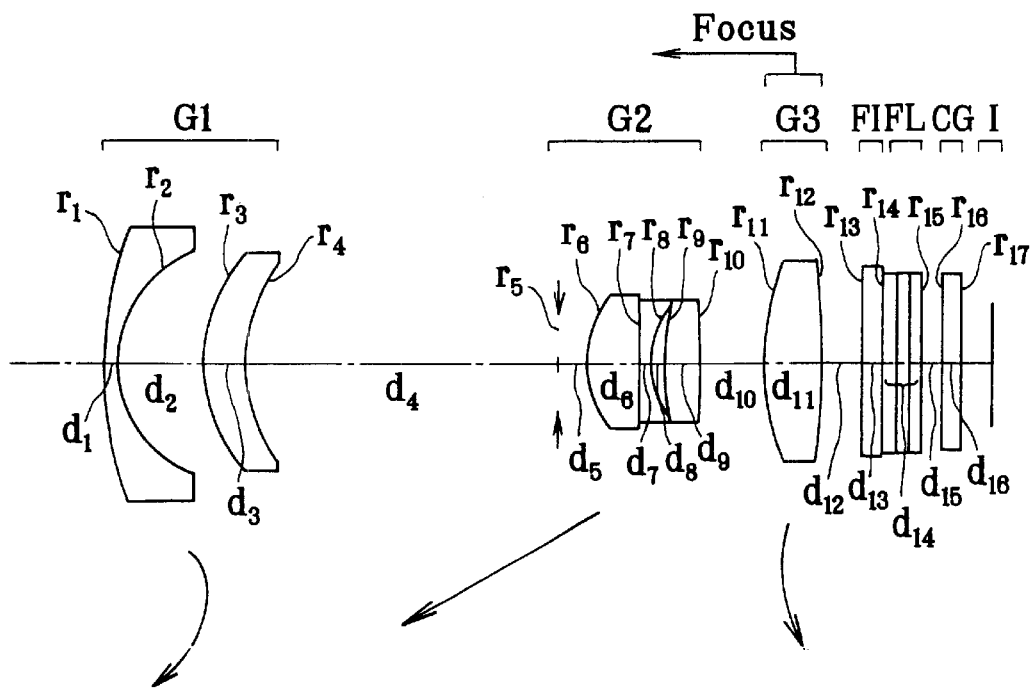
FIG. 8 is a sectional schematic, similar to FIG. 1, of the Example 8 of the zoom lens system.

Example 8 is directed to a zoom lens system which, as shown in FIG. 8, comprises a first lens group G1 having negative refracting power, a second lens group G2 having positive refracting power and a third lens group G3 having positive refracting power. For zooming from the wide-angle end to the telephoto end of the zoom lens system upon focused on an object point at infinity, the first lens group G1 is first moved toward the image side of the zoom lens system and then moved back toward the object side of the zoom lens system, so that the first lens group G1 is positioned somewhat nearer to the object side at the telephoto end than at the wide-angle end of the zoom lens system. The second lens group G2 is moved toward the object side and the third lens group G3 is first moved toward the object side and then moved back toward the image side, so that the separation between the second lens group G2 and the third lens group G3 becomes wide. For focusing on a near-by subject, the third lens group G3 is driven out toward the object side.

In Example 8, the first lens group G1 is composed of a negative meniscus lens convex on its object side and a positive meniscus lens convex on its object side. The second lens group G2 is composed of a stop, a cemented lens located in the rear of the stop and consisting of a positive meniscus lens convex on its object side and a negative meniscus lens convex on its object side, and a double-convex lens, said positive meniscus lens defining a positive lens 2a, said negative meniscus lens defining a negative lens 2b and said double-convex lens defining a lens subgroup 2c. The third lens group G3 is composed of one double-convex lens. Three aspherical surfaces are used, one for the surface in the first lens group G1, which surface is located nearest to its object side, one for the surface in the second lens group G2, which surface is located nearest to its object side and one for the object-side surface of the double-convex lens in the second lens group G2.

Figure 9:
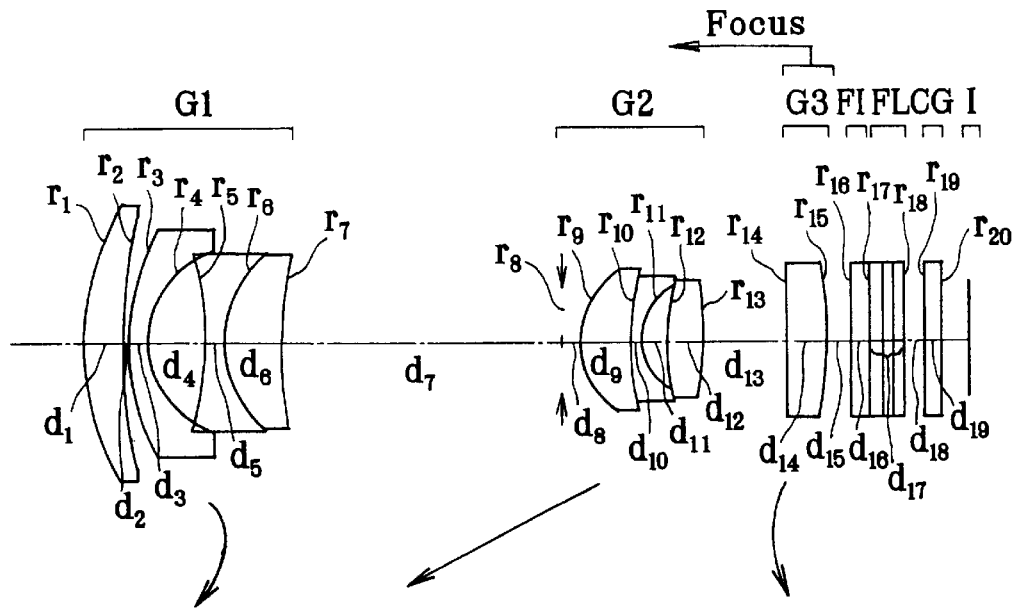
FIG. 9 is a sectional schematic, similar to FIG. 1, of the Example 9 of the zoom lens system.

Example 9 is directed to a zoom lens system which, as shown in FIG. 9, comprises a first lens group G1 having negative refracting power, a second lens group G2 having positive refracting power and a third lens group G3 having positive refracting power. For zooming from the wide-angle end to the telephoto end of the zoom lens system upon focused on an object point at infinity, the first lens group G1 is first moved toward the image side of the zoom lens system and then moved back toward the object side of the zoom lens system to take substantially the same position at the telephoto and wide-angle ends of the zoom lens system. The second lens group G2 is moved toward the object side and the third lens group G3 is first moved toward the object side and then moved back toward the image side, so that the separation between the second lens group G2 and the third lens group G3 becomes wide. For focusing on a near-by subject, the third lens group G3 is driven out toward the object side.

In Example 9, the first lens group G1 is composed of a positive meniscus lens convex on its object side, a negative meniscus lens convex on its object side and a cemented lens consisting of a double-concave lens and a positive meniscus lens convex on its object side. The second lens group G2 is composed of a stop, a cemented lens located in the rear of the stop and consisting of a positive meniscus lens convex on its object side and a negative meniscus lens convex on its object side, and a double-convex lens, said positive meniscus lens defining a positive lens 2a, said negative meniscus lens defining a negative lens 2b and said double-convex lens defining a lens subgroup 2c. The third lens group is composed of one double-convex lens. Two aspherical surfaces are used, one for the surface in the second lens group G2, which surface is located nearest to its object side, and one for the object-side surface of the double-convex lens in the second lens group G2.

Figure 10:
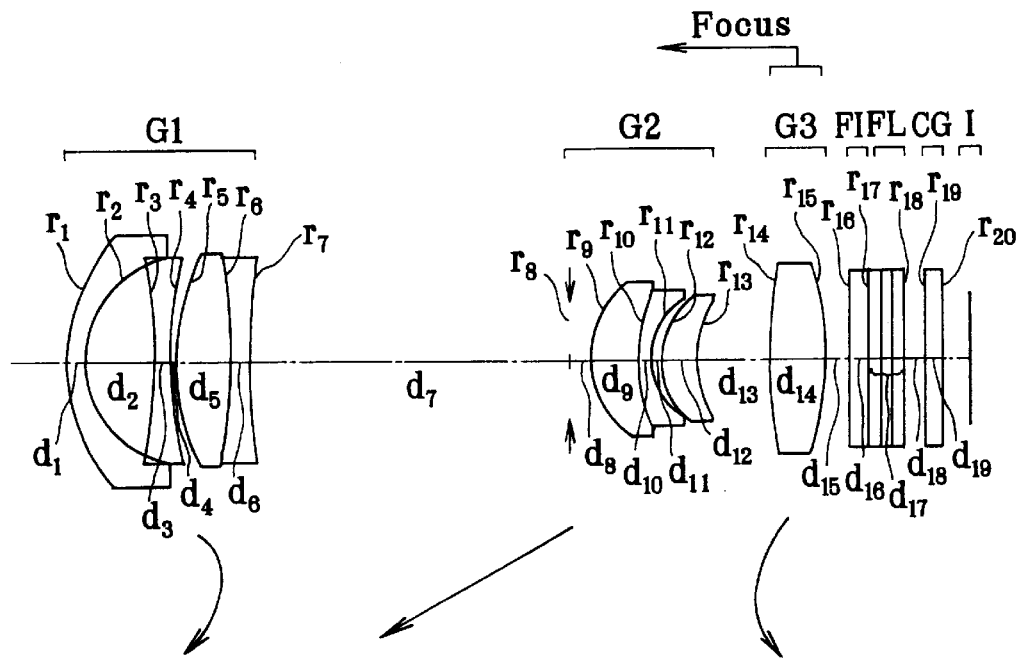
FIG. 10 is a sectional schematic, similar to FIG. 1, of the Example 10 of the zoom lens system.

Example 10 is directed to a zoom lens system which, as shown in FIG. 10, comprises a first lens group G1 having negative refracting power, a second lens group G2 having positive refracting power and a third lens group G3 having positive refracting power. For zooming from the wide-angle end to the telephoto end of the zoom lens system upon focused on an object point at infinity, the first lens group G1 is first moved toward the image side of the zoom lens system and then moved back toward the object side of the zoom lens system to take substantially the same position at the telephoto and wide-angle ends of the zoom lens system. The second lens group G2 is moved toward the object side and the third lens group G3 is first moved toward the object side and then moved back toward the image side, so that the separation between the second lens group G2 and the third lens group G3 becomes wide. For focusing on a near-by subject, the third lens group G3 is driven out toward the object side.

In Example 10, the first lens group G1 is composed of a negative meniscus lens convex on its object side, a double-concave lens and a cemented lens consisting of a double-convex lens and a double-concave lens. The second lens group G2 is composed of a stop, a cemented lens located in the rear of the stop and consisting of a positive meniscus lens convex on its object side and a negative meniscus lens convex on its object side, and a positive meniscus lens convex on its object side, said positive meniscus lens defining a positive lens 2a, said negative meniscus lens defining a negative lens 2b and the final positive meniscus lens defining a lens subgroup 2c. The third lens group is composed of one double-convex lens. Three aspherical surfaces are used, one for the surface of the cemented lens in the first lens group G1, which surface is located nearest to its object side, one for the surface in the second lens group G2, which surface is located nearest to its object side, and one for the surface in the second lens group G2, which surface is located nearest to its image side.

Figure 11:
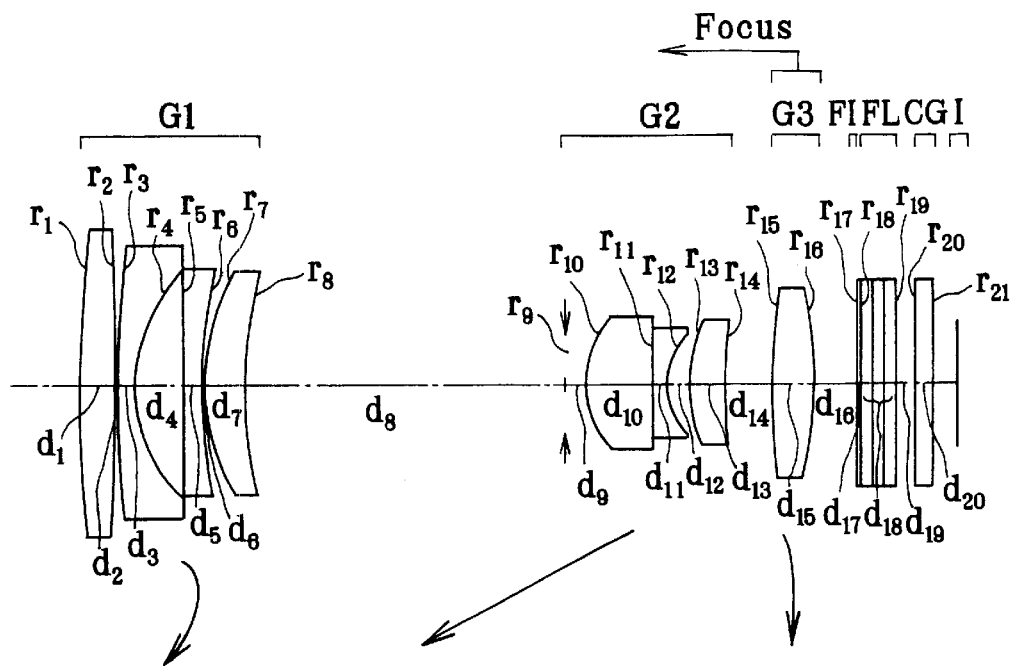
FIG. 11 is a sectional schematic, similar to FIG. 1, of the Example 11 of the zoom lens system.

Example 11 is directed to a zoom lens system which, as shown in FIG. 11, comprises a first lens group G1 having negative refracting power, a second lens group G2 having positive refracting power and a third lens group G3 having positive refracting power. For zooming from the wide-angle end to the telephoto end of the zoom lens system upon focused on an object point at infinity, the first lens group G1 is first moved toward the image side of the zoom lens system and then moved back toward the object side of the zoom lens system, so that the first lens group G1 is positioned somewhat nearer to the image side at the telephoto end than at the wide-angle end. The second lens group G2 is moved toward the object side and the third lens group G3 is slightly moved toward the image side, so that the separation between the second lens group G2 and the third lens group G3 becomes wide. For focusing on a near-by subject, the third lens group G3 is driven out toward the object side.

In Example 11, the first lens group G1 is composed of a double-convex lens, a negative meniscus lens convex on its object side, a double-concave lens and a positive meniscus lens convex on its object side. The second lens group G2 is composed of a stop, a cemented lens located in the rear of the stop and consisting of a double-convex lens and a double-concave lens, and a positive meniscus lens convex on its object side, said double-convex lens defining a positive lens 2a, said double-concave lens defining a negative lens 2b and said positive meniscus lens defining a lens subgroup 2c. The third lens group G3 is composed of one double-convex lens. Two aspherical surfaces are used, one for the surface in the second lens group G2, which surface is located nearest to its object side, and another for the object-side surface of the positive meniscus lens in the second lens group G2.

Figure 12:
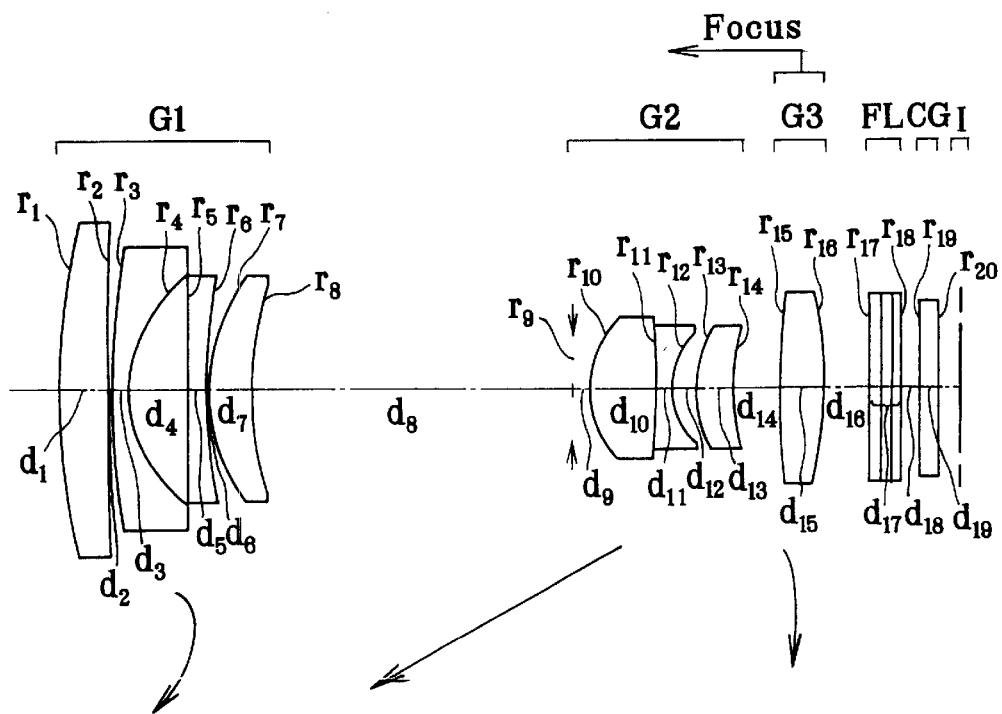
FIG. 12 is a sectional schematic, similar to FIG. 1, of the Example 12 of the zoom lens system.

Example 12 is directed to a zoom lens system which, as shown in FIG. 12, comprises a first lens group G1 having negative refracting power, a second lens group G2 having positive refracting power and a third lens group G3 having positive refracting power. For zooming from the wide-angle end to the telephoto end of the zoom lens system upon focused on an object point at infinity, the first lens group G1 is first moved toward the image side of the zoom lens system and then moved back toward the object side of the zoom lens system, so that the first lens group G1 is positioned somewhat nearer to the image side at the telephoto end than at the wide-angle end. The second lens group G2 is moved toward the object side and the third lens group G3 is slightly moved toward the image side, so that the separation between the second lens group G2 and the third lens group G3 becomes wide. For focusing on a near-by subject, the third lens group G3 is driven out toward the object side.

In Example 12, the first lens group G1 is composed of a positive meniscus lens convex on its object side, a negative meniscus lens convex on its object side, a planoconcave lens and a positive meniscus lens convex on its object side. The second lens group G2 is composed of a stop, a cemented lens located in the rear of the stop and consisting of a double-convex lens and a double-concave lens, and a positive meniscus lens convex on its object side, said double-convex lens defining a positive lens 2a, said double-concave lens defining a negative lens 2b and said positive meniscus lens defining a lens subgroup 2c. The third lens group G3 is composed of one double-convex lens. Two aspherical surfaces are used, one for the surface in the second lens group G2, which surface is located nearest to its object side, and another for the image-side surface of the positive meniscus lens in the second lens group G2.

Figure 13:
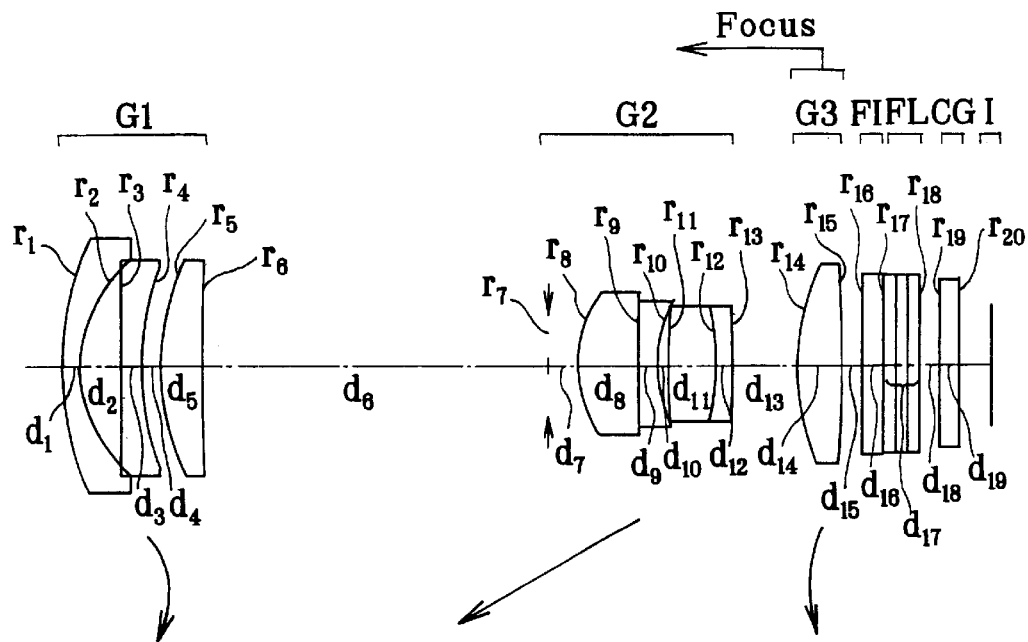
FIG. 13 is a sectional schematic, similar to FIG. 1, of the Example 13 of the zoom lens system.

Example 13 is directed to a zoom lens system which, as shown in FIG. 13, comprises a first lens group G1 having negative refracting power, a second lens group G2 having positive refracting power and a third lens group G3 having positive refracting power. For zooming from the wide-angle end to the telephoto end of the zoom lens system upon focused on an object point at infinity, the first lens group G1 is first moved toward the image side of the zoom lens system and then moved back toward the object side of the zoom lens system, so that the first lens group G1 is positioned somewhat nearer to the image side at the telephoto end than at the wide-angle end. The second lens group G2 is moved toward the object side and the third lens group G3 is first moved toward the object side and then moved back toward the image side, so that the separation between the second lens group G2 and the third lens group G3 becomes wide. For focusing on a near-by subject, the third lens group G3 is driven out toward the object side.

In Example 13, the first lens group G1 is composed of a negative meniscus lens convex on its object side, a double-concave lens and a positive meniscus lens convex on its object side. The second lens group G2 is composed of a stop, a cemented lens located in the rear of the stop and consisting of a positive meniscus lens convex on its object side and a negative meniscus lens convex on its object side, and a cemented lens consisting of a double-convex lens and a negative meniscus lens convex on its object side, said positive meniscus lens defining a positive lens 2a, said negative meniscus lens defining a negative lens 2b and said cemented lens consisting of a double-convex lens and a negative meniscus lens defining a lens subgroup 2c. The third lens group G3 is composed of one double-convex lens. Two aspherical surfaces are used, one for the image-side surface of the negative meniscus lens in the first lens group G1 and another for the surface of the second cemented lens in the second lens group G2, which surface is located nearest to its object side.

Figure 14:
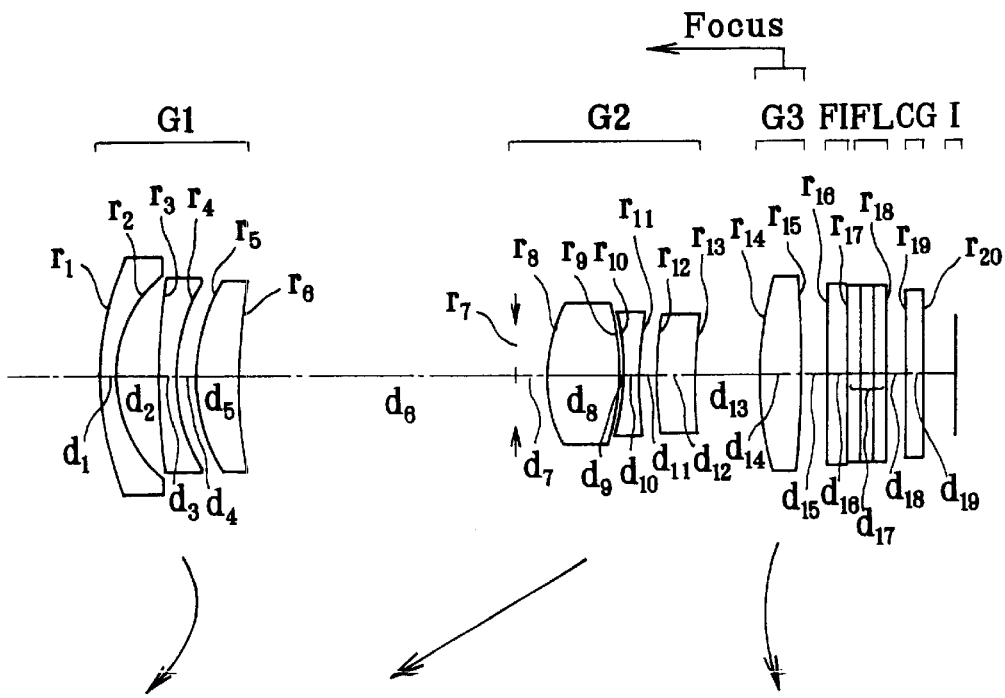
FIG. 14 is a sectional schematic, similar to FIG. 1, of the Example 14 of the zoom lens system.

Example 14 is directed to a zoom lens system which, as shown in FIG. 14, comprises a first lens group G1 having negative refracting power, a second lens group G2 having positive refracting power and a third lens group G3 having positive refracting power. For zooming from the wide-angle end to the telephoto end of the zoom lens system upon focused on an object point at infinity, the first lens group G1 is first moved toward the image side of the zoom lens system and then moved back toward the object side of the zoom lens system, so that the first lens group G1 is positioned somewhat nearer to the object side at the telephoto end than at the wide-angle end. The second lens group G2 is moved toward the object side and the third lens group G3 is first moved toward the object side and then moved back toward the image side, so that the separation between the second lens group G2 and the third lens group G3 becomes wide. For focusing on a near-by subject, the third lens group G3 is driven out toward the object side.

In Example 14, the first lens group G1 is composed of two negative meniscus lenses, each convex on its object side, and a positive meniscus lens convex on its object side. The second lens group G2 is composed of a stop, a double-convex lens located in the rear of the stop, a double-concave lens and a positive meniscus lens convex on its object side, said double-convex lens defining a positive lens 2a, said double-concave lens defining a negative lens 2b and said positive meniscus lens defining a lens subgroup 2c. The third lens group G3 is composed of one double convex lens. Two aspherical surfaces are used, one for the image-side surface of the first negative meniscus lens in the first lens group G1 and another for the image-side surface of the positive meniscus lens in the second lens group G2.

Figure 15:
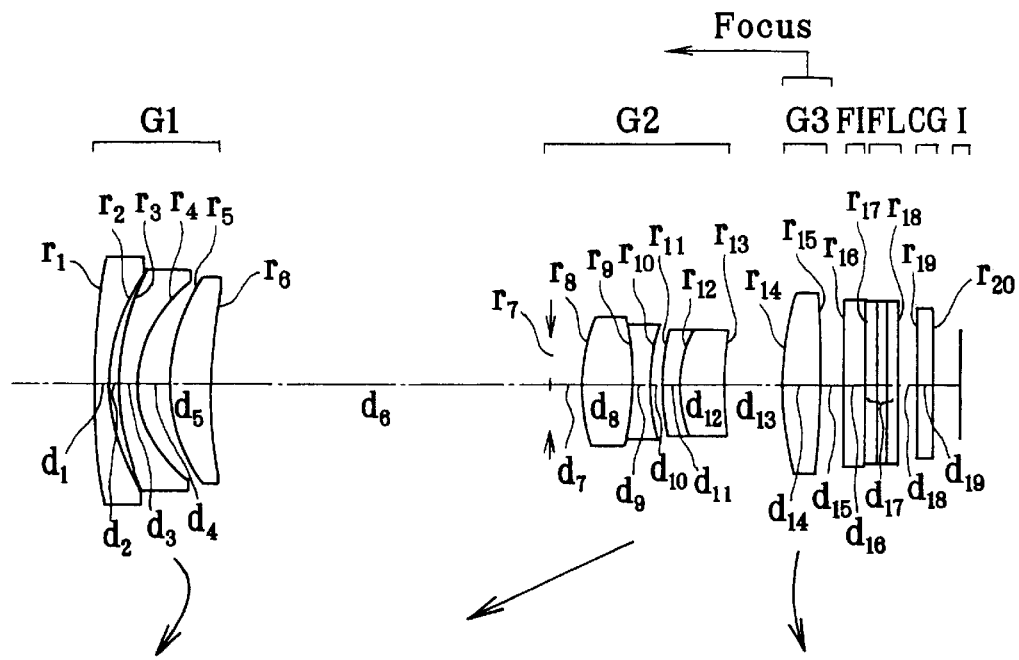
FIG. 15 is a sectional schematic, similar to FIG. 1, of the Example 15 of the zoom lens system.

Example 15 is directed to a zoom lens system which, as shown in FIG. 15, comprises a first lens group G1 having negative refracting power, a second lens group G2 having positive refracting power and a third lens group G3 having positive refracting power. For zooming from the wide-angle end to the telephoto end of the zoom lens system upon focused on an object point at infinity, the first lens group G1 is first moved toward the image side of the zoom lens system and then moved back toward the object side of the zoom lens system, so that the first lens group G1 is positioned somewhat nearer to the image side at the telephoto end than at the wide-angle end. The second lens group G2 is moved toward the object side and the third lens group G3 is first moved toward the object side and then moved back toward the image side, so that the separation between the second lens group G2 and the third lens group G3 becomes wide. For focusing on a near-by subject, the third lens group G3 is driven out toward the object side.

In Example 15, the first lens group G1 is composed of two negative meniscus lenses, each convex on its object side, and a positive meniscus lens convex on its object side. The second lens group G2 is composed of a stop, a cemented lens located in the rear of the stop and consisting of a double-convex lens and a double-concave lens, and a cemented lens consisting of a negative meniscus lens convex on its objet side and a positive meniscus lens convex on its object side, said double-convex lens defining a positive lens 2a, said double-concave lens defining a negative lens 2b and said cemented lens consisting of a negative meniscus lens and a positive meniscus lens defining a lens subgroup 2c. The third lens group is composed of one double-convex lens. Three aspherical surfaces are used, one for the image-side surface of the negative meniscus lens in the first lens group G1, one for the surface in the second lens group G2, which surface is located nearest to its object side, and one for the surface in the second lens group G2, which surface is located nearest to its image side.

Figure 16:
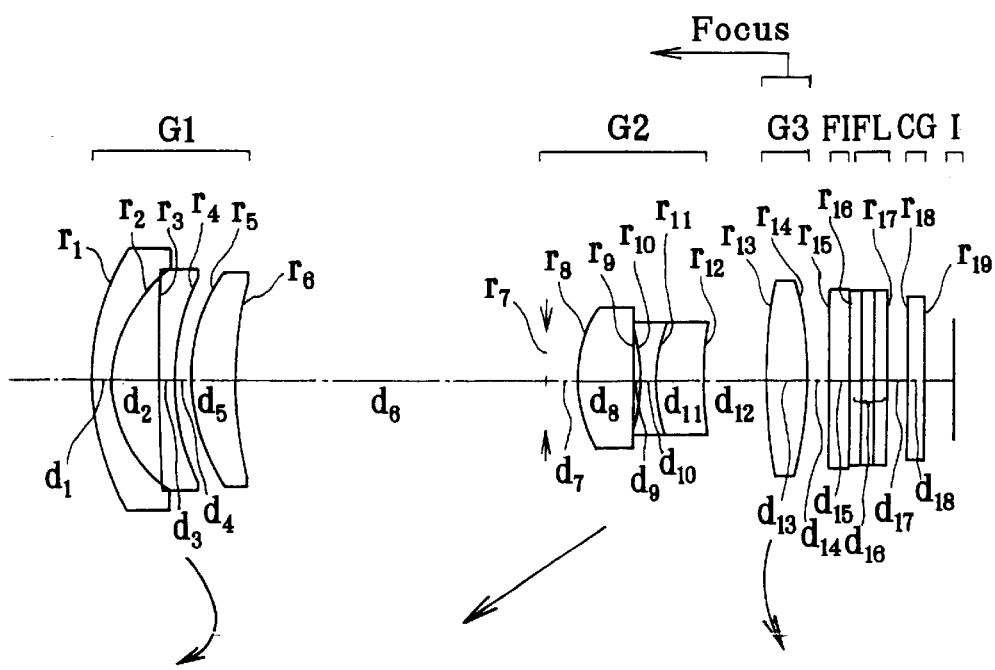
FIG. 16 is a sectional schematic, similar to FIG. 1, of the Example 16 of the zoom lens system.

Example 16 is directed to a zoom lens system which, as shown in FIG. 16, comprises a first lens group G1 having negative refracting power, a second lens group G2 having positive refracting power and a third lens group G3 having positive refracting power. For zooming from the wide-angle end to the telephoto end of the zoom lens system upon focused on an object point at infinity, the first lens group G1 is first moved toward the image side of the zoom lens system and then moved back toward the object side of the zoom lens system, so that the first lens group G1 is positioned somewhat nearer to the image side at the telephoto end than at the wide-angle end. The second lens group G2 is moved toward the object side and the third lens group G3 is first moved toward the object side and then moved back toward the image side, so that the separation between the second lens group G2 and the third lens group G3 becomes wide. For focusing on a near-by subject, the third lens group G3 is driven out toward the object side.

In Example 16, the first lens group G1 is composed of two negative meniscus lenses, each convex on its object side, and a positive meniscus lens convex on its object side. The second lens group G2 is composed of a stop, a double-convex lens located in the rear of the stop and a cemented lens consisting of a double-concave lens and a positive meniscus lens convex on its object side, said double-convex lens defining a positive lens 2a, said double-concave lens defining a negative lens 2b and said positive meniscus lens defining a lens subgroup 2c. The third lens group G3 is composed of one double-convex lens. Three aspherical surfaces are used, one for the image-side surface of the first negative meniscus lens in the first lens group G1, one for the surface in the second lens group G2, which surface is located nearest to its object side, and one the surface in the second lens group G2, which surface is located nearest to its image side.

Figure 17:
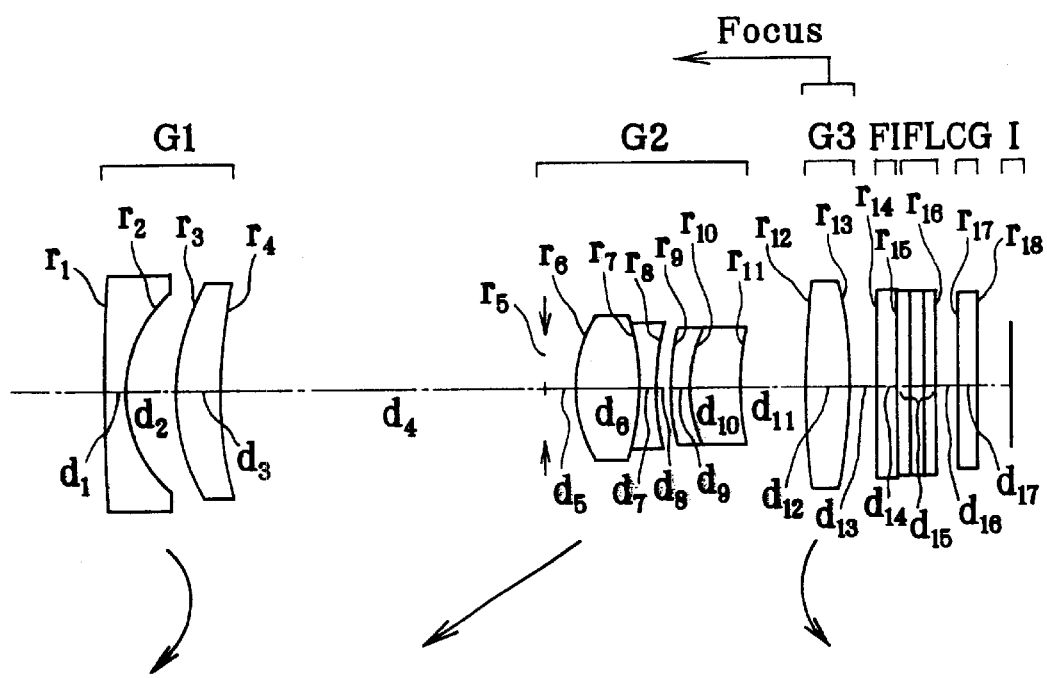
FIG. 17 is a sectional schematic, similar to FIG. 1, of the Example 17 of the zoom lens system.

Example 17 is directed to a zoom lens system which, as shown in FIG. 17, comprises a first lens group G1 having negative refracting power, a second lens group G2 having positive refracting power and a third lens group G3 having positive refracting power. For zooming from the wide-angle end to the telephoto end of the zoom lens system upon focused on an object point at infinity, the first lens group G1 is first moved toward the image side of the zoom lens system and then moved back toward the object side of the zoom lens system, so that the first lens group G1 is positioned somewhat nearer to the image side at the telephoto end than at the wide-angle end. The second lens group G2 is moved toward the object side and the third lens group G3 is first moved toward the object side and then moved back toward the image side, so that the separation between the second lens group G2 and the third lens group G3 becomes wide. For focusing on a near-by subject, the third lens group G3 is driven out toward the object side.

In Example 17, the first lens group G1 is composed of a negative meniscus lens convex on its object side and a positive meniscus lens convex on its object side. The second lens group G2 is composed of a stop, a cemented lens located in the rear of the stop and consisting of a double-convex lens and a double-concave lens, and a cemented lens consisting of a negative meniscus lens convex on its object side and a positive meniscus lens convex on its object side, said double-convex lens defining a positive lens 2a, said double-concave lens defining a negative lens 2b and said cemented lens consisting of a negative meniscus lens and a positive meniscus lens defining a lens subgroup 2c. The third lens group G3 is composed of one double-convex lens. Three aspherical surfaces are used, one for the image-side surface of the negative meniscus lens in the first lens group G1, one for the surface in the second lens group G2, which surface is located nearest to its object side, and one the surface in the second lens group G2, which surface is located nearest to its image side.

Set out below are numerical data on each example. Symbols used hereinafter but not hereinbefore have the following meanings.

f: the focal length of the zoom lens system,

ω: half field angle, $F_{NO}$: F-number,

FB: back focus,

WE: wide-angle end.

ST: intermediate settings,

TE: telephoto end, $r_1, r_2, \ldots$: the radius of curvature of each lens surface, $d_1, d_2, \ldots$: the separation between adjacent lens surfaces, $n_{d1}, n_{d2}, \ldots$: the d-line refractive index of each lens, and $v_{d1}, v_{d2}, \ldots$: the Abbe number of each lens.

Here let x denote an optical axis where the direction of propagation of light is positive and y represent a direction perpendicular to the optical axis. Then, aspherical configuration is given by $$x=(y^2/r)/[1+\{1-(K+1)(y/r)^2\}^{1/2}]+A_4 y^4+A_6 y^6+A_8 y^8+A_{10} y^{10}$$

where r is the paraxial radius of curvature, K is a conical coefficient, and $A_4$, $A_6$, $A_8$ and $A_{10}$ are the fourth, sixth, eighth, and tenth aspherical coefficients, respectively.

EXAMPLE 1

| | | |
|---|---|---|
| $r_1 = -299.4763$ | $d_1 = 0.8000$ | $n_{d1} = 1.80610$ $\nu_{d1} = 40.92$ |
| $r_2 = 10.7304$ | $d_2 = 0.8000$ | $n_{d2} = 1.69350$ $\nu_{d2} = 53.21$ |
| $r_3 = 5.0005$ (Aspheric) | $d_3 = 2.3163$ | |
| $r_4 = 9.8142$ | $d_4 = 1.0491$ | $n_{d3} = 1.84666$ $\nu_{d3} = 23.78$ |
| $r_5 = 24.5391$ | $d_5 =$ (Variable) | |
| $r_6 = \infty$ (Stop) | $d_6 = 1.0000$ | |
| $r_7 = 5.1442$ (Aspheric) | $d_7 = 4.9417$ | $n_{d4} = 1.80610$ $\nu_{d4} = 40.92$ |
| $r_8 = -24.5946$ | $d_8 = 0.5000$ | $n_{d5} = 1.84666$ $\nu_{d5} = 23.78$ |
| $r_9 = 3.5926$ | $d_9 = 0.2907$ | |
| $r_{10} = 4.2678$ | $d_{10} = 1.1213$ | $n_{d6} = 1.69350$ $\nu_{d6} = 53.21$ |
| $r_{11} = 17.4260$ (Aspheric) | $d_{11} =$ (Variable) | |
| $r_{12} = 32.3232$ | $d_{12} = 1.3472$ | $n_{d7} = 1.80610$ $\nu_{d7} = 40.92$ |
| $r_{13} = -16.8384$ | $d_{13} =$ (Variable) | |
| $r_{14} = \infty$ | $d_{14} = 0.8000$ | $n_{d8} = 1.51633$ $\nu_{d8} = 64.14$ |
| $r_{15} = \infty$ | $d_{15} = 1.5000$ | $n_{d9} = 1.54771$ $\nu_{d9} = 62.84$ |
| $r_{16} = \infty$ | $d_{16} = 0.8000$ | |
| $r_{17} = \infty$ | $d_{17} = 0.7500$ | $nd_{d10} = 1.51633$ $\nu_{d10} = 64.14$ |
| $r_{18} = \infty$ | | |

Aspherical Coefficients

3rd surface
K=0
$A_4 = -9.7049 \times 10^{-4}$
$A_6 = 1.6918 \times 10^{-8}$
$A_8 = -1.9046 \times 10^{-6}$
$A_{10} = 0$ 7th surface
K=0
$A_4 = -3.2379 \times 10^{-4}$
$A_6 = -3.5165 \times 10^{-7}$
$A_8 = -1.0605 \times 10^{-6}$
$A_{10} = 0$ 11th surface
K0
$A_4 = 2.0613 \times 10^{-3}$
$A_6 = 8.6770 \times 10^{-5}$
$A_8 = 7.3857 \times 10^{-6}$
$A_{10} = 0$ Zooming Data (∞)

| | WE | ST | TE |
|---|---|---|---|
| f (mm) | 4.50482 | 8.71981 | 12.89361 |
| $F_{NO}$ | 2.5014 | 3.5154 | 4.5000 |
| ω (°) | 32.1 | 17.9 | 12.3 |
| F B (mm) | 1.2022 | 1.2022 | 1.2022 |
| $d_5$ | 13.21884 | 4.97007 | 2.00000 |
| $d_{11}$ | 2.16583 | 7.95914 | 13.39659 |
| $d_{13}$ | 0.76457 | 0.59671 | 0.59784 |

EXAMPLE 2

| | | |
|---|---|---|
| $r_1 = 124.1886$ | $d_1 = 0.5000$ | $n_{d1} = 1.80610$ $\nu_{d1} = 40.92$ |
| $r_2 = 6.4891$ | $d_2 = 0.2000$ | |
| $r_3 = 8.8097$ (Aspheric) | $d_3 = 0.5000$ | $n_{d2} = 1.69350$ $\nu_{d2} = 53.21$ |
| $r_4 = 5.1613$ | $d_4 = 1.5167$ | |
| $r_5 = 7.8189$ | $d_5 = 1.9968$ | $n_{d3} = 1.84666$ $\nu_{d3} = 23.78$ |
| $r_6 = 22.4795$ | $d_6 =$ (Variable) | |
| $r_7 = \infty$ (Stop) | $d_7 = 1.0000$ | |
| $r_8 = 5.7490$ | $d_8 = 3.2514$ | $n_{d4} = 1.83400$ $\nu_{d4} = 37.16$ |
| $r_9 = -28.3433$ | $d_9 = 0.5000$ | $n_{d5} = 1.84666$ $\nu_{d5} = 23.78$ |
| $r_{10} = 4.4271$ | $d_{10} = 0.0037$ | |
| $r_{11} = 3.8345$ | $d_{11} = 2.1860$ | $n_{d6} = 1.69350$ $\nu_{d6} = 53.21$ |
| $r_{12} = 9.6822$ (Aspheric) | $d_{12} =$ (Variable) | |
| $r_{13} = 28.5044$ | $d_{13} = 1.6870$ | $n_{d7} = 1.80610$ $\nu_{d7} = 40.92$ |
| $r_{14} = -18.4888$ | $d_{14} = 0.5000$ | |
| $r_{15} = \infty$ | $d_{15} = 0.8000$ | $n_{d8} = 1.51633$ $\nu_{d8} = 64.14$ |
| $r_{16} = \infty$ | $d_{16} = 1.5000$ | $n_{d9} = 1.54771$ $\nu_{d9} = 62.84$ |
| $r_{17} = \infty$ | $d_{17} = 0.8000$ | |
| $r_{18} = \infty$ | $d_{18} = 0.7500$ | $n_{d10} = 1.51633$ $\nu_{d10} = 64.14$ |
| $r_{19} = \infty$ | | |

Aspherical Coefficients

3rd surface
K=0
$A_4 = 7.1162 \times 10^{-4}$
$A_6 = 1.4779 \times 10^{-5}$
$A_8 = -6.2370 \times 10^{-8}$
$A_{10} = 2.8762 \times 10^{-8}$ 12th surface
K=0
$A_4 = 4.1399 \times 10^{-3}$
$A_6 = 1.4041 \times 10^{-4}$
$A_8 = 4.6776 \times 10^{-5}$
$A_{10} = -6.7224 \times 10^{-7}$ Zooming Data (∞)

| | WE | ST | TE |
|---|---|---|---|
| f (mm) | 4.50500 | 8.64043 | 12.89150 |
| $F_{NO}$ | 2.5359 | 3.4987 | 4.5000 |
| ω (°) | 32.0 | 18.1 | 12.3 |
| F B (mm) | 1.2192 | 1.2192 | 1.2192 |
| $d_6$ | 13.05471 | 4.91856 | 2.00000 |
| $d_{12}$ | 3.13949 | 8.57782 | 14.14762 |

EXAMPLE 3

| | | |
|---|---|---|
| $r_1 = -1.488 \times 10^4$ | $d_1 = 0.8000$ | $n_{d1} = 1.69350$ $\nu_{d1} = 53.21$ |
| $r_2 = 9.3799$ (Aspheric) | $d_2 = 0.3000$ | |
| $r_3 = 10.2288$ | $d_3 = 0.8000$ | $n_{d2} = 1.75700$ $\nu_{d2} = 47.82$ |
| $r_4 = 5.3486$ | $d_4 = 1.7182$ | |
| $r_5 = 7.2124$ | $d_5 = 2.0519$ | $n_{d3} = 1.84666$ $\nu_{d3} = 23.78$ |
| $r_6 = 12.3788$ | $d_6 =$ (Variable) | |
| $r_7 = \infty$ (Stop) | $d_7 = 1.0000$ | |
| $r_8 = 4.3412$ (Aspheric) | $d_8 = 3.0928$ | $n_{d4} = 1.80610$ $\nu_{d4} = 40.92$ |
| $r_9 = -175.9817$ | $d_9 = 0.5000$ | $n_{d5} = 1.84666$ $\nu_{d5} = 23.78$ |
| $r_{10} = 3.5171$ | $d_{10} = 0.7411$ | |
| $r_{11} = 5.4392$ | $d_{11} = 1.5159$ | $n_{d6} = 1.69350$ $\nu_{d6} = 53.21$ |
| $r_{12} = 27.1420$ (Aspheric) | $d_{12} =$ (Variable) | |
| $r_{13} = 47.2987$ | $d_{13} = 1.7503$ | $n_{d7} = 1.80610$ $\nu_{d7} = 40.92$ |
| $r_{14} = -14.9152$ | $d_{14} =$ (Variable) | |
| $r_{15} = \infty$ | $d_{15} = 0.8000$ | $n_{d8} = 1.51633$ $\nu_{d8} = 64.14$ |
| $r_{16} = \infty$ | $d_{16} = 1.5000$ | $n_{d9} = 1.54771$ $\nu_{d9} = 62.84$ |

-continued

| | | |
|---|---|---|
| $r_{17} = \infty$ | $d_{17} = 0.8000$ | |
| $r_{18} = \infty$ | $d_{18} = 0.7500$ | $n_{d10} = 1.51633 \quad \nu_{d10} = 64.14$ |
| $r_{19} = \infty$ | | |

Aspherical Coefficients

2nd surface
K=0
$A_4=-4.1467\times10^{-4}$
$A_6=-4.7647\times10^{-6}$
$A_8=-2.6213\times10^{-8}$
8th surface
K=0
$A_4=-5.2950\times10^{-4}$
$A_6=1.0863\times10^{-7}$
$A_8=-3.1802\times10^{-6}$
$A_{10}=0$
12th surface
K=0
$A_4=1.5348\times10^{-3}$
$A_6=8.2051\times10^{-5}$
$A_8=-7.2915\times10^{-9}$
$A_{10}=0$

| | Zooming Data ($\infty$) | | |
|---|---|---|---|
| | WE | ST | TE |
| f (mm) | 4.50832 | 7.73017 | 12.89769 |
| $F_{NO}$ | 2.5349 | 3.2431 | 4.5000 |
| $\omega$ (°) | 32.0 | 20.0 | 12.3 |
| F B (mm) | 1.2000 | 1.2000 | 1.2000 |
| $d_6$ | 12.95262 | 5.65324 | 2.00000 |
| $d_{12}$ | 1.68696 | 5.94052 | 13.18015 |
| $d_{14}$ | 1.18583 | 1.19589 | 0.57807 |

EXAMPLE 4

| | | |
|---|---|---|
| $r_1 = -3.598 \times 10^4$ | $d_1 = 0.8000$ | |
| $r_2 = 18.1592$(Aspheric) | $d_2 = 0.4930$ | |
| $r_3 = 22.4692$ | $d_3 = 0.8000$ | $n_{d2} = 1.74320 \quad \nu_{d2} = 49.34$ |
| $r_4 = 5.3980$ | $d_4 = 1.5765$ | |
| $r_5 = 7.2381$ | $d_5 = 1.7200$ | $n_{d3} = 1.84666 \quad \nu_{d3} = 23.78$ |
| $r_6 = 13.8584$ | $d_6$ = (Variable) | |
| $r_7 = \infty$ (Stop) | $d_7 = 1.0000$ | |
| $r_8 = 4.229112$(Aspheric) | $d_8 = 2.9761$ | $n_{d4} = 1.80610 \quad \nu_{d4} = 40.92$ |
| $r_9 = -1.215 \times 10^4$ | $d_9 = 0.5000$ | $n_{d5} = 1.84666 \quad \nu_{d5} = 23.78$ |
| $r_{10} = 3.2233$ | $d_{10} = 0.6831$ | |
| $r_{11} = 5.4229$ | $d_{11} = 1.4251$ | $n_{d6} = 1.69350 \quad \nu_{d6} = 53.21$ |
| $r_{12} = 40.7916$(Aspheric) | $d_{12}$ = (Variable) | |
| $r_{13} = 25.5987$ | $d_{13} = 1.9952$ | $n_{d7} = 1.80610 \quad \nu_{d7} = 40.92$ |
| $r_{14} = -16.8356$ | $d_{14}$ = (Variable) | |
| $r_{15} = \infty$ | $d_{15} = 0.8000$ | $n_{d8} = 1.51633 \quad \nu_{d8} = 64.14$ |
| $r_{16} = \infty$ | $d_{16} = 1.5000$ | $n_{d9} = 1.54771 \quad \nu_{d9} = 62.84$ |
| $r_{17} = \infty$ | $d_{17} = 0.8000$ | |
| $r_{18} = \infty$ | $d_{18} = 0.7500$ | $n_{d10} = 1.51633 \quad \nu_{d10} = 64.14$ |
| $r_{19} = \infty$ | | |

Aspherical Coefficients

2nd surface
K=0
$A_4=-3.1603\times10^{-4}$
$A_6=-3.9521\times10^{-6}$
$A_8=6.0589\times10^{-8}$
$A_{10}=0$
8th surface
K=0
$A_4=-5.1306\times10^{-4}$
$A_6=1.8480\times10^{-8}$
$A_8=-4.0730\times10^{-6}$
$A_{10}=0$
12th surface
K=0
$A_4=1.0356\times10^{-3}$
$A_6=2.4472\times10^{-6}$
$A_8=4.4957\times10^{-9}$
$A_{10}=0$

| | Zooming Data ($\infty$) | | |
|---|---|---|---|
| | WE | ST | TE |
| f (mm) | 4.52278 | 7.10855 | 13.03552 |
| $F_{NO}$ | 2.5133 | 3.1531 | 4.5000 |
| $\omega$ (°) | 31.9 | 21.6 | 12.2 |
| F B (mm) | 1.2005 | 1.2005 | 1.2005 |
| $d_6$ | 13.53208 | 7.42223 | 2.00000 |
| $d_{12}$ | 2.14294 | 6.24423 | 14.00455 |
| $d_{14}$ | 0.84554 | 0.45979 | 0.24109 |

EXAMPLE 5

| | | |
|---|---|---|
| $r_1 = 2.152 \times 10^5$ | $d_1 = 1.4495$ | $n_{d1} = 1.69350 \quad \nu_{d1} = 53.21$ |
| $r_2 = -2.558 \times 10^5$ (Aspheric) | $d_2 = 0.2000$ | |
| $r_3 = 0.0973$ | $d_3 = 0.8000$ | $n_{d2} = 1.75700 \quad \nu_{d2} = 47.82$ |
| $r_4 = 5.0935$ | $d_4 = 1.5384$ | |
| $r_5 = 6.3074$ | $d_5 = 2.2638$ | $n_{d3} = 1.84666 \quad \nu_{d3} = 23.78$ |
| $r_6 = 9.3748$ | $d_6$ = (Variable) | |
| $r_7 = \infty$ (Stop) | $d_7 = 1.0000$ | |
| $r_8 = 4.1304$(Aspheric) | $d_8 = 2.5732$ | $n_{d4} = 1.80610 \quad \nu_{d4} = 40.92$ |
| $r_9 = -11.7751$ | $d_9 = 0.5000$ | $n_{d5} = 1.76182 \quad \nu_{d5} = 26.52$ |
| $r_{10} = 3.1492$ | $d_{10} = 0.7939$ | |
| $r_{11} = 4.8685$ | $d_{11} = 1.4660$ | $n_{d6} = 1.69350 \quad \nu_{d6} = 53.21$ |
| $r_{12} = 13.7926$(Aspheric) | $d_{12}$ = (Variable) | |
| $r_{13} = 24.8420$ | $d_{13} = 1.8696$ | $n_{d7} = 1.78590 \quad \nu_{d7} = 44.20$ |
| $r_{14} = -16.7264$ | $d_{14}$ = (Variable) | |
| $r_{15} = \infty$ | $d_{15} = 0.8000$ | $n_{d8} = 1.51633 \quad \nu_{d8} = 64.14$ |
| $r_{16} = \infty$ | $d_{16} = 1.5000$ | $n_{d9} = 1.54771 \quad \nu_{d9} = 62.84$ |
| $r_{17} = \infty$ | $d_{17} = 0.8000$ | |
| $r_{18} = \infty$ | $d_{18} = 0.7500$ | $n_{d10} = 1.51633 \quad \nu_{d10} = 64.14$ |
| $r_{19} = \infty$ | | |

Aspherical Coefficients

2nd surface
$A_4=-2.4509\times10^{-4}$
$A_6=1.3879\times10^{-6}$
$A_8=9.0581\times10^{-7}$
$A_{10}=0$
8th surface
K=0
$A_4=-5.0677\times10^{-4}$ $A_6=-3.2077\times10^{-5}$
$A_8=-8.7757\times10^{-7}$
$A_{10}=0$
12th surface
$K=0$
$A_4=1.7107\times10^{-3}$
$A_6=1.1805\times10^{-7}$
$A_8=8.2007\times10^{-6}$
$A_{10}=0$

|  | Zooming Data (∞) | | |
|---|---|---|---|
|  | WE | ST | TE |
| f (mm) | 4.51447 | 8.62182 | 12.88959 |
| $F_{NO}$ | 2.5874 | 3.5287 | 4.5000 |
| ω (°) | 32.0 | 18.1 | 12.3 |
| F B (mm) | 1.2090 | 1.2090 | 1.2090 |
| $d_6$ | 12.81499 | 4.92338 | 2.00000 |
| $d_{12}$ | 2.02134 | 7.44412 | 12.92512 |
| $d_{14}$ | 0.66769 | 0.59868 | 0.58837 |

EXAMPLE 6

| $r_1 = 300.0000$ | $d_1 = 1.5565$ | $n_{d1} = 1.69350$ $\nu_{d1} = 53.21$ |
|---|---|---|
| $r_2 = \infty$ (Aspheric) | $d_2 = 0.2000$ | |
| $r_3 = 82.5564$ | $d_3 = 0.8000$ | $n_{d2} = 1.74320$ $\nu_{d2} = 49.34$ |
| $r_4 = 5.1873$ | $d_4 = 1.4942$ | |
| $r_5 = 6.3281$ | $d_5 = 2.2680$ | $n_{d3} = 1.84666$ $\nu_{d3} = 23.78$ |
| $r_6 = 9.2079$ | $d_6 =$ (Variable) | |
| $r_7 = \infty$ (Stop) | $d_7 = 1.0000$ | |
| $r_8 = 4.0105$(Aspheric) | $d_8 = 2.5184$ | $n_{d4} = 1.80610$ $\nu_{d4} = 40.92$ |
| $r_9 = -11.4735$ | $d_9 = 0.5000$ | $n_{d5} = 1.76182$ $\nu_{d5} = 26.52$ |
| $r_{10} = 3.0569$ | $d_{10} = 0.9411$ | |
| $r_{11} = 5.5852$ | $d_{11} = 1.5226$ | $n_{d6} = 1.69350$ $\nu_{d6} = 53.21$ |
| $r_{12} = 21.9403$(Aspheric) | $d_{12} =$ (Variable) | |
| $r_{13} = 24.5302$ | $d_{13} = 1.8257$ | $n_{d7} = 1.78590$ $\nu_{d7} = 44.20$ |
| $r_{14} = -17.1746$ | $d_{14} =$ (Variable) | |
| $r_{15} = \infty$ | $d_{15} = 0.8000$ | $n_{d8} = 1.51633$ $\nu_{d8} = 64.14$ |
| $r_{16} = \infty$ | $d_{16} = 1.5000$ | $n_{d9} = 1.54771$ $\nu_{d9} = 62.84$ |
| $r_{17} = \infty$ | $d_{17} = 0.8000$ | |
| $r_{18} = \infty$ | $d_{18} = 0.7500$ | $n_{d10} = 1.51633$ $\nu_{d10} = 64.14$ |
| $r_{19} = \infty$ | | |

Aspherical Coefficients

2nd surface
$K=0$
$A_4=-2.2492\times10^{-4}$
$A_6=1.2214\times10^{-6}$
$A_8=9.4346\times10^{-10}$
$A_{10}=0$
8th surface
$K=0$
$A_4=-6.5411\times10^{-4}$
$A_6=-2.8593\times10^{-5}$
$A_8=-2.2330\times10^{-6}$
$A_{10}=0$
12th surface
$K=0$
$A_4=9.4936\times10^{-4}$
$A_6=1.5574\times10^{-5}$
$A_8=7.8767\times10^{-10}$
$A_{10}=0$

|  | Zooming Data (∞) | | |
|---|---|---|---|
|  | WE | ST | TE |
| f (mm) | 4.51498 | 8.60896 | 12.88808 |
| $F_{NO}$ | 2.5879 | 3.5446 | 4.5000 |
| ω (°) | 32.0 | 18.1 | 12.3 |
| F B (mm) | 1.2088 | 1.2088 | 1.2088 |
| $d_6$ | 12.82458 | 5.03634 | 2.00000 |
| $d_{12}$ | 1.66703 | 7.33800 | 12.75814 |
| $d_{14}$ | 0.84088 | 0.59964 | 0.58685 |

EXAMPLE 7

| $r_1 = 23.0267$ | $d_1 = 2.3000$ | $n_{d1} = 1.83400$ $\nu_{d1} = 37.16$ |
|---|---|---|
| $r_2 = 61.6747$ | $d_2 = 0.4000$ | |
| $r_3 = 15.9771$ | $d_3 = 0.7000$ | $n_{d2} = 1.80610$ $\nu_{d2} = 40.92$ |
| $r_4 = 5.5000$ | $d_4 = 3.2000$ | |
| $r_5 = -71.2824$ | $d_5 = 0.7000$ | $n_{d3} = 1.77250$ $\nu_{d3} = 49.60$ |
| $r_6 = 10.6103$ | $d_6 = 0.5000$ | |
| $r_7 = 8.4732$ | $d_7 = 1.9000$ | $n_{d4} = 1.84666$ $\nu_{d4} = 23.78$ |
| $r_8 = 19.1024$ | $d_8 =$ (Variable) | |
| $r_9 = \infty$ (Stop) | $d_9 = 1.2000$ | |
| $r_{10} = 4.2893$(Aspheric) | $d_{10} = 2.5000$ | $n_{d5} = 1.80610$ $\nu_{d5} = 40.92$ |
| $r_{11} = \infty$ | $d_{11} = 0.7000$ | $n_{d6} = 1.78470$ $\nu_{d6} = 26.29$ |
| $r_{12} = 3.2649$ | $d_{12} = 0.8000$ | |
| $r_{13} = 6.1863$(Aspheric) | $d_{13} = 1.8000$ | $n_{d7} = 1.69350$ $\nu_{d7} = 53.21$ |
| $r_{14} = -176.5384$ | $d_{14} =$ (Variable) | |
| $r_{15} = 15.9331$ | $d_{15} = 2.0000$ | $n_{d8} = 1.48749$ $\nu_{d8} = 70.23$ |
| $r_{16} = -27.9214$ | $d_{16} =$ (Variable) | |
| $r_{17} = \infty$ | $d_{17} = 0.8000$ | $n_{d9} = 1.51633$ $\nu_{d9} = 64.14$ |
| $r_{18} = \infty$ | $d_{18} = 1.5000$ | $n_{d10} = 1.54771$ $\nu_{d10} = 62.84$ |
| $r_{19} = \infty$ | $d_{19} = 0.8000$ | |
| $r_{20} = \infty$ | $d_{20} = 0.7500$ | $n_{d11} = 1.51633$ $\nu_{d11} = 64.14$ |
| $r_{21} = \infty$ | | |

Aspherical Coefficients

10th surface
$K=0$
$A_4=-3.6659\times10^{-4}$
$A_6=-4.1952\times10^{-5}$
$A_8=-1.6473\times10^{-7}$
$A_{10}=0$
13th surface
$K=0$
$A_4=-4.8390\times10^{-4}$
$A_6=-1.3717\times10^{-7}$
$A_8=8.2327\times10^{-6}$
$A_{10}=0$

|  | Zooming Data (∞) | | |
|---|---|---|---|
|  | WE | ST | TE |
| f (mm) | 4.50001 | 8.69997 | 12.89995 |
| $F_{NO}$ | 2.6837 | 3.5405 | 4.4888 |
| ω (°) | 31.9 | 17.8 | 12.2 |
| F B (mm) | 1.2000 | 1.2000 | 1.2000 |

-continued

Zooming Data ($\infty$)

|  | WE | ST | TE |
|---|---|---|---|
| $d_8$ | 12.81554 | 4.21755 | 1.50000 |
| $d_{14}$ | 2.47460 | 6.96240 | 12.52366 |
| $d_{16}$ | 0.88665 | 1.49525 | 1.37807 |

EXAMPLE 8

| $r_1 = 20.9239$(Aspheric) | $d_1 = 0.5000$ | $n_{d1} = 1.69350$ | $v_{d1} = 53.21$ |
| $r_2 = 4.8243$ | $d_2 = 3.5000$ | | |
| $r_3 = 6.2574$ | $d_3 = 1.7050$ | $n_{d2} = 1.84666$ | $v_{d2} = 23.78$ |
| $r_4 = 6.9719$ | $d_4 =$ (Variable) | | |
| $r_5 = \infty$ (Stop) | $d_5 = 1.2000$ | | |
| $r_6 = 4.4208$(Aspheric) | $d_6 = 1.9988$ | $n_{d3} = 1.80610$ | $v_{d3} = 40.92$ |
| $r_7 = 50.0000$ | $d_7 = 0.5000$ | $n_{d4} = 1.80518$ | $v_{d4} = 25.42$ |
| $r_8 = 3.8298$ | $d_8 = 0.5000$ | | |
| $r_9 = 10.5816$(Aspheric) | $d_9 = 1.5384$ | $n_{d5} = 1.69350$ | $v_{d5} = 53.21$ |
| $r_{10} = -29.2700$ | $d_{10} =$ (Variable) | | |
| $r_{11} = 10.3884$ | $d_{11} = 2.4081$ | $n_{d6} = 1.48749$ | $v_{d6} = 70.23$ |
| $r_{12} = -26.9384$ | $d_{12} =$ (Variable) | | |
| $r_{13} = \infty$ | $d_{13} = 0.8000$ | $n_{d7} = 1.51633$ | $v_{d7} = 64.14$ |
| $r_{14} = \infty$ | $d_{14} = 1.5000$ | $n_{d8} = 1.54771$ | $v_{d8} = 62.84$ |
| $r_{15} = \infty$ | $d_{15} = 0.8000$ | | |
| $r_{16} = \infty$ | $d_{16} = 0.7500$ | $n_{d9} = 1.51633$ | $v_{d9} = 64.14$ |
| $r_{17} = \infty$ | | | |

Aspherical Coefficients

1st surface
K=0
$A_4=3.3003\times^{-4}$
$A_6=-8.0541\times10^{-7}$
$A_8=1.0236\times10^{-7}$
$A_{10}=0$
6th surface
K=0
$A_4=-3.2647\times10^{-4}$
$A_6=-2.0657\times10^{-5}$
$A_8=-1.2929\times10^{-6}$
$A_{10}=0$
9th surface
K=0
$A_4=-4.6010\times10^{-4}$
$A_6=-5.8571\times10^{-6}$
$A_8=2.1198\times10^{-6}$
$A_{10}=0$ Zooming Data ($\infty$)

|  | WE | ST | TE |
|---|---|---|---|
| f (mm) | 4.50050 | 8.68964 | 12.89995 |
| $F_{NO}$ | 2.5948 | 3.4651 | 4.5341 |
| $\omega$ (°) | 29.1 | 16.1 | 11.0 |
| F B (mm) | 1.2092 | 1.2092 | 1.2092 |

-continued

Zooming Data ($\infty$)

|  | WE | ST | TE |
|---|---|---|---|
| $d_4$ | 12.53354 | 3.58255 | 1.50000 |
| $d_{10}$ | 2.53628 | 8.42336 | 16.33318 |
| $d_{12}$ | 1.50721 | 2.01017 | 0.95839 |

EXAMPLE 9

| $r_1 = 11.7272$ | $d_1 = 1.7000$ | $n_{d1} = 1.74100$ | $v_{d1} = 52.64$ |
| $r_2 = 25.6361$ | $d_2 = 0.2000$ | | |
| $r_3 = 10.1939$ | $d_3 = 0.7000$ | $n_{d2} = 1.83400$ | $v_{d2} = 37.16$ |
| $r_4 = 3.9946$ | $d_4 = 2.6000$ | | |
| $r_5 = -13.0723$ | $d_5 = 0.7000$ | $n_{d3} = 1.51633$ | $v_{d3} = 64.14$ |
| $r_6 = 4.5840$ | $d_6 = 2.4000$ | $n_{d4} = 1.80100$ | $v_{d4} = 34.97$ |
| $r_7 = 18.7848$ | $d_7 =$ (Variable) | | |
| $r_8 = \infty$ (Stop) | $d_8 = 0.8000$ | | |
| $r_9 = 3.4629$(Aspheric) | $d_9 = 1.9988$ | $n_{d5} = 1.80610$ | $v_{d5} = 40.92$ |
| $r_{10} = 9.4000$ | $d_{10} = 0.5000$ | $n_{d6} = 1.84666$ | $v_{d6} = 23.78$ |
| $r_{11} = 2.6853$ | $d_{11} = 1.0000$ | | |
| $r_{12} = 6.7541$(Aspheric) | $d_{12} = 1.5384$ | $n_{d7} = 1.69350$ | $v_{d7} = 53.21$ |
| $r_{13} = -20.9589$ | $d_{13} =$ (Variable) | | |
| $r_{14} = 92.5426$ | $d_{14} = 1.7000$ | $n_{d8} = 1.48749$ | $v_{d8} = 70.23$ |
| $r_{15} = -17.7158$ | $d_{15} =$ (Variable) | | |
| $r_{16} = \infty$ | $d_{16} = 0.8000$ | $n_{d9} = 1.51633$ | $v_{d9} = 64.14$ |
| $r_{17} = \infty$ | $d_{17} = 1.5000$ | $n_{d10} = 1.54771$ | $v_{d10} = 62.84$ |
| $r_{18} = \infty$ | $d_{18} = 0.8000$ | | |
| $r_{19} = \infty$ | $d_{19} = 0.7500$ | $n_{d11} = 1.51633$ | $v_{d11} = 64.14$ |
| $r_{20} = \infty$ | | | |

Aspherical Coefficients

9th surface
K=0
$A_4=-1.2756\times10^{-3}$
$A_6=8.5469\times10^{-5}$
$A_8=-2.1534\times10^{-5}$
$A_{10}=0$
12th surface
K=0
$A_4=9.1402\times10^{-4}$
$A_6=-3.4104\times10^{-4}$
$A_8=7.3193\times10^{-5}$
$A_{10}=0$ Zooming Data ($\infty$)

|  | WE | ST | TE |
|---|---|---|---|
| f (mm) | 5.09894 | 8.67651 | 14.91184 |
| $F_{NO}$ | 2.6703 | 3.1805 | 4.5238 |
| $\omega$ (°) | 26.1 | 16.1 | 9.5 |
| F B (mm) | 1.2024 | 1.2024 | 1.2024 |
| $d_7$ | 11.75854 | 4.46115 | 1.50000 |
| $d_{13}$ | 3.55591 | 4.48388 | 14.04430 |
| $d_{15}$ | 1.00000 | 3.41211 | 1.00000 |

EXAMPLE 10

| | | |
|---|---|---|
| $r_1 = 7.8483$ | $d_1 = 0.7000$ | $n_{d1} = 1.77250$ $\nu_{d1} = 49.60$ |
| $r_2 = 4.4897$ | $d_2 = 3.0000$ | |
| $r_3 = -23.1590$ | $d_3 = 0.7000$ | $n_{d2} = 1.77250$ $\nu_{d2} = 49.60$ |
| $r_4 = 17.2403$ | $d_4 = 0.2000$ | |
| $r_5 = 11.6625$(Aspheric) | $d_5 = 2.4000$ | $n_{d3} = 1.80610$ $\nu_{d3} = 40.92$ |
| $r_6 = -23.7103$ | $d_6 = 0.7000$ | $n_{d4} = 1.48749$ $\nu_{d4} = 70.23$ |
| $r_7 = 31.9693$ | $d_7 = $ (Variable) | |
| $r_8 = \infty$ (Stop) | $d_8 = 0.8000$ | |
| $r_9 = 3.9499$(Aspheric) | $d_9 = 1.9988$ | $n_{d5} = 1.80610$ $\nu_{d5} = 40.92$ |
| $r_{10} = 6.9960$ | $d_{10} = 0.5000$ | $n_{d6} = 1.84666$ $\nu_{d6} = 23.78$ |
| $r_{11} = 2.9591$ | $d_{11} = 0.4000$ | |
| $r_{12} = 3.2957$ | $d_{12} = 1.5384$ | $n_{d7} = 1.69350$ $\nu_{d7} = 53.21$ |
| $r_{13} = 6.5982$(Aspheric) | $d_{13} = $ (Variable) | |
| $r_{14} = 23.1151$ | $d_{14} = 2.4081$ | $n_{d8} = 1.48749$ $\nu_{d8} = 70.23$ |
| $r_{15} = -12.5018$ | $d_{15} = $ (Variable) | |
| $r_{16} = \infty$ | $d_{16} = 0.8000$ | $n_{d9} = 1.51633$ $\nu_{d9} = 64.14$ |
| $r_{17} = \infty$ | $d_{17} = 1.5000$ | $n_{d10} = 1.54771$ $\nu_{d10} = 62.84$ |
| $r_{18} = \infty$ | $d_{18} = 0.8000$ | |
| $r_{19} = \infty$ | $d_{19} = 0.7500$ | $n_{d11} = 1.51633$ $\nu_{d11} = 64.14$ |
| $r_{20} = \infty$ | | |

Aspherical Coefficients

5th surface
$K=0$
$A_4=3.7332\times10^{-4}$
$A_6=-4.9736\times10^{-6}$
$A_8=3.5436\times10^{-7}$
$A_{10}=0$ 9th surface
$K=0$
$A_4=-2.1597\times10^{-4}$
$A_6=3.7263\times10^{-5}$
$A_8=-5.1843\times10^{-6}$
$A_{10}=0$ 13th surface
$K=0$
$A_4=4.4364\times10^{-3}$
$A_6=5.7596\times10^{-4}$
$A_8=1.6510\times10^{-6}$
$A_{10}=0$ Zooming Data ($\infty$)

| | WE | ST | TE |
|---|---|---|---|
| f (mm) | 5.13995 | 8.70063 | 14.92346 |
| $F_{NO}$ | 2.5350 | 2.9786 | 4.5450 |
| $\omega$ (°) | 28.8 | 18.0 | 10.7 |
| F B (mm) | 1.1864 | 1.1864 | 1.1864 |
| $d_7$ | 13.42993 | 3.89672 | 1.50000 |
| $d_{13}$ | 3.14297 | 4.00000 | 15.13969 |
| $d_{15}$ | 1.00000 | 3.21932 | 1.00000 |

EXAMPLE 11

| | | |
|---|---|---|
| $r_1 = 55.0608$ | $d_1 = 1.4800$ | $n_{d1} = 1.84666$ $\nu_{d1} = 23.78$ |
| $r_2 = -210.3988$ | $d_2 = 0.1500$ | |
| $r_3 = 58.5014$ | $d_3 = 0.7000$ | $n_{d2} = 1.80610$ $\nu_{d2} = 40.92$ |
| $r_4 = 6.9103$ | $d_4 = 2.1504$ | |
| $r_5 = -3.974 \times 10^6$ | $d_5 = 0.7000$ | $n_{d3} = 1.77250$ $\nu_{d3} = 49.60$ |
| $r_6 = 22.4439$ | $d_6 = 0.1500$ | |
| $r_7 = 9.2836$ | $d_7 = 1.6800$ | $n_{d4} = 1.84666$ $\nu_{d4} = 23.78$ |
| $r_8 = 17.7842$ | $d_8 = $ (Variable) | |
| $r_9 = \infty$ (Stop) | $d_9 = 0.8000$ | |
| $r_{10} = 4.2409$(Aspheric) | $d_{10} = 2.9000$ | $n_{d5} = 1.80610$ $\nu_{d5} = 40.92$ |
| $r_{11} = -1.524 \times 10^7$ | $d_{11} = 0.7000$ | $n_{d6} = 1.84666$ $\nu_{d6} = 23.78$ |
| $r_{12} = 3.1782$ | $d_{12} = 0.8605$ | |
| $r_{13} = 6.0183$(Aspheric) | $d_{13} = 1.6600$ | $n_{d7} = 1.80610$ $\nu_{d7} = 40.92$ |
| $r_{14} = 34.6909$ | $d_{14} = $ (Variable) | |
| $r_{15} = 34.2725$ | $d_{15} = 1.9300$ | $n_{d8} = 1.72916$ $\nu_{d8} = 54.68$ |
| $r_{16} = -15.9762$ | $d_{16} = $ (Variable) | |
| $r_{17} = \infty$ | $d_{17} = 1.0100$ | $n_{d9} = 1.51633$ $\nu_{d9} = 64.14$ |
| $r_{18} = \infty$ | $d_{18} = 1.4400$ | $n_{d10} = 1.54771$ $\nu_{d10} = 62.84$ |
| $r_{19} = \infty$ | $d_{19} = 0.8000$ | |
| $r_{20} = \infty$ | $d_{20} = 0.8000$ | $n_{d11} = 1.51633$ $\nu_{d11} = 64.14$ |
| $r_{21} = \infty$ | | |

Aspherical Coefficients

10th surface
$K=0$
$A_4=-4.0241\times10^{-4}$
$A_6=-2.3596\times10^{-5}$
$A_8=-1.8718\times10^{-6}$
$A_{10}=0$ 13th surface
$K=0$
$A_4=-6.4358\times10^{-4}$
$A_6=5.1034\times10^{-6}$
$A_8=5.9906\times10^{-6}$
$A_{10}=0$ Zooming Data ($\infty$)

| | WE | ST | TE |
|---|---|---|---|
| f (mm) | 5.09990 | 9.78208 | 14.70617 |
| $F_{NO}$ | 2.5214 | 3.5598 | 4.5000 |
| $\omega$ (°) | 28.9 | 16.1 | 10.9 |
| F B (mm) | 1.0313 | 1.0313 | 1.0313 |
| $d_8$ | 13.84782 | 5.58395 | 1.90000 |
| $d_{14}$ | 1.91123 | 8.49778 | 13.77965 |
| $d_{16}$ | 1.89120 | 1.00000 | 1.00000 |

EXAMPLE 12

| | | |
|---|---|---|
| $r_1 = 28.2152$ | $d_1 = 2.1000$ | $n_{d1} = 1.83400$ $\nu_{d1} = 37.16$ |
| $r_2 = 157.3993$ | $d_2 = 0.2000$ | |
| $r_3 = 34.3744$ | $d_3 = 0.7000$ | $n_{d2} = 1.78590$ $\nu_{d2} = 44.20$ |
| $r_4 = 6.0000$ | $d_4 = 2.6000$ | |
| $r_5 = \infty$ | $d_5 = 0.7000$ | $n_{d3} = 1.77250$ $\nu_{d3} = 49.60$ |
| $r_6 = 20.7013$ | $d_6 = 0.2000$ | |
| $r_7 = 8.1749$ | $d_7 = 1.7800$ | $n_{d4} = 1.84666$ $\nu_{d4} = 23.78$ |
| $r_8 = 13.6341$ | $d_8 = $ (Variable) | |
| $r_9 = \infty$ (Stop) | $d_9 = 0.8000$ | |
| $r_{10} = 4.3541$(Aspheric) | $d_{10} = 2.7500$ | $n_{d5} = 1.80610$ $\nu_{d5} = 40.92$ |
| $r_{11} = -50.0000$ | $d_{11} = 0.7000$ | $n_{d6} = 1.78472$ $\nu_{d6} = 25.68$ |
| $r_{12} = 3.2481$ | $d_{12} = 0.9550$ | |
| $r_{13} = 4.5965$ | $d_{13} = 1.7000$ | $n_{d7} = 1.69350$ $\nu_{d7} = 53.21$ |
| $r_{14} = 12.3613$(Aspheric) | $d_{14} = $ (Variable) | |

-continued

| | | |
|---|---|---|
| $r_{15}$ = 30.1243 | $d_{15}$ = 2.1000 | $n_{d8}$ = 1.72916 $\nu_{d8}$ = 54.68 |
| $r_{16}$ = −17.4688 | $d_{16}$ = (Variable) | |
| $r_{17}$ = ∞ | $d_{17}$ = 1.4400 | $n_{d9}$ = 1.54771 $\nu_{d9}$ = 62.84 |
| $r_{18}$ = ∞ | $d_{18}$ = 0.8000 | |
| $r_{19}$ = ∞ | $d_{19}$ = 0.8000 | $n_{d10}$ = 1.51633 $\nu_{d10}$ = 64.14 |
| $r_{20}$ = ∞ | | |

Aspherical Coefficients

10th surface
K=0
$A_4$=−3.8980×10$^{-4}$
$A_6$=−1.1989×10$^{-5}$
$A_8$=−2.0218×10$^{-6}$
$A_{10}$=0
14th surface
K=0
$A_4$=1.8641×10$^{-3}$
$A_6$=6.5713×10$^{-5}$
$A_8$=−1.7732×10$^{-8}$
$A_{10}$=0

Zooming Data (∞)

| | WE | ST | TE |
|---|---|---|---|
| f (mm) | 5.10002 | 8.69938 | 14.69900 |
| $F_{NO}$ | 2.5634 | 3.3520 | 4.5553 |
| ω (°) | 28.9 | 18.0 | 10.9 |
| F B (mm) | 0.9600 | 0.9600 | 0.9600 |
| $d_8$ | 13.85112 | 6.66139 | 2.00000 |
| $d_{14}$ | 1.88570 | 6.75477 | 13.41891 |
| $d_{16}$ | 1.78523 | 1.24854 | 1.12626 |

EXAMPLE 13

| | | |
|---|---|---|
| $r_1$ = 12.6404 | $d_1$ = 0.7000 | $n_{d1}$ = 1.80610 $\nu_{d1}$ = 40.92 |
| $r_2$ = 5.3585(Aspheric) | $d_2$ = 1.8000 | |
| $r_3$ = −1052.2383 | $d_3$ = 0.7000 | $n_{d2}$ = 1.83400 $\nu_{d2}$ = 37.16 |
| $r_4$ = 10.1978 | $d_4$ = 0.8000 | |
| $r_5$ = 9.5874 | $d_5$ = 1.8000 | $n_{d3}$ = 1.84666 $\nu_{d3}$ = 23.78 |
| $r_6$ = 78.2817 | $d_6$ = (Variable) | |
| $r_7$ = ∞ (Stop) | $d_7$ = 1.2000 | |
| $r_8$ = 4.6302 | $d_8$ = 2.5000 | $n_{d4}$ = 1.80610 $\nu_{d4}$ = 40.92 |
| $r_9$ = 45.0000 | $d_9$ = 0.7000 | $n_{d5}$ = 1.84666 $\nu_{d5}$ = 23.78 |
| $r_{10}$ = 4.6040 | $d_{10}$ = 0.5000 | |
| $r_{11}$ = 9.9218(Aspheric) | $d_{11}$ = 2.0000 | $n_{d6}$ = 1.69350 $\nu_{d6}$ = 53.21 |
| $r_{12}$ = −10.0000 | $d_{12}$ = 0.7000 | $n_{d7}$ = 1.83400 $\nu_{d7}$ = 37.16 |
| $r_{13}$ = −165.7669 | $d_{13}$ = (Variable) | |
| $r_{14}$ = 9.9392 | $d_{14}$ = 1.8000 | $n_{d8}$ = 1.60311 $\nu_{d8}$ = 60.64 |
| $r_{15}$ = −128.8622 | $d_{15}$ = (Variable) | |
| $r_{16}$ = ∞ | $d_{16}$ = 0.8000 | $n_{d9}$ = 1.51633 $\nu_{d9}$ = 64.14 |
| $r_{17}$ = ∞ | $d_{17}$ = 1.5000 | $n_{d10}$ = 1.54771 $\nu_{d10}$ = 62.84 |
| $r_{18}$ = ∞ | $d_{18}$ = 0.8000 | |
| $r_{19}$ = ∞ | $d_{19}$ = 0.7500 | $n_{d11}$ = 1.51633 $\nu_{d11}$ = 64.14 |
| $r_{20}$ = ∞ | | |

Aspherical Coefficients

2nd surface
K=0
$A_4$=−3.6379×10$^{-4}$
$A_6$=1.7551×10$^{-5}$
$A_8$=−1.2517×10$^{-6}$
$A_{10}$=0
11th surface
K=0
$A_4$=−2.3148×10$^{-3}$
$A_6$=−1.0121×10$^{-4}$
$A_8$=−1.9212×10$^{-5}$ $A_{10}$=0

Zooming Data (∞)

| | WE | ST | TE |
|---|---|---|---|
| f (mm) | 4.49468 | 8.69002 | 12.90381 |
| $F_{NO}$ | 2.6082 | 3.4008 | 4.4891 |
| ω (°) | 29.1 | 16.1 | 11.0 |
| F B (mm) | 1.2101 | 1.2101 | 1.2101 |
| $d_6$ | 14.27434 | 3.90534 | 1.50000 |
| $d_{13}$ | 2.53628 | 7.27318 | 14.59773 |
| $d_{15}$ | 0.92173 | 1.80916 | 1.00286 |

EXAMPLE 14

| | | |
|---|---|---|
| $r_1$ = 12.0734 | $d_1$ = 0.7000 | $n_{d1}$ = 1.78590 $\nu_{d1}$ = 44.20 |
| $r_2$ = 5.1454(Aspheric) | $d_2$ = 1.8000 | |
| $r_3$ = 32.6348 | $d_3$ = 0.7000 | $n_{d2}$ = 1.78590 $\nu_{d2}$ = 44.20 |
| $r_4$ = 7.1978 | $d_4$ = 0.8000 | |
| $r_5$ = 7.2194 | $d_5$ = 1.8000 | $n_{d3}$ = 1.84666 $\nu_{d3}$ = 23.78 |
| $r_6$ = 17.2322 | $d_6$ = (Variable) | |
| $r_7$ = ∞ (Stop) | $d_7$ = 1.2000 | |
| $r_8$ = 5.5218 | $d_8$ = 3.0000 | $n_{d4}$ = 1.77250 $\nu_{d4}$ = 49.60 |
| $r_9$ = −14.5871 | $d_9$ = 0.2000 | |
| $r_{10}$ = −10.6445 | $d_{10}$ = 0.7000 | $n_{d5}$ = 1.84666 $\nu_{d5}$ = 23.78 |
| $r_{11}$ = 16.3389 | $d_{11}$ = 0.7000 | |
| $r_{12}$ = 18.1849 | $d_{12}$ = 1.6000 | $n_{d6}$ = 1.69350 $\nu_{d6}$ = 53.21 |
| $r_{13}$ = 36.1930(Aspheric) | $d_{13}$ = (Variable) | |
| $r_{14}$ = 14.4210 | $d_{14}$ = 1.8000 | $n_{d7}$ = 1.60311 $\nu_{d7}$ = 60.64 |
| $r_{15}$ = −33.5831 | $d_{15}$ = (Variable) | |
| $r_{16}$ = ∞ | $d_{16}$ = 0.8000 | $n_{d8}$ = 1.51633 $\nu_{d8}$ = 64.14 |
| $r_{17}$ = ∞ | $d_{17}$ = 1.5000 | $n_{d9}$ = 1.54771 $\nu_{d9}$ = 62.84 |
| $r_{18}$ = ∞ | $d_{18}$ = 0.8000 | |
| $r_{19}$ = ∞ | $d_{19}$ = 0.7500 | $n_{d10}$ = 1.51633 $\nu_{d10}$ = 64.14 |
| $r_{20}$ = ∞ | | |

Aspherical Coefficients

2nd surface
K=0
$A_4$=−4.0112×10$^{-4}$
$A_6$=2.0947×10$^{-5}$
$A_8$=−1.4672×10$^{-6}$
$A_{10}$=0
13th surface
K=0
$A_4$=2.2371×10$^{-3}$ $A_6=5.3785\times10^{-5}$
$A_8=8.2914\times10^{-6}$
$A_{10}=0$

| Zooming Data ($\infty$) | | | |
|---|---|---|---|
| | WE | ST | TE |
| f (mm) | 4.50022 | 8.68802 | 12.89916 |
| $F_{NO}$ | 2.5959 | 3.4326 | 4.5355 |
| $\omega$ (°) | 29.1 | 16.1 | 11.0 |
| F B (mm) | 1.2095 | 1.2095 | 1.2095 |
| $d_6$ | 11.49994 | 3.44847 | 1.50000 |
| $d_{13}$ | 2.53628 | 7.27553 | 14.45109 |
| $d_{15}$ | 0.92173 | 1.87176 | 0.98646 |

EXAMPLE 15

| | | |
|---|---|---|
| $r_1 = 35.3386$ | $d_1 = 0.7000$ | $n_{d1} = 1.80610$ $\nu_{d1} = 40.92$ |
| $r_2 = 7.9569$(Aspheric) | $d_2 = 0.5000$ | |
| $r_3 = 12.9234$ | $d_3 = 0.7000$ | $n_{d2} = 1.80610$ $\nu_{d2} = 40.92$ |
| $r_4 = 5.6199$ | $d_4 = 1.3000$ | |
| $r_5 = 7.6443$ | $d_5 = 1.8000$ | $n_{d3} = 1.84666$ $\nu_{d3} = 23.78$ |
| $r_6 = 20.9906$ | $d_6 = $ (Variable) | |
| $r_7 = \infty$ (Stop) | $d_7 = 1.2000$ | |
| $r_8 = 6.1200$(Aspheric) | $d_8 = 2.5000$ | $n_{d4} = 1.80610$ $\nu_{d4} = 40.92$ |
| $r_9 = -12.0000$ | $d_9 = 0.7000$ | $n_{d5} = 1.80518$ $\nu_{d5} = 25.42$ |
| $r_{10} = 10.6145$ | $d_{10} = 0.5000$ | |
| $r_{11} = 12.5527$ | $d_{11} = 0.7000$ | $n_{d6} = 1.80100$ $\nu_{d6} = 34.97$ |
| $r_{12} = 5.4000$ | $d_{12} = 2.0000$ | $n_{d7} = 1.69350$ $\nu_{d7} = 53.21$ |
| $r_{13} = 26.5712$(Aspheric) | $d_{13} = $ (Variable) | |
| $r_{14} = 13.7480$ | $d_{14} = 1.8000$ | $n_{d8} = 1.60311$ $\nu_{d8} = 60.64$ |
| $r_{15} = -31.8437$ | $d_{15} = $ (Variable) | |
| $r_{16} = \infty$ | $d_{16} = 0.8000$ | $n_{d9} = 1.51633$ $\nu_{d9} = 64.14$ |
| $r_{17} = \infty$ | $d_{17} = 1.5000$ | $n_{d10} = 1.54771$ $\nu_{d10} = 62.84$ |
| $r_{18} = \infty$ | $d_{18} = 0.8000$ | |
| $r_{19} = \infty$ | $d_{19} = 0.7500$ | $n_{d11} = 1.51633$ $\nu_{d11} = 64.14$ |
| $r_{20} = \infty$ | | |

Aspherical Coefficients

2nd surface
K=0
$A_4=-3.6019\times10^{-4}$
$A_6=-2.9205\times10^{-6}$
$A_8=-1.7745\times10^7$
$A_{10}=0$
8th surface
K=0
$A_4=-6.7970\times10^{-5}$
$A_6=3.2948\times10^{-6}$
$A_8=-8.4365\times10^{-7}$
$A_{10}=0$
13th surface
K=0
$A_4=1.6571\times10^{-3}$
$A_6=5.7013\times10^{-5}$
$A_8=1.8429\times10^{-6}$
$A_{10}=0$

| Zooming Data ($\infty$) | | | |
|---|---|---|---|
| | WE | ST | TE |
| f (mm) | 4.50018 | 8.68952 | 12.89980 |
| $F_{NO}$ | 2.6082 | 3.4008 | 4.4891 |
| $\omega$ (°) | 29.1 | 16.1 | 11.0 |
| F B (mm) | 1.2099 | 1.2099 | 1.2099 |
| $d_6$ | 15.08390 | 4.40851 | 1.50000 |
| $d_{13}$ | 2.53628 | 6.90868 | 13.07068 |
| $d_{15}$ | 0.92173 | 1.55996 | 0.99972 |

EXAMPLE 16

| | | |
|---|---|---|
| $r_1 = 10.6805$ | $d_1 = 0.7000$ | $n_{d1} = 1.80610$ $\nu_{d1} = 40.92$ |
| $r_2 = 5.3858$(Aspheric) | $d_2 = 2.0000$ | |
| $r_3 = 53.1437$ | $d_3 = 0.7000$ | $n_{d2} = 1.77250$ $\nu_{d2} = 49.60$ |
| $r_4 = 9.7714$ | $d_4 = 0.6000$ | |
| $r_5 = 7.5402$ | $d_5 = 1.8000$ | $n_{d3} = 1.84666$ $\nu_{d3} = 23.78$ |
| $r_6 = 14.1942$ | $d_6 = $ (Variable) | |
| $r_7 = \infty$ (Stop) | $d_7 = 1.2000$ | |
| $r_8 = 4.9282$(Aspheric) | $d_8 = 2.5000$ | $n_{d4} = 1.80610$ $\nu_{d4} = 40.92$ |
| $r_9 = -97.2877$ | $d_9 = 0.0200$ | |
| $r_{10} = -10.3515$ | $d_{10} = 0.7000$ | $n_{d5} = 1.84666$ $\nu_{d5} = 23.78$ |
| $r_{11} = 9.5288$ | $d_{11} = 2.0000$ | $n_{d6} = 1.69350$ $\nu_{d6} = 53.21$ |
| $r_{12} = 486.8769$(Aspheric) | $d_{12} = $ (Variable) | |
| $r_{13} = 19.3730$ | $d_{13} = 1.8000$ | $n_{d7} = 1.60311$ $\nu_{d7} = 60.64$ |
| $r_{14} = -15.6402$ | $d_{14} = $ (Variable) | |
| $r_{15} = \infty$ | $d_{15} = 0.8000$ | $n_{d8} = 1.51633$ $\nu_{d8} = 64.14$ |
| $r_{16} = \infty$ | $d_{16} = 1.5000$ | $n_{d9} = 1.54771$ $\nu_{d9} = 62.84$ |
| $r_{17} = \infty$ | $d_{17} = 0.8000$ | |
| $r_{18} = \infty$ | $d_{18} = 0.7500$ | $n_{d10} = 1.51633$ $\nu_{d10} = 64.14$ |
| $r_{19} = \infty$ | | |

Aspherical Coefficients

2nd surface
K=0
$A_4=-2.6043\times10^{-4}$
$A_6=1.7480\times10^{-5}$
$A_8=-8.2296\times10^{-7}$
$A_{10}=0$
8th surface
$A_4=4.6735\times10^{-4}$
$A_6=5.7258\times10^{-6}$
$A_8=3.2901\times10^{-6}$
$A_{10}=0$
12th surface
K=0
$A_4=3.7339\times10^{-3}$
$A_6=-3.6398\times10^{-5}$
$A_8=4.5323\times10^{-5}$
$A_{10}=0$

| Zooming Data ($\infty$) | | | |
|---|---|---|---|
| | WE | ST | TE |
| f (mm) | 4.50325 | 8.68909 | 12.89876 |
| $F_{NO}$ | 2.4094 | 3.2779 | 4.3298 |
| $\omega$ (°) | 29.0 | 16.1 | 11.0 |
| F B (mm) | 1.2089 | 1.2089 | 1.2089 |
| $d_6$ | 13.28426 | 3.96560 | 1.50000 |

-continued

Zooming Data (∞)

|  | WE | ST | TE |
|---|---|---|---|
| $d_{12}$ | 2.53628 | 7.09770 | 13.37693 |
| $d_{14}$ | 0.92173 | 1.54147 | 0.98679 |

EXAMPLE 17

| $r_1 = 88.1913$ | $d_1 = 0.7000$ | $n_{d1} = 1.77250$ $\nu_{d1} = 49.60$ |
|---|---|---|
| $r_2 = 4.6149$(Aspheric) | $d_2 = 2.0000$ | |
| $r_3 = 8.1050$ | $d_3 = 1.8000$ | $n_{d2} = 1.84666$ $\nu_{d2} = 23.78$ |
| $r_4 = 16.5728$ | $d_4 = $ (Variable) | |
| $r_5 = \infty$ (Stop) | $d_5 = 1.2000$ | |
| $r_6 = 5.7305$(Aspheric) | $d_6 = 2.5000$ | $n_{d3} = 1.80610$ $\nu_{d3} = 40.92$ |
| $r_7 = -12.0000$ | $d_7 = 0.7000$ | $n_{d4} = 1.84666$ $\nu_{d4} = 23.78$ |
| $r_8 = 12.1053$ | $d_8 = 0.5000$ | |
| $r_9 = 11.4889$ | $d_9 = 0.7000$ | $n_{d5} = 1.80100$ $\nu_{d5} = 34.97$ |
| $r_{10} = 5.4000$ | $d_{10} = 2.0000$ | $n_{d6} = 1.69350$ $\nu_{d6} = 53.21$ |
| $r_{11} = 16.7663$(Aspheric) | $d_{11} = $ (Variable) | |
| $r_{12} = 38.7731$ | $d_{12} = 1.8000$ | $n_{d7} = 1.65844$ $\nu_{d7} = 50.88$ |
| $r_{13} = -15.0285$ | $d_{13} = $ (Variable) | |
| $r_{14} = \infty$ | $d_{14} = 0.800$ | $n_{d8} = 1.51633$ $\nu_{d8} = 64.14$ |
| $r_{15} = \infty$ | $d_{15} = 1.5000$ | $n_{d9} = 1.54771$ $\nu_{d9} = 62.84$ |
| $r_{16} = \infty$ | $d_{16} = 0.8000$ | |
| $r_{17} = \infty$ | $d_{17} = 0.7500$ | $n_{d10} = 1.51633$ $\nu_{d10} = 64.14$ |
| $r_{18} = \infty$ | | |

Aspherical Coefficients

2nd surface
$K = 0$
$A_4 = -1.0782 \times 10^{-3}$
$A_6 = 2.8661 \times 10^{-5}$
$A_8 = -4.2769 \times 10^{-6}$
$A_{10} = 0$ 6th surface
$K = 0$
$A_4 = -2.4989 \times 10^5$
$A_6 = -1.3301 \times 10^{-5}$
$A_8 = 4.1349 \times 10^{-7}$
$A_{10} = 0$ 11th surface
$K = 0$
$A_4 = 2.7617 \times 10^{-3}$
$A_6 = -4.5942 \times 10^{-5}$
$A_8 = 2.1334 \times 10^{-5}$
$A_{10} = 0$ Zooming Data (∞)

|  | WE | ST | TE |
|---|---|---|---|
| f (mm) | 4.51347 | 8.68762 | 12.89665 |
| $F_{NO}$ | 2.6082 | 3.4008 | 4.4891 |
| ω (°) | 29.0 | 16.1 | 11.0 |
| F B (mm) | 1.2096 | 1.2096 | 1.2096 |
| $d_6$ | 12.59150 | 3.96970 | 1.50000 |
| $d_{12}$ | 2.53628 | 7.22258 | 13.31431 |
| $d_{14}$ | 0.92173 | 1.50740 | 0.99736 |

Figure 18A:
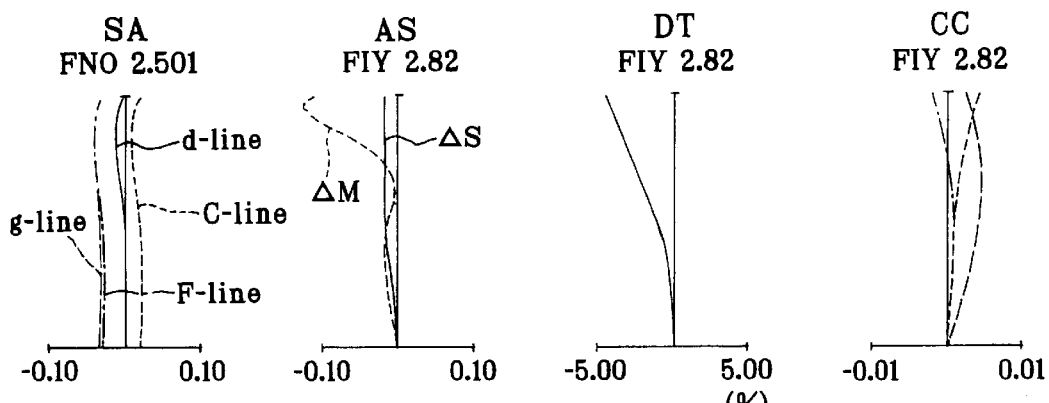
FIG. 18(*a*), 18(*b*) and 18(*c*) are aberration diagrams of Example 1 of the zoom lens system upon focused at infinity.
Figure 18B:
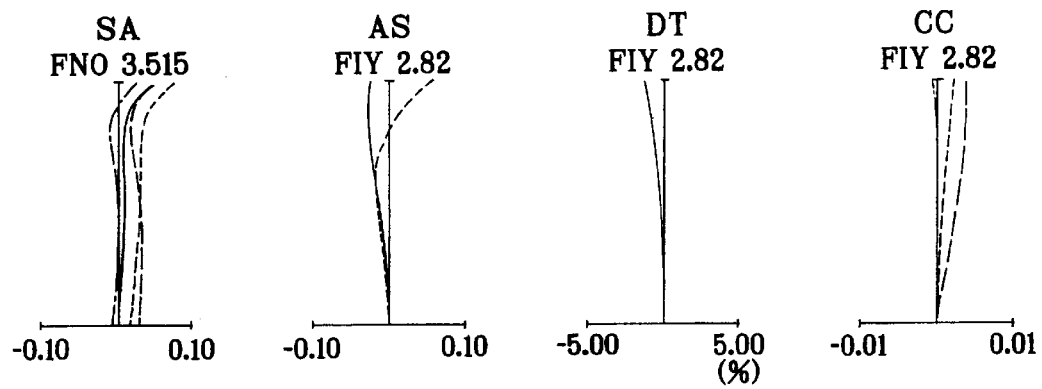
Figure 18C:
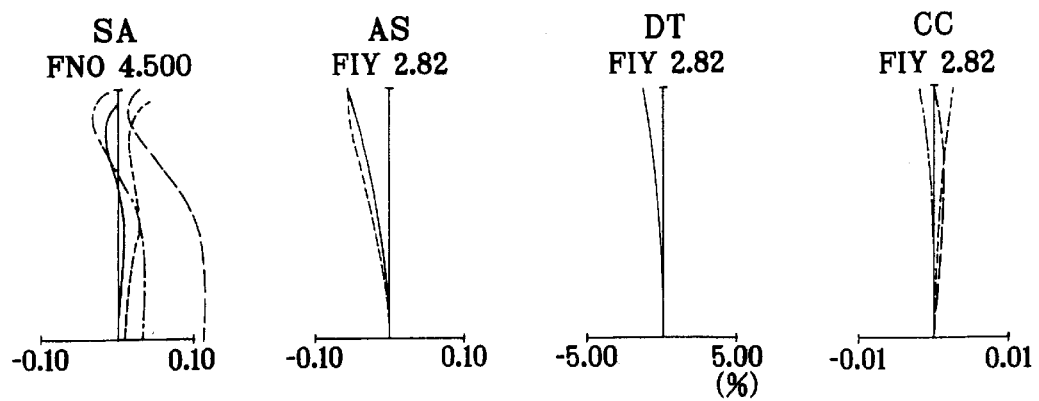

FIGS. 18(a) to 18(c) are aberration diagram for Example 1 upon focused at infinity. FIG. 18(a) shows spherical aberration SA, astigmatism AS, distortion DT and chromatic aberration CC of magnification at the wide-angle end, FIG. 18(b) shows SA, AS, DT and CC in the intermediate settings, and FIG. 18(c) shows SA, AS, DT and CC at the telephoto end. Note that "FIY" shows an image height.

Enumerated below are the values of conditions (1) to (13), (a) and (b) in the aforesaid examples.

| Condition | Ex. 1 | Ex. 2 | Ex. 3 | Ex. 4 | Ex. 5 |
|---|---|---|---|---|---|
| (1) | 0.0730 | 0.0842 | 0.0855 | 0.0895 | 0.0938 |
| (2) | 0.7239 | 0.7545 | 0.5554 | 0.5912 | 0.4022 |
| (3) | 0 | 0 | 0 | 0 | 0 |
| (4) | −1.6487 | −2.3115 | −1.5012 | −1.3066 | −2.0910 |
| (5) | 0.3150 | 0.2131 | 0.5205 | 0.2065 | 0.1952 |
| (6) | −0.8779 | −0.9081 | −0.9977 | −0.9998 | −0.8315 |
| (7) | −0.0150 | 0.0363 | −0.0003 | −0.0001 | *** |
| (8) | 0.5142 | 0.3367 | 0.3811 | 0.3486 | *** |
| (9) | *** | *** | *** | *** | *** |
| (10) | *** | *** | *** | *** | 0.0000 |
| (11) | 0.8804 | 0.8357 | 1.0053 | 0.9556 | 1.1085 |
|  | (L = 5.64) | (L = 5.64) | (L = 5.64) | (L = 5.64) | (L = 5.64) |
| (12) | 1.2152 | 1.0534 | 1.0372 | 1.0099 | 0.9456 |
|  | (L = 5.64) | (L = 5.64) | (L = 5.64) | (L = 5.64) | (L = 5.64) |
| (13) × $10^{-3}$ | 0.333 | 0.333 | 0.333 | 0.333 | 0.333 |
| (a in μm) | (a = 3.0) | (a = 3.0) | (a = 3.0) | (a = 3.0) | (a = 3.0) |
| (a) | 1.6439 | 1.6756 | 1.5643 | 1.5400 | 1.6672 |
| (b) | 2.2668 | 2.2257 | 2.2667 | 2.3526 | 2.1924 |
|  | Ex. 6 | Ex. 7 | Ex. 8 | Ex. 9 | Ex. 10 |
| (1) | 0.0912 | 0.1207 | 0.1102 | 0.0993 | 0.1127 |
| (2) | 0.3820 | 0.6149 | 0.5182 | 0.7845 | 1.0917 |
| (3) | 0 | 0 | 0 | 0 | 0 |
| (4) | −0.6830 | −0.9323 | −0.4689 | −0.5126 | −2.9959 |
| (5) | 0.1746 | −0.2734 | −0.4434 | 0.6786 | 0.3510 |
| (6) | −0.8322 | −1 | −1.0241 | −1.2037 | −1.4572 |
| (7) | *** | *** | 0.2151 | *** | *** |
| (8) | *** | *** | 0.7777 | *** | *** |
| (9) | *** | 0.9821 | *** | 0.7989 | *** |
| (10) | 0.01044 | *** | *** | *** | *** |
| (11) | 1.1203 | 1.7321 | 1.0000 | 1.6600 | 1.3652 |
|  | (L = 5.64) | (L = 5.6) | (L = 5.0) | (L = 5.0) | (L = 5.64) |
| (12) | 0.9726 | 1.0357 | 0.9074 | 1.0074 | 0.7867 |
|  | (L = 5.64) | (L = 5.6) | (L = 5.0) | (L = 5.0) | (L = 5.64) |
| (13) × $10^{-3}$ | 0.333 | 0.333 | 0.333 | 0.333 | 0.333 |
| (a in μm) | (a = 3.0) | (a = 3.0) | (a = 3.0) | (a = 3.0) | (a = 3.0) |
| (a) | 1.6257 | 1.6976 | 1.7299 | 1.7290 | 1.7056 |
| (b) | 2.2145 | 2.1761 | 2.4925 | 1.8077 | 2.0835 |
|  | Ex. 11 | Ex. 12 | Ex. 13 | Ex. 14 | Ex. 15 |
| (1) | 0.1144 | 0.1147 | 0.1094 | 0.1452 | 0.1094 |
| (2) | 0.5975 | 0.5250 | 0.3833 | 0.1091 | 0.1088 |
| (3) | 0 | 0 | 0 | 0 | 0 |
| (4) | −1.4198 | −2.1839 | −0.8871 | −3.0196 | −2.7909 |
| (5) | 0.3641 | 0.2659 | −0.8568 | −0.3992 | 0.3969 |
| (6) | −1 | −0.9565 | −1.0012 | *** | −5.2936 |
| (7) | *** | *** | 0.3556 | 0.3727 | 0.1273 |
| (8) | *** | *** | 0.1780 | 0.1778 | 0.2889 |
| (9) | 1.2252 | 1.0638 | *** | *** | *** |
| (10) | *** | *** | *** | *** | *** |
| (11) | 1.2430 | 1.4681 | 1.1600 | 1.1600 | 1.000 |
|  | (L = 5.64) | (L = 5.64) | (L = 5.0) | (L = 5.0) | (L = 5.0) |
| (12) | 1.0852 | 1.0824 | 1.2800 | 1.2400 | 1.2800 |
|  | (L = 5.64) | (L = 5.64) | (L = 5.0) | (L = 5.0) | (L = 5.0) |
| (13) × $10^{-3}$ | 0.333 | 0.333 | 0.333 | 0.333 | 0.333 |
| (a in μm) | (a = 3.0) | (a = 3.0) | (a = 3.0) | (a = 3.0) | (a = 3.0) |
| (a) | 1.4670 | 1.5144 | 1.6684 | 1.8643 | 1.50981 |
| (b) | 2.1071 | 2.0657 | 2.5012 | 2.2008 | 2.4139 |
|  | Ex. 16 | Ex. 17 | | | |
| (1) | 0.1666 | 0.1904 | | | |
| (2) | 0.4205 | 0.0645 | | | |
| (3) | 0 | 0 | | | |
| (4) | −1.0399 | −5.3540 | | | |
| (5) | 0.1066 | 0.4413 | | | |
| (6) | −21.8621 | −80.9524 | | | |

-continued

| Condition | | |
|---|---|---|
| (7) | 0.4216 | 0.0512 |
| (8) | 0.1332 | 0.4431 |
| (9) | *** | *** |
| (10) | *** | *** |
| (11) | 1.1600 | 0.7000 |
| | (L = 5.0) | (L = 5.0) |
| (12) | 1.0800 | 1.2800 |
| | (L = 5.0) | (L = 5.0) |
| (13) × $10^{-3}$ | 0.333 | 0.333 |
| (a in μm) | (a = 3.0) | (a = 3.0) |
| (a) | 1.6411 | 1.9843 |
| (b) | 2.2790 | 2.2059 |

Figure 19:
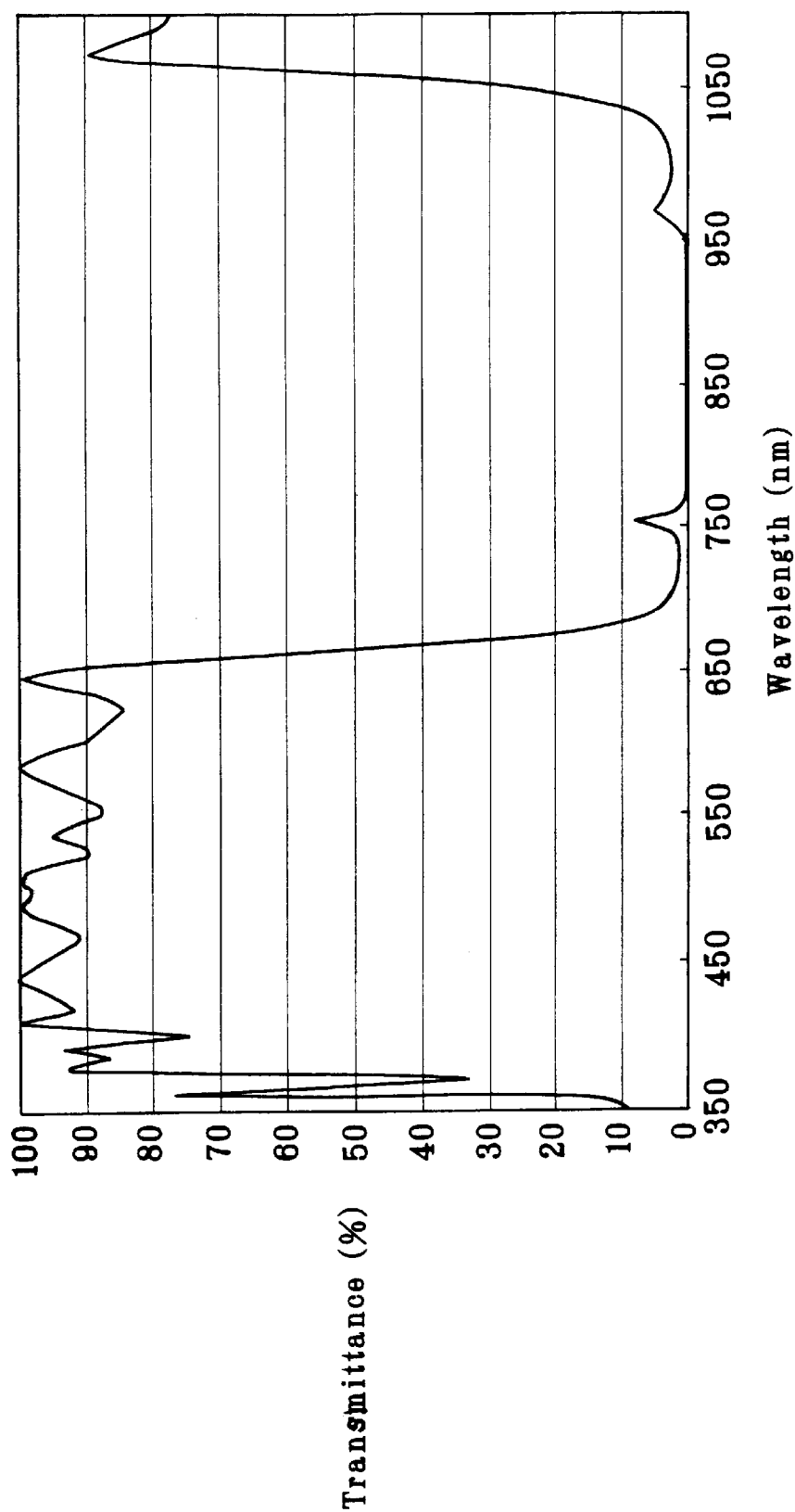
FIG. 19 is a graph illustrative of the transmittance characteristics of one example of the near-infrared sharp cut filter used herein.

The near-infrared cut filter FI is now explained in detail. This filter FI comprises a plane-parallel plate provided on its entrance surface side with a near-infrared cut coating for limiting chiefly the transmission of light in a longer wavelength range and on its exit surface side with a shorter wavelength cut coating for limiting chiefly the transmission of light in a shorter wavelength range. This near-infrared cut coating is designed in such a way as to have a transmittance of 80% or greater at 600 nm wavelength and a transmittance of 10% or less at 700 nm wavelength. To be more specific, a 27-layered IR cut coating film having such transmittance characteristics as shown in FIG. 19 is used. Set out below are data about such a multilayered coating film. This filter comprises such a plane-parallel plate substrate as mentioned above, on which 27 layers of $Al_2O_3$, $TiO_2$ and $SiO_2$ are laminated in the following order. Design wavelength λ is 780 nm.

| Substrate Layer No. | Material | Physical Thickness, nm | λ/4 |
|---|---|---|---|
| 1 | $Al_2O_3$ | 58.96 | 0.50 |
| 2 | $TiO_2$ | 84.19 | 1.00 |
| 3 | $SiO_2$ | 134.14 | 1.00 |
| 4 | $TiO_2$ | 84.19 | 1.00 |
| 5 | $SiO_2$ | 134.14 | 1.00 |
| 6 | $TiO_2$ | 84.19 | 1.00 |
| 7 | $SiO_2$ | 134.14 | 1.00 |
| 8 | $TiO_2$ | 84.19 | 1.00 |
| 9 | $SiO_2$ | 134.14 | 1.00 |
| 10 | $TiO_2$ | 84.19 | 1.00 |
| 11 | $SiO_2$ | 134.14 | 1.00 |
| 12 | $TiO_2$ | 84.19 | 1.00 |
| 13 | $SiO_2$ | 134.14 | 1.00 |
| 14 | $TiO_2$ | 84.19 | 1.00 |
| 15 | $SiO_2$ | 178.41 | 1.33 |
| 16 | $TiO_2$ | 101.03 | 1.21 |
| 17 | $SiO_2$ | 167.67 | 1.25 |
| 18 | $TiO_2$ | 96.82 | 1.15 |
| 19 | $SiO_2$ | 147.55 | 1.05 |
| 20 | $TiO_2$ | 84.19 | 1.00 |
| 21 | $SiO_2$ | 160.97 | 1.20 |
| 22 | $TiO_2$ | 84.19 | 1.00 |
| 23 | $SiO_2$ | 154.26 | 1.15 |
| 24 | $TiO_2$ | 95.13 | 1.13 |
| 25 | $SiO_2$ | 160.97 | 1.20 |
| 26 | $TiO_2$ | 99.34 | 1.18 |
| 27 | $SiO_2$ | 87.19 | 0.65 |

The shorter wavelength cut coating film on the exit surface side of the low-pass filter has such transmittance characteristics as shown in FIG. 20, and is again formed by multi-coating, so that the color reproducibility of an electronic image can be much more enhanced.

With this shorter wavelength cut coating film, for instance, it is possible to control the ratio of the 420 nm wavelength transmittance with respect to the transmittance of a wavelength having the highest transmittance in the wavelength range of 400 nm to 700 nm to 15% or greater and the ratio of the 400 nm wavelength transmittance with respect to the transmittance of the wavelength having the highest transmittance to 6% or less.

It is thus possible to reduce a discernible difference between the colors perceived by the human eyes and the colors of an image upon phototaken and reproduced. To put it another way, it is possible to prevent any image deterioration due to the fact that shorter wavelength side colors less likely to be perceived by the human sense of sight can be easily perceived by the human eyes.

When the aforesaid ratio of the 400 nm wavelength transmittance exceeds 6%, the shorter wavelength range less likely to be perceived by the human eyes is reproduced in colors capable of perception. When the aforesaid ratio of the 420 nm wavelength transmittance is less than 15%, on the contrary, the reproducibility of colors in the wavelength range capable of being perceived by the human eyes drops, resulting in the reproduction of ill-balanced colors.

The means for limiting such wavelengths can more advantageously be used with an image pickup system using a complementary color mosaic filter.

Figure 20:
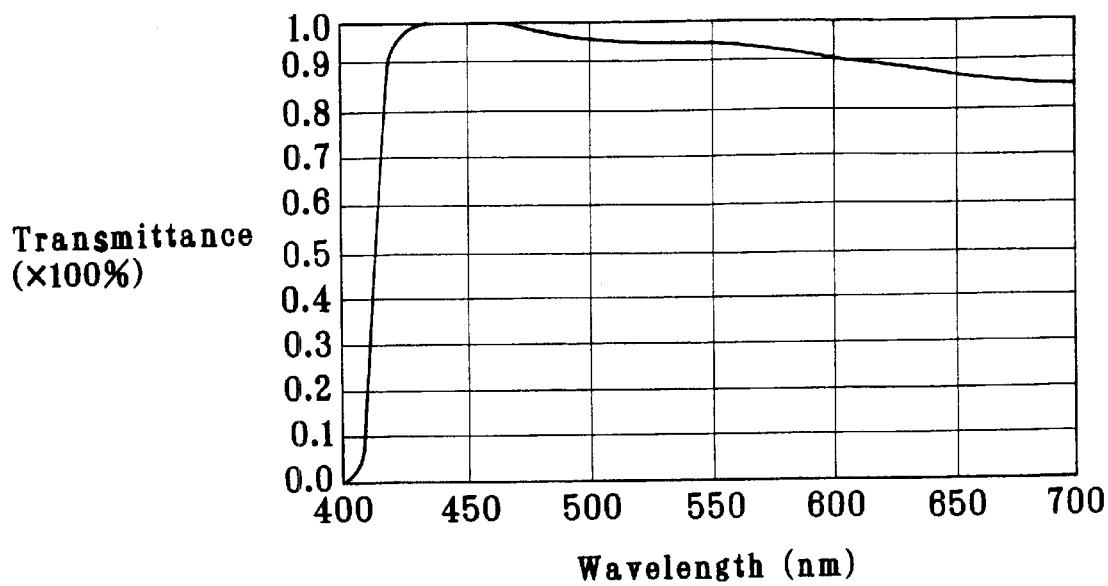
FIG. 20 is a graph illustrative of the transmittance characteristics of one example of the color filter located on the exit surface side of the low-pass filter.

Used in each of the foregoing examples is a coating having a transmittance of 0% at 400 nm wavelength and a transmittance of 90% at 420 nm wavelength, with a transmittance peak of 100% obtained at 440 nm wavelength, as shown in FIG. 20.

With the synergistic effect of this coating and the aforesaid near-infrared cut coating, it is thus possible to achieve a color control filter having a transmittance of 0% at 400 nm, a transmittance of 80% at 420 nm, a transmittance of 82% of at 600 nm and a transmittance of 2% at 700 nm, with a transmittance peak of 99% obtained at 450 nm. With this color control filter, faithful color reproduction is achievable.

The low-pass filter FL comprises three types of filter elements put one upon another in the optical axis direction, each of which elements has crystallographic axes in the azimuth directions of horizontal (=0°) and ±45° upon projection on an image plane. For moire reductioins, the elements are each shifted by a μm in the horizontal direction and SQRT(½)×a in the ±45° direction. Here SQRT means a square root.

The image pickup plane I of the CCD is provided thereon with a complementary color mosaic filter in a mosaic manner where four color filter elements, viz., cyan, magenta, yellow and green filter elements are in alignment with image pickup pixels. Substantially the same number of filter elements are located for each of these four types of color filters in such a mosaic way that adjacent pixels do not correspond to the same type of color filter elements, thereby achieving more faithful color reproduction.

Figure 21:
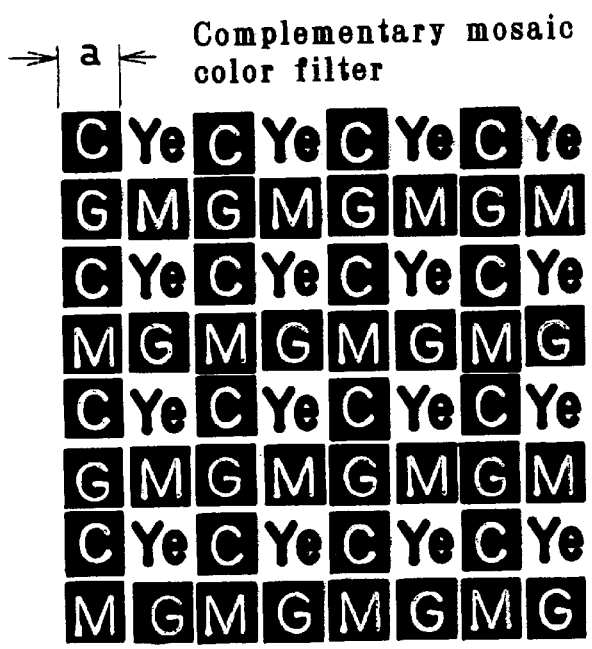
FIG. 21 is illustrative of one exemplary color filter profile for the complementary mosaic filter.

To be more specific, the complementary color filter is made up of at least four types of color filter elements, as shown in FIG. 21. Preferably in this case, the four types of color filters should be such characteristics as mentioned just below.

A green color filter G has a spectral strength peak at a wavelength $G_p$, a yellow color filter $Y_e$ has a spectral strength peak at a wavelength $Y_p$, a cyan color filter C has a spectral strength peak at a wavelength $C_p$, and a magenta color filter M has peaks at wavelengths $M_{p1}$ and $M_{p2}$, provided that 510 nm < $G_p$ < 540 nm 5 nm<$Y_p-G_p$<35 nm −100 nm<$C_p-G_p$<−5 nm 430 nm<$M_{p1}$<480 nm 580 nm<$M_{p2}$<640 nm In addition, it is preferable that each of the green, yellow and cyan color filters has a strength of 80% or greater at 530 nm wavelength with respect to its spectral strength peak, and the magenta color filter has a strength of 10% to 50% inclusive at 530 nm wavelength with respect to its spectral strength peak.

Figure 22:
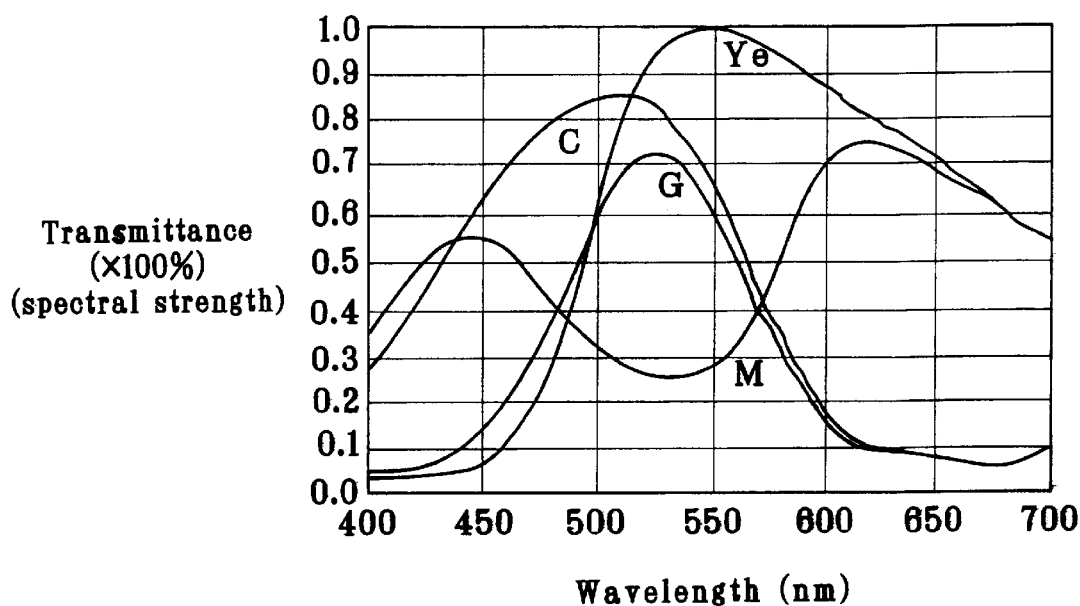
FIG. 22 is a graph illustrative of one example of the wavelength characteristics of the complementary mosaic filter.

One example of the wavelength characteristics of each color filter in this embodiment is shown in FIG. 22. The green color filter G has a spectral strength peak at 525 nm. The yellow color filter $Y_e$ has a spectral strength peak at 555 nm. The cyan color filter has a spectral strength peak at 510 nm. The magenta color filter has spectral strength peaks at 445 nm and 620 nm. The color filter at 530 nm has a strength of 99% for G, 95% for $Y_e$, 97% for C, and 38% for M with respect to its spectral strength peak.

When such a complementary color filter is used as the filter, the filtered light is converted by a controller (not shown or used with a digital camera) to R (red), G (green) and B (blue) signals according to the following electrical signal processing:

for luminance signals $$Y=|G+M+Y_e+C|\times \tfrac{1}{4}$$

for color signals $$R-Y=|(M+Y_e)-(G+C)|$$

$$B-Y=|(M+C)-(G+Y_e)|$$

Light in a longer or shorter wavelength range is less likely to be perceived by the human eyes. As this light reaches a CCD, however, color reproducibility becomes worse due to unsatisfactory signal processing, because the CCD has high light sensitivity. With this embodiment of the present invention, it is possible to achieve satisfactory color reproduction by use of an IR cut filter and a shorter wavelength cut filter.

This IR cut filter may be located everywhere on the optical path. In the case of electronic image pickup equipment, however, the IR filter should preferably be located between the lens group nearest to the image side of the equipment and an image plane (a CCD or the like), because the filter can be made compact and the effect of the filter can be made uniform. The number of the low-pass filter FL may be one or two as already mentioned.

Figure 23:
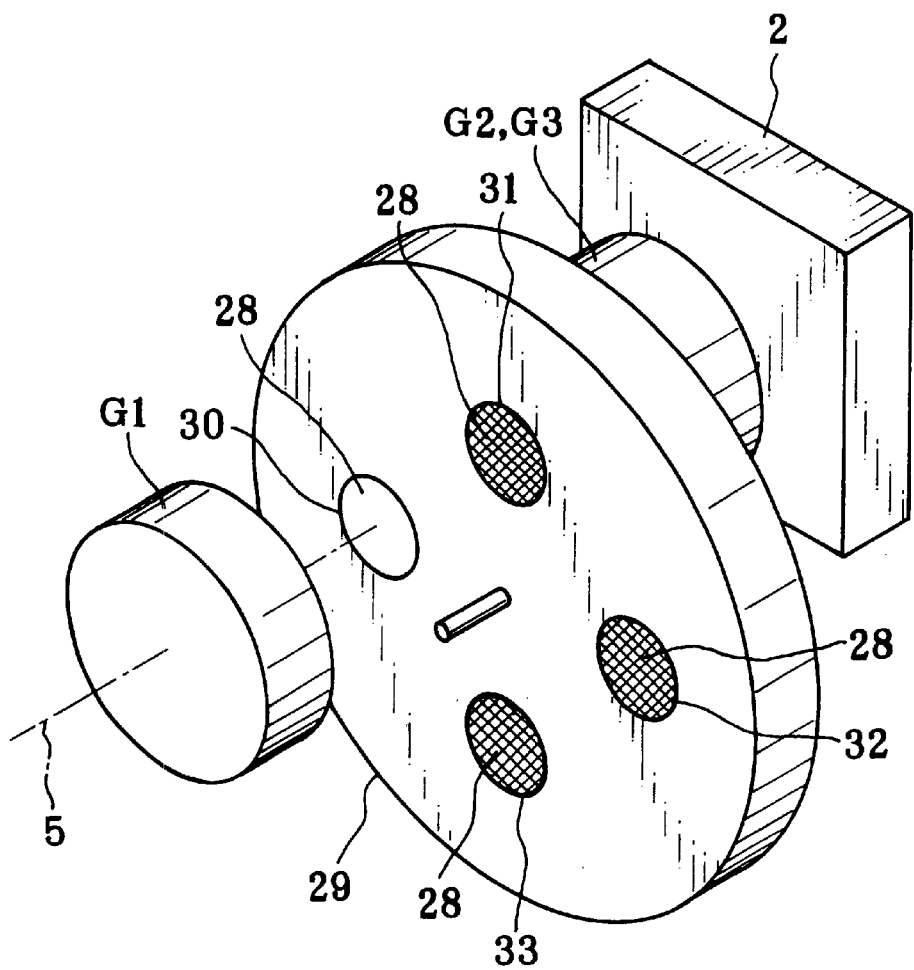
FIG. 23 is a perspective schematic illustrative of part of one embodiment of the electronic image pickup equipment according to the present invention.

FIG. 23 is a schematic of part of one embodiment of the electronic image pickup equipment according to the present invention. In this embodiment, a turret 29 is disposed on an optical axis 15 between the first lens group G1 and the second lens group G2 of the image pickup system (zoom lens system) so as to control brightness to 0, −1, −2 and −3 levels. Otherwise, the construction of the image pickup optical system or the like is the same as that of each of the aforesaid embodiments.

The turret 129 has aperture stops provided with a plane-parallel plate 130, a −1 level ND filter 131, −2 level ND filter 132 and −3 level ND filter 133, which are successively positioned on an optical path defined by the optical axis 5 in unison with the rotation of the turret 129, thereby controlling the quantity of light incident on an image pickup device 2 having a complementary color filter. The plane-parallel plate 130 and ND filters 31, 32 and 33 are each provided on its surface with a coating film 28 having a wavelength correction function of allowing its transmittance to become a half-value of its e-line transmittance between g-line and h-line, thereby reducing color flares due to chromatic aberrations occurring on the shorter wavelength side. In addition, these apertures are designed in such a way as to satisfy the requirements recited in claims 23, 24 and 25.

In association with each ND filter (31 to 33), the overall transmittance drops to ½, ¼ and ⅛, respectively.

Figure 24:
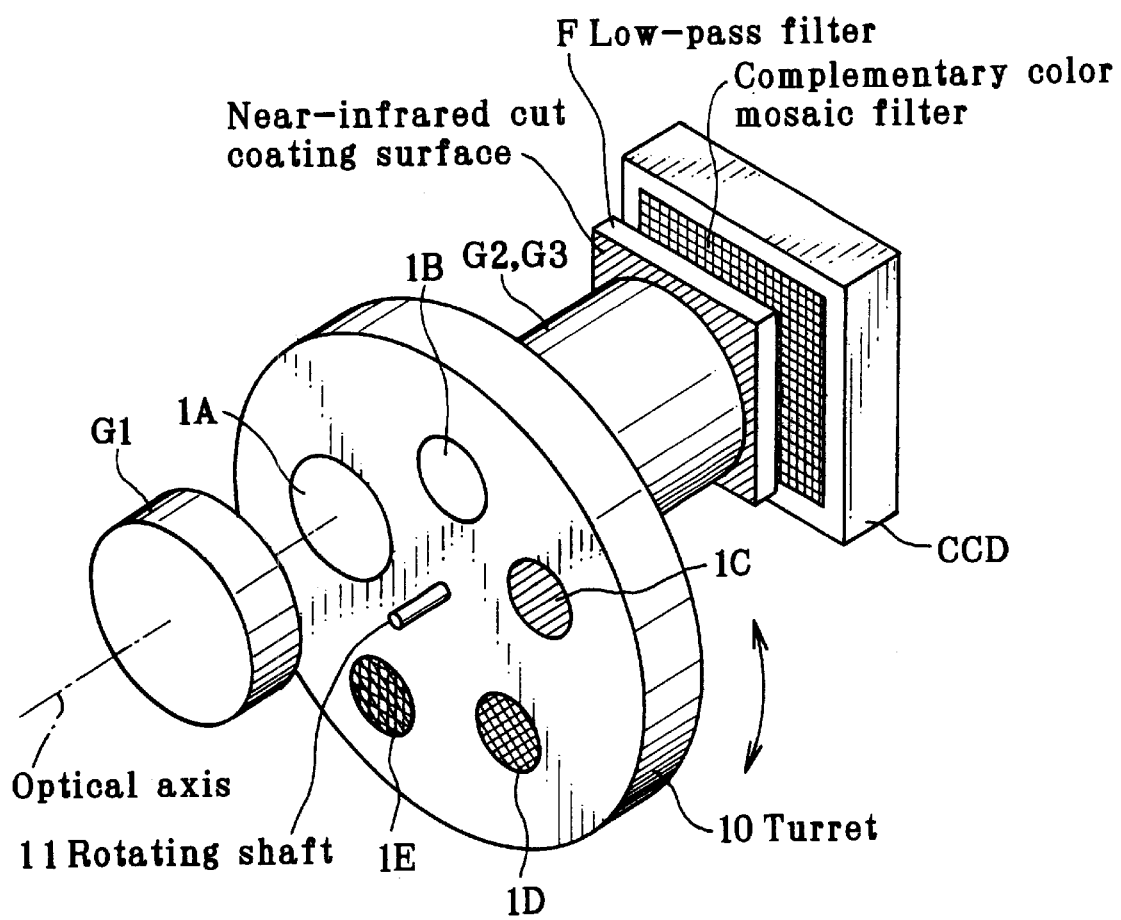
FIG. 24 is a perspective schematic illustrative of one embodiment of the aperture stop portion used in each example.

Another embodiment of the aperture stops is shown in FIG. 24. A turret 10 capable of controlling brightness to 0, −1, −2, −3 and −4 levels is provided at a stop position on an optical axis between the first lens group G1 and the second lens group G2 of an image pickup optical system. The turret is provided with a circular aperture 1A for 0 level control, which aperture has a diameter of about 4.5 mm and comprises a fixed space (and has a transmittance of 100% with respect to 550 nm wavelength), an aperture 1B for −1 level correction, which aperture comprises a transparent plane-parallel plate (having a transmittance of 99% with respect to 550 nm wavelength) having an aperture area that is about a half the aperture area of the aperture 1A and a fixed aperture shape, and apertures 1C, 1D and 1E having ND filters for −2, −3 and −4 level corrections, which filters have a transmittance of 50%, 25% and 13%, respectively, with respect to 550 nm wavelength.

For light quantity control, any one of the apertures is aligned with the stop position by the rotation of the turret 10 around an rotating shaft 11.

When an effective F-number $F_{no}'$ is $F_{no}'$>a/0.4 μm, an ND filter having a transmittance of less than 80% with respect to 550 nm wavelength is inserted into the aperture. Referring here to Example 1 for instance, the effective F-number at the telephoto end conforms to this condition when the effective F-number at the −2 level comes to 9.0 with respect to that at the 0 level (the stop opens). The then aperture is 1C. It is thus possible to reduce an image deterioration caused by a diffraction phenomenon due to stop-down.

Figure 25A:
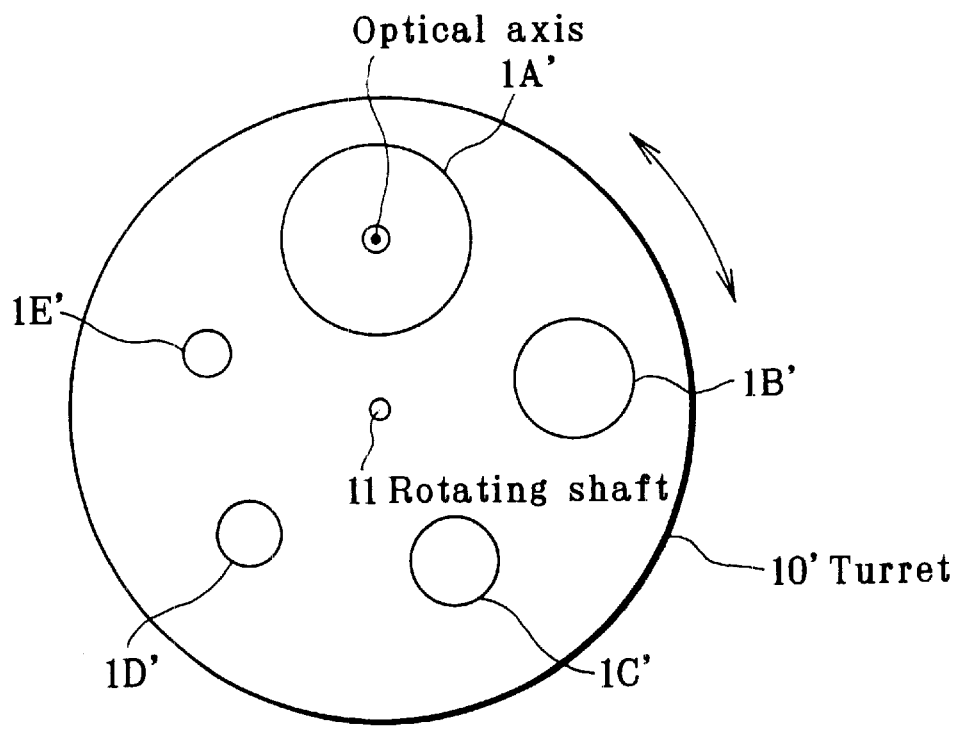
FIG. 25 is a perspective schematic illustrative of details of another embodiment of the aperture stop portion used in each example.

Instead of the turret 10 shown in FIG. 24, such a turret 10' as shown in FIG. 25(a) may be used. The turret 10' capable of controlling brightness to 0, −1, −2, −3 and −4 levels is provided at an aperture stop position on an optical axis between the first lens group G1 and the second lens group G2 of an image pickup optical system. The turret 10' is provided with a circular, fixed aperture 1A' for 0 level control, which aperture has a diameter of about 4.5 mm and a fixed aperture shape, an aperture 1B' for −1 level correction, which aperture has an aperture area that is about a half the aperture area of the aperture 1A and a fixed aperture shape, and apertures 1C', 1D' and 1E' for −2, −3 and −4 level corrections, the aperture areas of which decrease by 50% in this order and each of which has a fixed aperture shape. For light quantity control, any one of the apertures is aligned with the stop position by the rotation of the turret 10' around a rotating shaft 11.

Figure 25B:
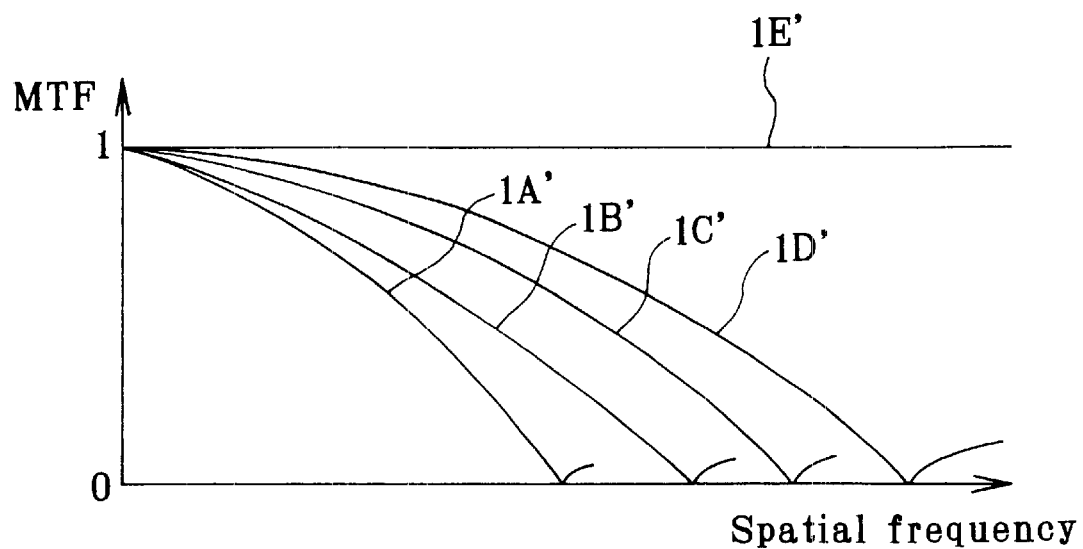

In addition, optical low-pass filters with varying spatial frequency characteristics are used for 1A' to 1D' out of these apertures. As shown in FIG. 25(b), the optical filters are designed in such a way that the smaller the aperture diameter, the higher the spatial frequency characteristics are. It is thus possible to reduce an image deterioration caused by a diffraction phenomenon due to stop-down. It is here noted that the curves of FIG. 25(b) show the spatial frequency characteristics of only the low-pass filters. In other words, the filters are designed in such a way that the characteristics inclusive of diffraction characteristics due to each stop are all on the same level. It is thus possible to achieve electronic image pickup equipment enabling a constant low-pass effect to be always ensured irrespective of the f number.

The aforesaid electronic image pickup equipment according to the present invention may be used for phototaking systems wherein an object image formed by the zoom lens system is sensed by an image pickup device such as a CCD or silver salt film, especially digital cameras or video cameras, personal computers that are one example of information processors, and telephones, especially convenient-to-carry portable telephones, as embodied just below.

Figure 26:
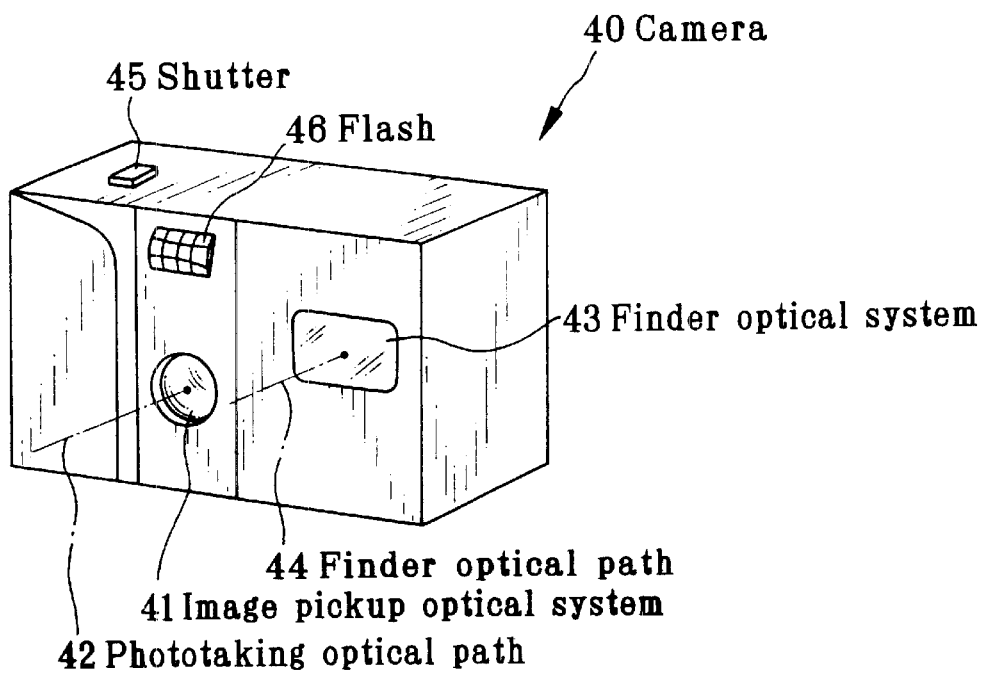
FIG. 26 is a front perspective schematic illustrative of the outside shape of a digital camera with the zoom lens system of the invention incorporated therein.
Figure 27:
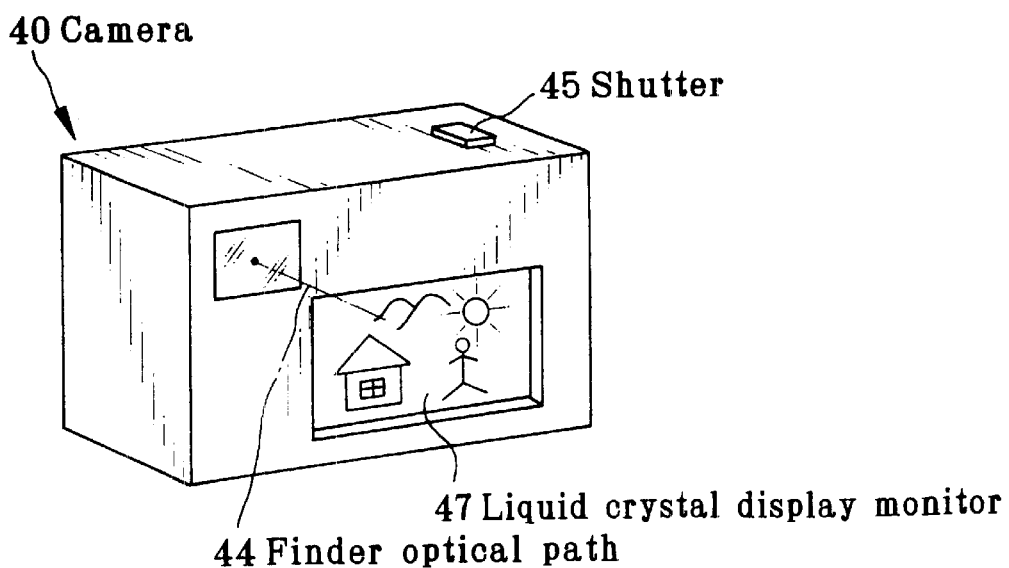
FIG. 27 is a rear perspective schematic illustrative of the digital camera of FIG. 26.
Figure 28:
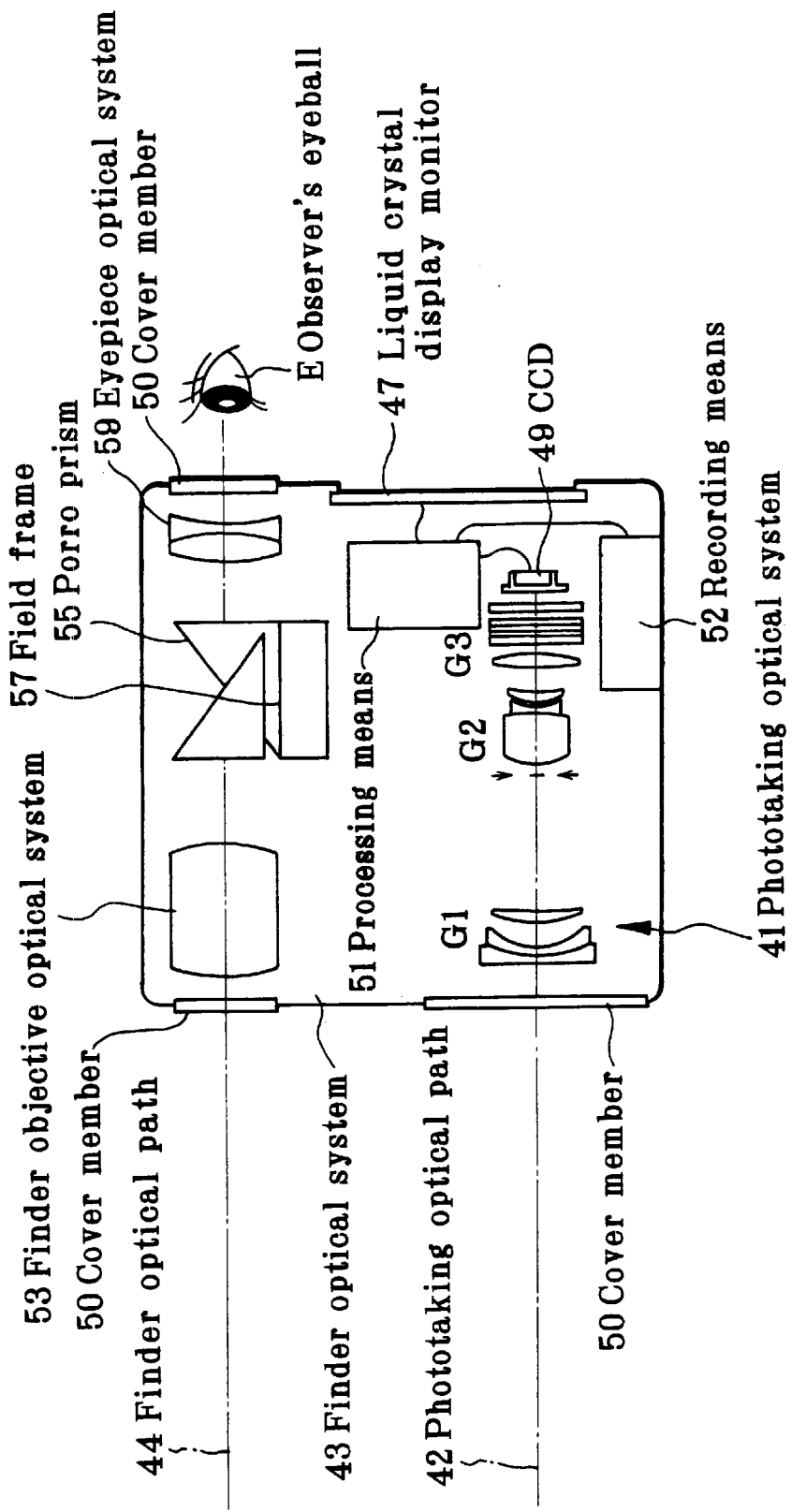
FIG. 28 is a sectional schematic illustrative of the digital camera of FIG. 26.

FIGS. 26 to 28 are conceptual schematics of a digital camera where the zoom lens system according to the present invention is incorporated in a phototaking optical system 41 thereof. FIG. 26 is a front perspective view illustrative of the outside shape of a digital camera 40, and FIG. 27 is a rear perspective view illustrative of the digital camera 40. FIG. 28 is a sectional view illustrative of the construction of the digital camera 40. The digital camera 40 according to the instant embodiment comprises a phototaking optical system 41 including a phototaking optical path 42, a finder optical system 43 including a finder optical path 44, a shutter button 45, a flash 46 and a liquid crystal display monitor 47. Upon pressing down the shutter button 45 located on the upper portion of the camera 40, phototaking occurs through the phototaking optical system 41, for instance, the zoom lens system set forth in Example 1. An object image formed through the phototaking optical system 11 is then formed on the image pickup plane of a CCD 49 via filters F1, F2 such as an optical low-pass filter and a near-infrared cut filter. The object image sensed by this CCD 49 is displayed as an electronic image on the liquid crystal display monitor 47 located on the back side of the camera via processing means 51. This processing means 51 may be connected with recording means 52 for recording the phototaken electronic image. It is here noted that the recording means 52 may be provided separately from the processing means 51 or in the form of electronic read/write means comprising a floppy disk, a memory card or an MO. Instead of CCD 49, a silver salt camera with silver salt film loaded therein may be used.

Further, a finder objective optical system 53 is located on the finder optical path 444. An object image formed by this finder objective optical system 53 is then formed on a field frame 57 of a Porro prism 55 that is an image erecting member. In the rear of the Porro prism 55, there is provided an eyepiece optical system 59 for guiding an erected image to an observer's eyeball E. It is here noted that a cover member 50 is provided on the entrance side of phototaking optical system 41 and finder optical system 53 while a cover member 50 is disposed on the exit side of eyepiece optical system 59.

The thus constructed digital camera 40 can have ever-higher performance at ever-lower costs, because the phototaking optical system 41 used therewith is a compact zoom lens system having an ever-wider angle and an ever-higher zoom ratio with well-corrected aberrations.

While plane-parallel plates are used for the cover members 50 in the embodiment of FIG. 28, it is understood that lenses having powers may be used.

Figure 29:
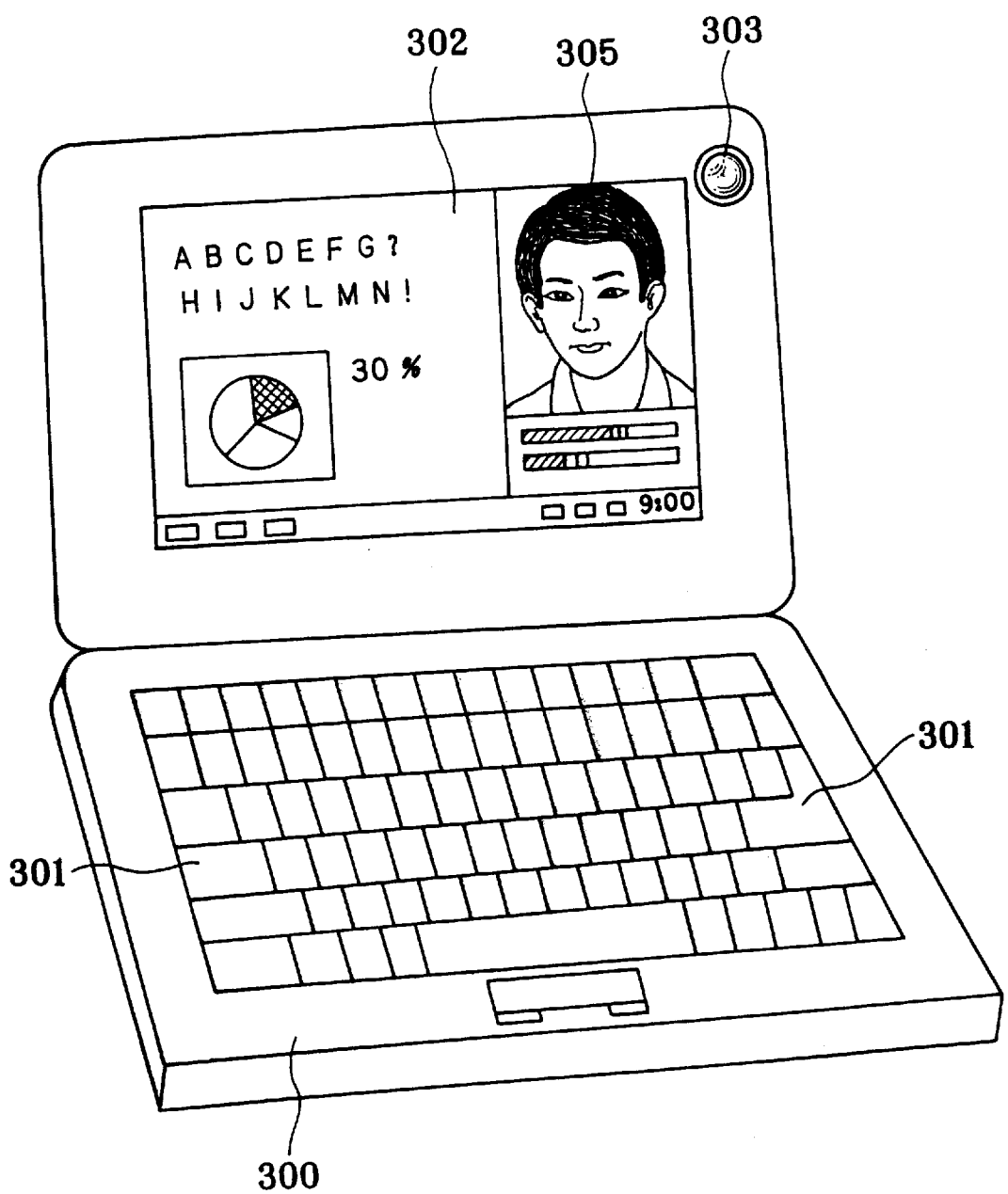
FIG. 29 is a front perspective schematic illustrative of an uncovered personal computer wherein the zoom lens system of the present invention is incorporated as an objective optical system.
Figure 30:
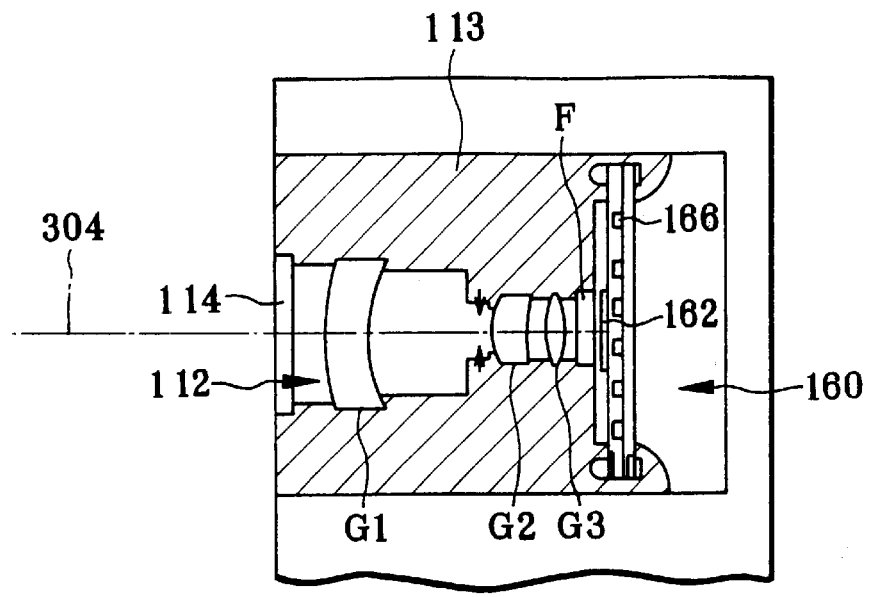
FIG. 30 is a sectional schematic illustrative of the phototaking optical system in the personal computer.
Figure 31:
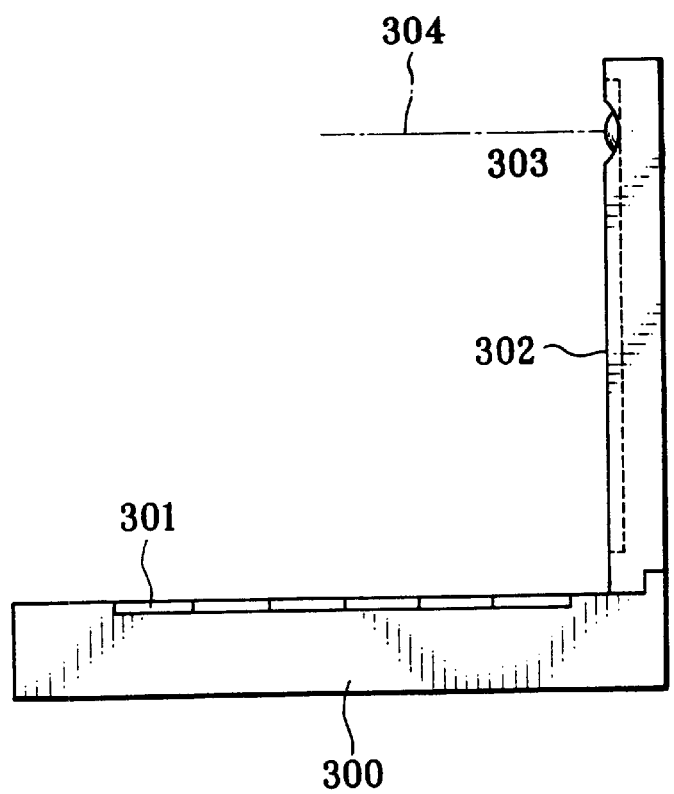
FIG. 31 is side schematic illustrative of the phototaking optical system shown in FIG. 29.

Shown in FIGS. 29 to 31 is a personal computer that is one example of the information processor in which the zoom lens system of the invention is incorporated in the form of an objective optical system. FIG. 29 is a front perspective views of an uncovered personal computer 300, FIG. 30 is a sectional view of a phototaking optical system 303 mounted on the personal computer 300, and FIG. 31 is a side view of FIG. 29. As depicted in FIGS. 29 to 31, the personal computer 300 comprises a key board 301 for allowing an operator to enter information therein from outside, information processing and recording means (not shown), a monitor 302 for displaying the information to the operator and a phototaking optical system 303 for phototaking an image of the operator per se and images of operator's surroundings. The monitor 302 used herein may be a transmission type liquid crystal display device designed to be illuminated by a backlight (not shown) from the back side, a reflection type liquid crystal display device designed to display images by reflecting light from the front side, a CRT display or the like. As shown, the phototaking optical system 303 is built in a right upper portion of monitor 302. However, it is to be understood that the phototaking optical system 303 may be positioned somewhere on the periphery of monitor 302 or keyboard 301.

The phototaking optical system 303 includes on a phototaking optical path 304 an objective lens system 112 comprising the zoom lens system of the invention (roughly illustrated) and an image pickup element chip 162 for receiving an image. These are built in the personal computer 300.

It is here to be understood that an optical low-pass filter F is additionally pasted onto the image pickup element chip 162 to construct an integral image pickup unit 160. This image pickup unit 160 can be fitted in the rear end of a lens barrel 113 of the objective lens system 112 in one-touch simple operation, so that centering and alignment of the objective lens system 112 with respect to the image pickup element chip 162 can be dispensed with to make assembly simple. At the end of the lens barrel 113, there is provided a cover glass 114 for protection of the objective lens system 112. It is here to be understood that the zoom lens driving mechanism in the lens barrel 113 is not shown.

An object image received at the image pickup element chip 162 is entered from a terminal 166 in the processing means in the personal computer 300, and displayed as an electronic image on the monitor 302. Shown in FIG. 29 as an example is a phototaken image 305 of the operator. It is possible to display the image 305, etc. on a personal computer at the other end on a remote place via an internet or telephone line.

Figure 32A:
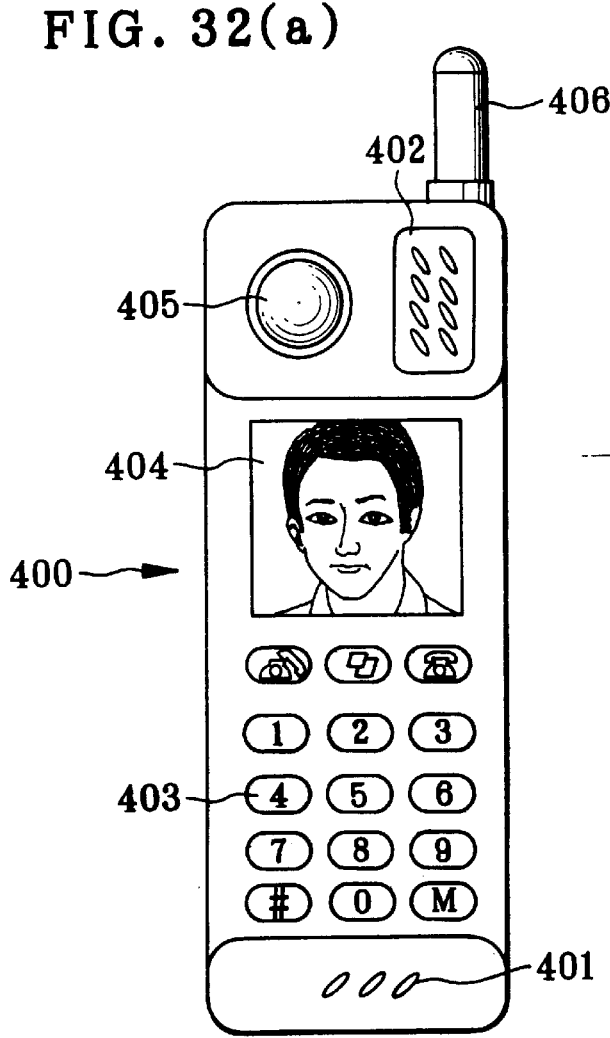
FIGS. 32(a) and 32(b) are a front and a side schematic of the portable telephone wherein the zoom lens system of the present invention is incorporated as an objective optical system.
Figure 32B:
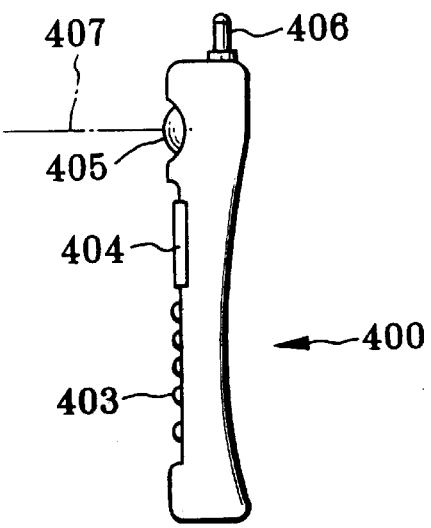
Figure 32C:
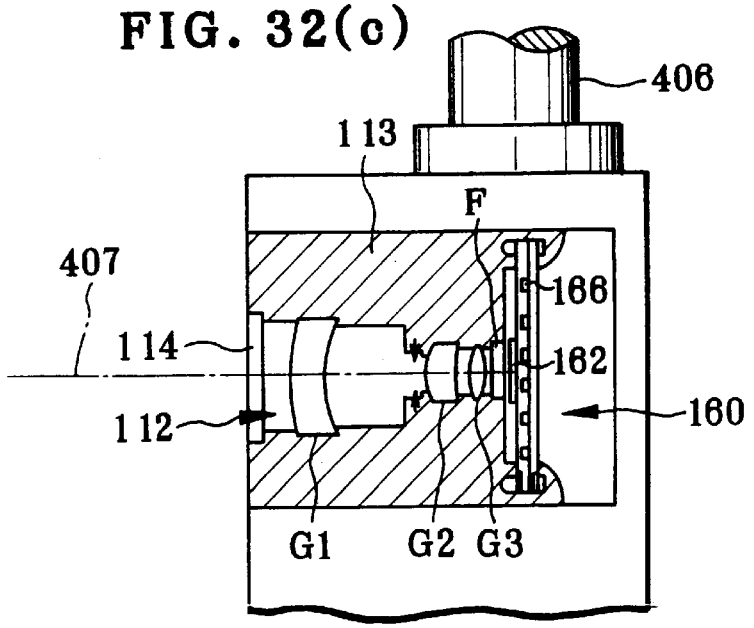
FIG. 32(c) is a sectional schematic illustrative of the phototaking optical system used with the portable telephone.

Illustrated in FIG. 32 is a telephone handset that is one example of the information processor in which the zoom lens system of the invention is built in the form of a phototaking optical system, especially a convenient-to-carry portable telephone handset. FIG. 32(a) is a front view of a portable telephone handset 400, FIG. 32(b) is a side view of handset 400 and FIG. 32(c) is a sectional view of a phototaking optical system 405. As depicted in FIGS. 32(a) to 21(c), the telephone handset 400 comprises a microphone portion 401 for entering an operator's voice therein as information, a speaker portion 402 for producing a voice of a person on the other end, an input dial 403 allowing the operator to enter information therein, a monitor 404 for displaying phototaken images of the operator and the person on the other end and information such as telephone numbers, a phototaking optical system 405, an antenna 406 for transmitting and receiving communication waves and a processing means (not shown) for processing image information, communication information, input signals, etc. The monitor 404 used herein is a liquid crystal display device. The arrangement of these parts is not necessarily limited to that illustrated. The phototaking optical system 405 includes on a phototaking optical path 407 an objective lens system 112 comprising the zoom lens system (roughly illustrated) of the invention and an image pickup device chip 162 for receiving an object image. These are built in the telephone handset 400.

It is here to be understood that an optical low-pass filter F is additionally pasted onto the image pickup device chip 162 to construct an integral image pickup unit 160. This image pickup unit 160 can be fitted in the rear end of a lens barrel 113 of the objective lens system 112 in one-touch simple operation, so that centering and alignment of the objective lens system 112 with respect to the image pickup element chip 162 can be dispensed with to make assembly simple. At the end of the lens barrel 113, there is provided a cover glass 114 for protection of the objective lens system 112. It is here to be understood that the zoom lens driving mechanism in the lens barrel 113 is not shown.

The object image received at the image pickup device chip 162 is entered from a terminal 166 in a processing means (not shown), and displayed as an electronic image on the monitor 404 and/or a monitor on the other end. To transmit an image to a person on the other end, the processing means includes a signal processing function of converting information about the object image received at the image pickup element chip 162 to transmittable signals.

While various embodiments of the present invention have been explained, it is understood that the invention is not necessarily limited thereto, and so such various embodiments may be carried out in combinations of two or more or modified in various manners depending on the need of design.

According to the present invention as explained above, it is thus possible to achieve a zoom lens system which enables an associated lens mount to have a reduced thickness and receive the zoom lens system with efficiency, and has a high magnification and improved image-formation capabilities even upon rear focusing, and makes it possible to reduce the thickness of a digital or video camera as much as possible.

What we claim is:

1. An electronic image pickup system comprising a zoom lens system and an electronic image pickup device located in the rear of said zoom lens system, wherein:

said zoom lens system comprises, in order from an object side of said zoom lens system, a first lens group having negative refracting power, a second lens group having positive refracting power and a third lens group having positive refracting power, upon focused on an object point at infinity, a separation between said second lens group and said third lens group becomes wide for zooming from a wide-angle end to a telephoto end of said zoom lens system, said zoom lens system is focused on a nearby subject by moving said the third lens group toward the object side, and said second lens group comprises, in order from an object side thereof, a first cemented lens component comprising a positive lens 2a and a negative lens 2b and a second lens group 2c consisting of a second cemented lens component, and satisfies the following condition (1):

$$0.04 < t_{2N}/t_2 < 0.18 \tag{1}$$

where $t_{2N}$ is an optical axis distance from an image-side surface of the positive lens 2a located on the object side of the second lens group to an image-side surface of the negative lens 2b in the second lens group, and $t_2$ is an optical axis distance from an object-side surface of the positive lens 2a located on the object side of the second lens group to a surface located to an image side of the second lens group 2c.

2. An electronic image pickup system comprising a zoom lens system and an electronic image pickup device located in the rear of said zoom lens system, wherein:

said zoom lens system comprises, in order from an object side of said zoom lens system, a first lens group having negative refracting power, a second lens group having positive refracting power and a third lens group having positive refracting power, upon focused on an object point at infinity, a separation between said second lens group and said third lens group becomes wide for zooming from a wide-angle end to a telephoto end of said zoom lens system, said zoom lens system is focused on a nearby subject by moving said the third lens group toward the object side, and said second lens group comprises, in order from an object side thereof, a first cemented lens component comprising a positive lens 2a and a negative lens 2b and a second lens group 2c consisting of a second cemented lens component, and satisfies the following condition (2):

$$-0.5 < f_{2a}/f_{2c} < 1.1 \tag{2}$$

where $f_{2a}$ and $f_{2c}$ is a focal length in air of the positive lens 2a located on the object side of the second lens group, and the lens group 2c, respectively.

3. An electronic image pickup system comprising a zoom lens system and an electronic image pickup device located in the rear of said zoom lens system, wherein:

said zoom lens system comprises, in order from an object side of said zoom lens system, a first lens group having negative refracting power, a second lens group having positive refracting power and a third lens group having positive refracting power, upon focused on an object point at infinity, a separation between said second lens group and said third lens group becomes wide for zooming from a wide-angle end to a telephoto end of said zoom lens system, said zoom lens system is focused on a nearby subject by moving said the third lens group toward the object side, said second lens group comprises a first cemented lens and a second cemented lens, and said zoom lens system has a zoom ratio of 2.3 or greater.

4. An electronic image pickup system comprising a zoom lens system and an electronic image pickup device located in the rear of said zoom lens system, wherein:

said zoom lens system comprises, in order from an object side of said zoom lens system, a first lens group having negative refracting power, a second lens group having positive refracting power and a third lens group having positive refracting power, upon focused on an object point at infinity, a separation between said second lens group and said third lens group becomes wide for zooming from a wide-angle end to a telephoto end of said zoom lens system, said zoom lens system is focused on a nearby subject by moving said the third lens group toward the object side, and said second lens group consists of, in order from an object side thereof, a cemented lens component comprising a positive lens 2a and a negative lens 2b and a lens group 2c consisting of a single lens component, and satisfies the following condition (1):

$$0.04 < t_{2N}/t_2 < 0.18 \tag{1}$$

where $t_{2N}$ is an optical axis distance from an image-side surface of the positive lens 2a located on the object side of the second lens group to an image-side surface of the negative lens 2b in the second lens group, and $t_2$ is an optical axis distance from an object-side surface of the positive lens 2a located on the object side of the second lens group to a surface located to an image side of the second lens group 2c.

5. An electronic image pickup system comprising a zoom lens system and an electronic image pickup device located in the rear of said zoom lens system, wherein:

said zoom lens system comprises, in order from an object side of said zoom lens system, a first lens group having negative refracting power, a second lens group having positive refracting power and a third lens group having positive refracting power, upon focused on an object point at infinity, a separation between said second lens group and said third lens group becomes wide for zooming from a wide-angle end to a telephoto end of said zoom lens system, said zoom lens system is focused on a nearby subject by moving said the third lens group toward the object side, and said second lens group consists of, in order from an object side thereof, a cemented lens component comprising a positive lens 2a and a negative lens 2b and a lens group 2c consisting of a single lens component, and satisfies the following condition (2):

$$-0.5 < f_{2a}/f_{2c} < 1.1 \tag{2}$$

where $f_{2a}$ and $f_{2c}$ is a focal length in air of the positive lens 2a located on the object side of the second lens group, and the lens group 2c, respectively.

6. An electronic image pickup system comprising a zoom lens system and an electronic image pickup device located in the rear of said zoom lens system, wherein:

said zoom lens system comprises, in order from an object side of said zoom lens system, a first lens group having negative refracting power, a second lens group having positive refracting power and a third lens group having positive refracting power, upon focused on an object point at infinity, a separation between said second lens group and said third lens group becomes wide for zooming from a wide-angle end to a telephoto end of said zoom lens system, said zoom lens system is focused on a nearby subject by moving said the third lens group toward the object side, said second lens group consists of one cemented lens and one single lens component, and said zoom lens system has a zoom ratio of 2.3 or greater.

7. The electronic image pickup system according to claims 1, 2 or 3, wherein said second lens group consists of two cemented lenses; said first cemented lens and said second cemented lens.

8. The electronic image pickup system according to any one of claims 1 to 6, wherein, in said zoom lens system, lens groups having optical power are only said first lens group, said second lens group and said third lens group.

9. The electronic image pickup system according to any one of claims 1 to 6, wherein said third lens group consists of one lens component.

10. The electronic image pickup system according to any one of claims 1 to 6, wherein a plurality of plane-parallel plates including a low-pass filter are interposed between said third lens group and a color mosaic filter in said electronic image pickup device.

11. The electronic image pickup system according to claim 1 or 4, which comprises a zoom lens wherein said lens group 2c in said second lens group comprises an aspherical surface, and said third lens group consists of only of a spherical surface or comprising an aspherical surface that satisfies the following condition (3):

$$abs(z)/L < 1.5 \times 10^{-2} \tag{3}$$

where abs(z) is an absolute value of an amount of a deviation of the aspherical surface in the third lens group from a spherical surface having an axial radius of curvature in an optical axis as measured at a height of 0.35 L from the optical axis, and L is a diagonal length of an effective image pickup plane.

12. The electronic image pickup system according to claim 1 or 4, which comprises a zoom lens that satisfies the following conditions (4) and (5):

$$(R_{2c1}+R_{2cr})/(R_{2c1}-R_{2cr}) < -0.4 \tag{4}$$

$$-1.1 < (R_{31}+R_{32})/(R_{31}-R_{32}) < 1.5 \tag{5}$$

where $R_{2c1}$ and $R_{2cr}$ are axial radii of curvature of the surfaces in the image-side lens group 2c in the second lens group, which surfaces are located nearest to the object and image sides, respectively, and $R_{31}$ and $R_{32}$ are axial radii of curvature of the first and second lens surfaces in the third lens group, respectively, as counted from the object side.

13. The electronic image pickup system according to claim 1 or 4, which comprises a zoom lens that satisfies the following condition (6):

$$-1.5 < \{(R_{2a1}+R_{2a2})\cdot(R_{2b1}-R_{2b2})\}/\{(R_{2a1}-R_{2a2})\cdot(R_{2b1}+R_{2b2})\} < -0.6 \tag{6}$$

where $R_{2a1}$ and $R_{2a2}$ are axial radii of curvature on the object and image sides, respectively, of the lens 2a in the second lens group, and $R_{2b1}$ and $R_{2b2}$ are axial radii of curvature on the object and image sides, respectively, of the lens 2b in the second lens group.

14. The electronic image pickup system according to claim 1 or 4, which comprises a zoom lens wherein the lens 2a in said second lens group has an aspherical surface on an object-side surface thereof.

15. The electronic image pickup system according to claim 1 or 4, which comprises a zoom lens wherein said first lens group comprises, in order from an object side thereof, a negative lens group comprising up to 2 negative lenses and a positive lens group comprising one positive lens, at least one negative lens in said lens group comprises an aspherical surface, and the following condition (7) is satisfied:

$$-0.1 < f_W/R_{11} < 0.45 \tag{7}$$

where $R_{11}$ is an axial radius of curvature of the first lens surface in the first lens group, as counted from the object side, and fW is a focal length of the zoom lens system at a wide-angle end thereof upon focused on an object point at infinity.

16. The electronic image pickup system according to claim 1 or 4, which comprises a zoom lens that satisfies the following condition (8):

$$0.13 < d_{Np}/f_W < 1.0 \tag{8}$$

where $d_{Np}$ is an axial air separation between the negative and positive lens groups in the first lens group.

17. The electronic image pickup system according to claim 4, which comprises a zoom lens wherein said first lens group consists of, in order from an object side thereof, one positive lens, two negative lenses and one positive lens.

18. The electronic image pickup system according to claim 17, which comprises a zoom lens that satisfies the following condition (9):

$$0.75 < R_{14}/L < 3 \qquad (9)$$

where $R_{14}$ is an axial radius of curvature of the fourth lens surface in the first lens group, as counted from the object side, and L is a diagonal length of an effective image pickup area of the image pickup device.

19. The electronic image pickup system according to claim 1 or 4, wherein said first lens group, and said second lens group has a total thickness that satisfies the following conditions (11) and (12):

$$0.4 < t_1/L < 2.2 \qquad (11)$$

$$0.5 < t_2/L < 1.5 \qquad (12)$$

where $t_1$ is an axial thickness of the first lens group from a lens surface located nearest to an object side thereof to an lens surface located nearest to an image side thereof, $t_2$ is an axial thickness of the second lens group from a lens surface located nearest to an object side thereof to a lens surface located nearest to an image side thereof, and L is a diagonal length of an effective image pickup area of the image pickup device.

20. The electronic image pickup system according to claim 1 or 4, wherein an optical low-pass filter located between said image pickup device and the object side of said electronic image pickup system has a total thickness that satisfies the following condition (13):

$$0.15 \times 10^3 < t_{LPF}/a < 0.45 \times 10^3 \qquad (13)$$

where $t_{LPF}$ is the total thickness of said optical low-pass filter and a is a horizontal pixel pitch of said image pickup device.

\* \* \* \* \*